United States Patent
Kumar et al.

(10) Patent No.: US 8,582,192 B2
(45) Date of Patent: Nov. 12, 2013

(54) POLARIZING PHOTOCHROMIC ARTICLES

(75) Inventors: Anil Kumar, Murrysville, PA (US);
Rachael L. Yoest, Gibsonia, PA (US);
Chenguang Li, Monroeville, PA (US);
Delwin S. Jackson, Clearwater, FL (US); Henry Nguyen, Largo, FL (US)

(73) Assignee: Transitions Optical, Inc., Pinellas Park, FL (US)

(*) Notice: Subject to any disclaimer, the term of this patent is extended or adjusted under 35 U.S.C. 154(b) by 298 days.

(21) Appl. No.: 13/153,748

(22) Filed: Jun. 6, 2011

(65) Prior Publication Data

US 2011/0279883 A1 Nov. 17, 2011

Related U.S. Application Data

(60) Continuation-in-part of application No. 11/590,055, filed on Oct. 31, 2006, now Pat. No. 7,978,391, which is a division of application No. 10/846,650, filed on May 17, 2004, now Pat. No. 7,256,921.

(60) Provisional application No. 60/484,100, filed on Jul. 1, 2003.

(51) Int. Cl.
*G02F 1/03* (2006.01)

(52) U.S. Cl.
USPC .......................................................... 359/241

(58) Field of Classification Search
USPC ................... 359/241, 483.01, 485, 488, 614; 351/41, 44, 49, 163; 349/13, 104
See application file for complete search history.

(56) References Cited

U.S. PATENT DOCUMENTS 2,319,826 A 5/1943 Pellett
2,334,446 A 11/1943 Serrell
2,475,921 A 7/1949 Smith
(Continued)

FOREIGN PATENT DOCUMENTS

EP 0321563 A1 6/1989
EP 0331233 A2 9/1989
(Continued)

OTHER PUBLICATIONS

Hikmet, R.A.M and de Witz, C., "Gel Layer for Inducting Adjustable Pretilt Angles in Liquid Crystal Systems," J. App. Phys., Aug. 1991, pp. 1265-1266, vol. 70, No. 3.

(Continued)

*Primary Examiner* — Tuyen Tra
(74) *Attorney, Agent, or Firm* — Deborah M. Altman; Frank P. Mallak

(57) ABSTRACT

Provided are photochromic articles that include a substrate, a primer layer that includes a first photochromic compound, and a photochromic-dichroic layer over the primer layer that includes a photochromic-dichroic compound. The first photochromic compound and the photochromic-dichroic compound each are selected such that the photochromic-dichroic compound has an absorbance of less than or equal to 0.1 at the wavelength of peak absorbance of the underlying first photochromic compound. The present invention also relates to such photochromic articles that further include a topcoat layer over the photochromic-dichroic layer. The topcoat layer can include a second photochromic compound that has an absorbance of less than 0.1 at the wavelength of peak absorbance of the underlying photochromic-dichroic compound. The photochromic articles provide, for example, a combination of linear polarizing properties, and reduced percent transmittance when in a colored or darkened state, such as when exposed to actinic light.

32 Claims, 2 Drawing Sheets

(56) References Cited

U.S. PATENT DOCUMENTS

| | | |
|---|---|---|
| 2,481,830 A | 9/1949 | Dreyer |
| 2,544,659 A | 3/1951 | Dreyer |
| 3,276,316 A | 10/1966 | Makas |
| 3,361,706 A | 1/1968 | Meriwether |
| 3,653,863 A | 4/1972 | Araujo et al. |
| 4,039,254 A | 8/1977 | Harsch |
| 4,043,637 A | 8/1977 | Hovey |
| 4,049,338 A | 9/1977 | Slocum |
| 4,166,043 A | 8/1979 | Uhlmann et al. |
| 4,190,330 A | 2/1980 | Berreman |
| 4,367,170 A | 1/1983 | Uhlmann et al. |
| 4,549,894 A | 10/1985 | Araujo et al. |
| 4,556,605 A | 12/1985 | Mogami et al. |
| 4,637,896 A | 1/1987 | Shannon |
| 4,648,925 A | 3/1987 | Goepfert et al. |
| 4,683,153 A | 7/1987 | Goepfert et al. |
| 4,728,173 A | 3/1988 | Toth |
| 4,731,264 A | 3/1988 | Lin et al. |
| 4,756,605 A | 7/1988 | Okada et al. |
| 4,756,973 A | 7/1988 | Sakagami et al. |
| 4,810,433 A | 3/1989 | Takayanagi et al. |
| 4,838,673 A | 6/1989 | Richards et al. |
| 4,863,763 A | 9/1989 | Takeda et al. |
| 4,865,668 A | 9/1989 | Goepfert et al. |
| 4,873,026 A | 10/1989 | Behre et al. |
| 4,873,029 A | 10/1989 | Blum |
| 4,931,220 A | 6/1990 | Haynes et al. |
| 4,974,941 A | 12/1990 | Gibbons et al. |
| 4,977,028 A | 12/1990 | Goepfert et al. |
| 5,024,850 A | 6/1991 | Broer et al. |
| 5,067,795 A | 11/1991 | Senatore |
| 5,073,294 A | 12/1991 | Shannon et al. |
| 5,130,353 A | 7/1992 | Fischer et al. |
| 5,134,191 A | 7/1992 | Takarada et al. |
| 5,155,607 A | 10/1992 | Inoue et al. |
| 5,180,470 A | 1/1993 | Smith et al. |
| 5,185,390 A | 2/1993 | Fischer et al. |
| 5,189,448 A | 2/1993 | Yaguchi |
| 5,202,053 A | 4/1993 | Shannon |
| 5,231,156 A | 7/1993 | Lin |
| 5,247,377 A | 9/1993 | Omeis et al. |
| 5,462,806 A | 10/1995 | Konishi et al. |
| 5,464,669 A | 11/1995 | Kang et al. |
| 5,602,661 A | 2/1997 | Schadt et al. |
| 5,608,567 A | 3/1997 | Grupp |
| 5,641,846 A | 6/1997 | Bieringer et al. |
| 5,644,416 A | 7/1997 | Morikawa et al. |
| 5,645,767 A | 7/1997 | Van Gemert |
| 5,658,501 A | 8/1997 | Kumar et al. |
| 5,698,141 A | 12/1997 | Kumar |
| 5,723,072 A | 3/1998 | Kumar |
| 5,746,949 A | 5/1998 | Shen et al. |
| 5,846,452 A | 12/1998 | Gibbons et al. |
| 5,903,330 A | 5/1999 | Funfschilling et al. |
| 5,943,104 A | 8/1999 | Moddel et al. |
| 5,952,515 A | 9/1999 | Melzig et al. |
| 5,962,617 A | 10/1999 | Slagel |
| 6,022,497 A | 2/2000 | Kumar |
| 6,025,026 A | 2/2000 | Smith et al. |
| 6,036,890 A | 3/2000 | Melzig et al. |
| 6,049,428 A | 4/2000 | Khan et al. |
| 6,060,001 A | 5/2000 | Welch et al. |
| 6,080,338 A | 6/2000 | Kumar |
| 6,113,814 A | 9/2000 | Gemert et al. |
| 6,136,968 A | 10/2000 | Chamontin et al. |
| 6,150,430 A | 11/2000 | Walters et al. |
| 6,153,126 A | 11/2000 | Kumar |
| 6,160,597 A | 12/2000 | Schadt et al. |
| 6,175,450 B1 | 1/2001 | Andreani et al. |
| 6,187,444 B1 | 2/2001 | Bowles, III et al. |
| 6,239,778 B1 | 5/2001 | Palffy-Muhoray et al. |
| 6,245,399 B1 | 6/2001 | Sahouani et al. |
| 6,268,055 B1 | 7/2001 | Walters et al. |
| 6,281,366 B1 | 8/2001 | Frigoli et al. |
| 6,284,418 B1 | 9/2001 | Trantolo |
| 6,296,785 B1 | 10/2001 | Nelson et al. |
| 6,312,811 B1 | 11/2001 | Frigoli et al. |
| 6,334,681 B1 | 1/2002 | Perrott et al. |
| 6,338,808 B1 | 1/2002 | Kawata et al. |
| 6,348,604 B1 | 2/2002 | Nelson et al. |
| 6,353,102 B1 | 3/2002 | Kumar |
| 6,369,869 B2 | 4/2002 | Schadt et al. |
| 6,432,544 B1 | 8/2002 | Stewart et al. |
| 6,433,043 B1 | 8/2002 | Misura et al. |
| 6,436,525 B1 | 8/2002 | Welch et al. |
| 6,474,695 B1 | 11/2002 | Schneider et al. |
| 6,506,488 B1 | 1/2003 | Stewart et al. |
| 6,531,076 B2 | 3/2003 | Crano et al. |
| 6,555,028 B2 | 4/2003 | Walters et al. |
| 6,597,422 B1 | 7/2003 | Funfschilling et al. |
| 6,602,603 B2 | 8/2003 | Welch et al. |
| 6,613,433 B2 | 9/2003 | Yamamoto et al. |
| 6,630,597 B1 | 10/2003 | Lin et al. |
| 6,641,874 B2 | 11/2003 | Kuntz et al. |
| 6,690,495 B1 | 2/2004 | Kosa et al. |
| 6,705,569 B1 | 3/2004 | Sanders et al. |
| 6,717,644 B2 | 4/2004 | Schadt et al. |
| 6,761,452 B2 | 7/2004 | Moravec et al. |
| 6,844,686 B1 | 1/2005 | Schneck et al. |
| 6,874,888 B1 | 4/2005 | Dudai |
| 7,256,921 B2 | 8/2007 | Kumar et al. |
| 7,349,138 B2 | 3/2008 | Kumar et al. |
| 7,394,585 B2 | 7/2008 | Kumar et al. |
| 7,410,691 B2 | 8/2008 | Blackburn et al. |
| 7,452,611 B2 | 11/2008 | Blackburn et al. |
| 7,465,414 B2 | 12/2008 | Knox et al. |
| 7,465,415 B2 | 12/2008 | Wang et al. |
| 7,505,189 B2 | 3/2009 | Kumar et al. |
| 7,910,019 B2 | 3/2011 | He et al. |
| 2002/0039627 A1 | 4/2002 | Ichihashi et al. |
| 2002/0090516 A1 | 7/2002 | Loshak et al. |
| 2002/0167639 A1 | 11/2002 | Coates et al. |
| 2002/0180916 A1 | 12/2002 | Schadt et al. |
| 2003/0008958 A1 | 1/2003 | Momoda et al. |
| 2003/0045612 A1 | 3/2003 | Misura et al. |
| 2003/0189684 A1 | 10/2003 | Kuntz et al. |
| 2004/0046927 A1 | 3/2004 | Montgomery |
| 2004/0125337 A1 | 7/2004 | Boulineau et al. |
| 2004/0158028 A1 | 8/2004 | Buhler |
| 2004/0223221 A1 | 11/2004 | Sugimura et al. |
| 2005/0003107 A1 | 1/2005 | Kumar et al. |
| 2005/0004361 A1 | 1/2005 | Kumar et al. |
| 2005/0012998 A1 | 1/2005 | Kumar et al. |
| 2005/0146680 A1 | 7/2005 | Muisener et al. |
| 2007/0041073 A1 | 2/2007 | Kumar et al. |
| 2007/0275234 A1 | 11/2007 | Lim et al. |
| 2011/0049445 A1 | 3/2011 | Chopra et al. |
| 2011/0129678 A1 | 6/2011 | He et al. |
| 2011/0140056 A1 | 6/2011 | He et al. |
| 2011/0143141 A1 | 6/2011 | He et al. |
| 2013/0107173 A1* | 5/2013 | Takeda et al. ............... 349/96 |

FOREIGN PATENT DOCUMENTS

| | | |
|---|---|---|
| EP | 0397263 A1 | 11/1990 |
| EP | 0488164 A2 | 6/1992 |
| EP | 0543678 A1 | 5/1993 |
| EP | 0619358 A1 | 10/1994 |
| EP | 0772069 A1 | 5/1997 |
| EP | 0965628 A1 | 12/1999 |
| GB | 583842 | 1/1947 |
| GB | 2169417 A | 7/1986 |
| JP | 59135428 A | 8/1984 |
| JP | 03200118 A | 9/1991 |
| JP | 03200218 A | 9/1991 |
| WO | 8905464 A1 | 6/1989 |
| WO | 9201959 A1 | 2/1992 |
| WO | 9317071 A1 | 9/1993 |
| WO | 9420581 A1 | 9/1994 |
| WO | 9819207 A1 | 5/1998 |
| WO | 0015630 A1 | 3/2000 |
| WO | 0019252 A1 | 4/2000 |
| WO | 0033111 A1 | 6/2000 |
| WO | 0102449 A2 | 1/2001 |

(56) References Cited

FOREIGN PATENT DOCUMENTS

| WO | 0119813 A1 | 3/2001 |
|---|---|---|
| WO | 0170719 A2 | 9/2001 |
| WO | 03032066 A1 | 4/2003 |
| WO | 2005084826 A1 | 9/2005 |
| WO | 2005085912 A1 | 9/2005 |

OTHER PUBLICATIONS

Kvasnikov, E.D., Kozenkov, V.M., and Barachevskii, V.A., "Birefringence in Polyvinylcinnamate Films Induced Polarized Light," Doklady Akademii nauk SSSR, 1977, pp. 633-636, vol. 237.

Kozenkov, V.M., Chigrinov, V.G., and Kwok, H.S. "Photoanisotropic Effects in Poly (Vinyl-Cinnamate) Derivatives and Their Applications," Mol. Cryst Liq. Cryst., 2004, pp. 251-267, vol. 409.

Schadt, Martin et al. "Surface-Induced Parallel Alignment of Liquid Crystals by Linearly Polymerized Photopolymers," Jpn. J. Appl. Phys., Jul. 1992, pp. 2155-2164, vol. 31, No. 7.

Schadt, Martin "Optics and Applications of Photo-Aligned Liquid Crystalline Surfaces," Nonlinear Optics, 2000, pp. 1-12, vol. 25.

Schadt, Martin "Liquid Crystal Displays and Novel Optical Thin Films Enabled by Photo-Alignment" Mol. Cryst. Liq. Cryst., 2001, pp. 151-169, vol. 364.

Castellano, Joseph A. "Surface Anchoring of Liquid Crystal Molecules on Various Substrates," Mol. Cryst. Liq. Cryst., 1983, pp. 33-41, vol. 94.

Huang, D.D. et al. "Effect of Aligning Layer Thickness on Photo-Aligned Ferroelectric Liquid Crystal Displays," Proceedings of the 6.sup.th Chinese Optoelectronics Symposium, Hong Kong China, IEEE (New York), 2003, pp. 231-234.

Chigrinov, V.G. and Kozenkov, V.M., "New Results on Liquid Crystal Alignment by Photopolymerization," Proceedings of the SPIE—The Internationali Society for Optical Engineering, SPIE, 1995, pp. 130-140, vol. 2409.

"Polymerization", Hawley's Condensed Chemical Dictionary, 13th Edition, 1997, pp. 901-902.

Olah, George A. "Friedel-Crafts and Related Reactions", Interscience Publishers, 1964, chapter XXXI (Aromatic Ketone Synthesis), vol. 3.

Ishihara, Yuji et al. "Regioselective Friedel-Crafts Acylation of 1,2,3,4-Tetrahydroquinoline and Related Nitrogen Heterocycles: Effects of NH Protective Groups and Ring Size", J. Chem. Soc., 1992, pp. 3401-3406.

\* cited by examiner

POLARIZING PHOTOCHROMIC ARTICLES

CROSS REFERENCE TO RELATED APPLICATIONS

This application is a continuation-in-part of U.S. patent application Ser. No. 11/590,055 filed Oct. 31, 2006, which is a divisional of U.S. patent application Ser. No. 10/846,650, filed May 17, 2004 (issued as U.S. Pat. No. 7,256,921 B2), which claims and is entitled to the benefit of priority from U.S. Provisional Patent Application No. 60/484,100, filed Jul. 1, 2003, each of which is hereby specifically incorporated by reference.

FIELD OF THE INVENTION

The present invention relates to photochromic articles that include a substrate, a primer layer that includes a first photochromic compound, and a photochromic-dichroic layer over the primer layer that includes a photochromic-dichroic compound, in which the first photochromic compound and the photochromic-dichroic compound are each selected such that the photochromic-dichroic compound has an absorbance of less than 0.1 at the wavelength of peak absorbance of the underlying first photochromic compound.

BACKGROUND OF THE INVENTION

Conventional linearly polarizing elements, such as linearly polarizing lenses for sunglasses and linearly polarizing filters, are typically formed from stretched polymer sheets containing a dichroic material, such as a dichroic dye. Consequently, conventional linearly polarizing elements are static elements having a single, linearly polarizing state. Accordingly, when a conventional linearly polarizing element is exposed to either randomly polarized radiation or reflected radiation of the appropriate wavelength, some percentage of the radiation transmitted through the element will be linearly polarized.

In addition, conventional linearly polarizing elements are typically tinted. Typically, conventional linearly polarizing elements contain a coloring agent (i.e., the dichroic material) and have an absorption spectrum that does not vary in response to actinic radiation. The color of the conventional linearly polarizing element will depend upon the coloring agent used to form the element, and most commonly, is a neutral color (for example, brown or gray). Thus, while conventional linearly polarizing elements are useful in reducing reflected light glare, because of their tint, they are typically not well suited for use under low-light conditions. Further, because conventional linearly polarizing elements have only a single, tinted linearly polarizing state, they are limited in their ability to store or display information.

Conventional linearly polarizing elements are typically formed using sheets of stretched polymer films containing a dichroic material. Correspondingly, while dichroic materials are capable of preferentially absorbing one of two orthogonal plane polarized components of transmitted radiation, if the molecules of the dichroic material are not suitably positioned or arranged, no net linear polarization of transmitted radiation will be achieved. Without intending to be bound by any theory it is believed that due to the random positioning of the molecules of the dichroic material, selective absorption by the individual molecules will cancel each other such that no net or overall linear polarizing effect is achieved. As such, it is typically necessary to position or arrange the molecules of the dichroic material by alignment with another material so as to achieve a net linear polarization.

A common method of aligning the molecules of a dichroic dye involves heating a sheet or layer of polyvinyl alcohol ("PVA") to soften the PVA and then stretching the sheet to orient the PVA polymer chains. Thereafter, the dichroic dye is impregnated into the stretched sheet, and the impregnated dye molecules adopt the orientation of the polymer chains. Resultantly, at least some of the dye molecules become aligned, such that the long axis of each aligned dye molecule is generally parallel to the oriented polymer chains. Alternatively, the dichroic dye can be first impregnated into the PVA sheet, and thereafter the sheet can be heated and stretched as described above to orient the PVA polymer chains and associated dye. In this manner, the molecules of the dichroic dye can be suitably positioned or arranged amongst the oriented polymer chains of the PVA sheet, and a net linear polarization can be correspondingly achieved. As a result, the PVA sheet can be made to linearly polarize transmitted radiation, and correspondingly a linearly polarizing filter can thus be formed.

In contrast to the dichroic elements discussed above, conventional photochromic elements, such as photochromic lenses that are formed using conventional thermally reversible photochromic materials are generally capable of converting from a first state, for example a "clear state," to a second state, for example a "colored state," in response to actinic radiation, and reverting back to the first state in response to thermal energy. Thus, conventional photochromic elements are generally well suited for use in both low-light and bright conditions. Conventional photochromic elements, however, that do not include linearly polarizing filters are generally not capable of linearly polarizing radiation. The absorption ratio of conventional photochromic elements, in either state, is generally less than two. Therefore, conventional photochromic elements are not capable of reducing reflected light glare to the same extent as conventional linearly polarizing elements. In addition, conventional photochromic elements have a limited ability to store or display information.

Photochromic-dichroic compounds and materials have been developed that provide both photochromic properties and dichroic properties, if properly and at least sufficiently aligned. When in a colored or darkened state, such as when exposed to actinic light, photochromic-dichroic compounds, however, typically have a larger percent transmittance than non-polarizing or conventional photochromic compounds at equivalent concentrations and sample thickness. While not intending to be bound by any theory, and based on the evidence at hand, it is believed that the increased percent transmittance of photochromic-dichroic materials in the darkened or colored state is due to the percent transmittance being an average of the two orthogonal plane polarized components of the polarized radiation. A photochromic-dichroic material will more strongly absorb one of the two orthogonal plane polarized components of the incident random radiation, resulting in one of the planes of transmitted polarized light (passing through and out of the sample) being having a greater percent transmittance than the other orthogonal plane polarized components. The average of the two orthogonal plane polarized components typically results in an average percent transmittance of greater magnitude. In general, as the linearly polarizing efficiency, which can be quantified in terms of absorption ratio, of photochromic-dichroic compounds increases, the percent transmittance associated therewith also increases.

It would be desirable to develop new polarizing photochromic articles that include photochromic-dichroic compounds, and which provide a combination of linear polarizing properties, and reduced percent transmittance when in a colored or darkened state, such as when exposed to actinic light.

SUMMARY OF THE INVENTION

In accordance with the present invention, there is provided a photochromic article comprising a substrate and at least two layers thereof including, a primer layer positioned over the substrate, and a photochromic-dichroic layer positioned over the primer layer.

The primer layer comprises a first photochromic compound having a first peak absorbance wavelength and a first terminal minimum absorbance wavelength. The first terminal minimum absorbance wavelength of the first photochromic compound is at higher wavelength than the first peak absorbance wavelength thereof.

The photochromic-dichroic layer comprises a photochromic-dichroic compound having a second peak absorbance wavelength and a second terminal minimum absorbance wavelength. The second terminal minimum absorbance wavelength of the photochromic-dichroic compound is at higher wavelength than the second peak absorbance wavelength thereof.

The second peak absorbance wavelength of the photochromic-dichroic compound is less than the first peak absorbance wavelength of the first photochromic compound. The second terminal minimum absorbance wavelength of the photochromic-dichroic compound is less than the first terminal minimum absorbance wavelength of the first photochromic compound.

In addition, the photochromic-dichroic compound has an absorbance of less than or equal to 0.1 at the wavelength corresponding to the first peak absorbance of the underlying first photochromic compound (i.e., at the first peak absorbance wavelength).

In accordance with a further embodiment of the present invention, there is provided a photochromic article that includes, a substrate and at least three layers thereover including, a primer layer that is positioned over the substrate, a photochromic-dichroic layer that is positioned over the primer layer, and a topcoat layer that is positioned over the photochromic-dichroic layer.

The primer layer includes a first photochromic compound having a first peak absorbance wavelength and a first terminal minimum absorbance wavelength. The first terminal minimum absorbance wavelength of the first photochromic compound is at higher wavelength than the first peak absorbance wavelength thereof.

The photochromic-dichroic layer comprises a photochromic-dichroic compound having a second peak absorbance wavelength and a second terminal minimum absorbance wavelength. The second terminal minimum absorbance wavelength of the photochromic-dichroic compound is at higher wavelength than the second peak absorbance wavelength thereof.

The topcoat layer, of the at least three-layered embodiment, includes an optional ultraviolet light absorber, and a second photochromic compound having a third peak absorbance wavelength and a third terminal minimum absorbance wavelength. The third terminal minimum absorbance wavelength of the second photochromic compound is at higher wavelength than the third peak absorbance wavelength thereof.

With the at least three-layered embodiment, the second peak absorbance wavelength of the photochromic-dichroic compound is less than the first peak absorbance wavelength of the underlying first photochromic compound. The second terminal minimum absorbance wavelength of the photochromic-dichroic compound is less than the first terminal minimum absorbance wavelength of the underlying first photochromic compound. The third peak absorbance wavelength of the second photochromic compound is less than the second peak absorbance wavelength of the underlying photochromic-dichroic compound. The third terminal minimum absorbance wavelength of the second photochromic compound is less than the second terminal minimum absorbance wavelength of the underlying photochromic-dichroic compound.

In addition, with the at least three-layered embodiment, the photochromic-dichroic compound has an absorbance of less than or equal to 0.1 at the wavelength corresponding to the first peak absorbance of the underlying first photochromic compound (i.e., at the first peak absorbance wavelength). Further additionally, the second photochromic compound has an absorbance of less than or equal to 0.1 at the wavelength corresponding to the second peak absorbance of the underlying photochromic-dichroic compound (i.e., at the second peak absorbance wavelength).

DETAILED DESCRIPTION OF THE INVENTION

Figure 1:
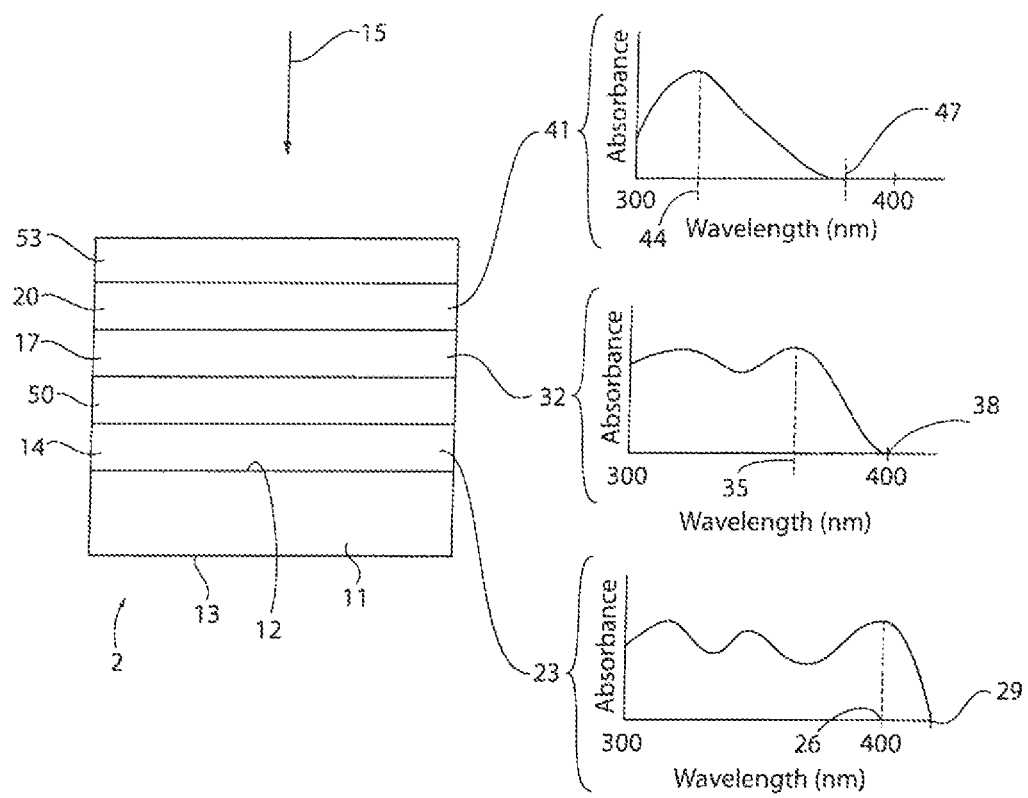
FIG. 1 is a representative side elevation sectional view of a photochromic article according to the present invention, which includes graphical representations of plots of absorbance vs. wavelength for the first photochromic compound of the primer layer, the photochromic-dichroic compound of the photochromic-dichroic layer, and the second photochromic compound of the topcoat layer.

As used herein, the term "actinic radiation" means electromagnetic radiation that is capable of causing a response in a material, such as, but not limited to, transforming a photochromic material from one form or state to another as will be discussed in further detail herein.

As used herein, the term "photochromic" and similar terms, such as "photochromic compound" means having an absorption spectrum for at least visible radiation that varies in response to absorption of at least actinic radiation. Further, as used herein the term "photochromic material" means any substance that is adapted to display photochromic properties (i.e. adapted to have an absorption spectrum for at least visible radiation that varies in response to absorption of at least actinic radiation) and which includes at least one photochromic compound.

As used herein, the term "photochromic compound" includes thermally reversible photochromic compounds and non-thermally reversible photochromic compounds. The term "thermally reversible photochromic compounds/materials" as used herein means compounds/materials capable of converting from a first state, for example a "clear state," to a second state, for example a "colored state," in response to actinic radiation, and reverting back to the first state in response to thermal energy. The term "non-thermally reversible photochromic compounds/materials" as used herein means compounds/materials capable of converting from a first state, for example a "clear state," to a second state, for example a "colored state," in response to actinic radiation, and reverting back to the first state in response to actinic radiation of substantially the same wavelength(s) as the absorption(s) of the colored state (e.g., discontinuing exposure to such actinic radiation).

As used herein the term "dichroic" means capable of absorbing one of two orthogonal plane polarized components of at least transmitted radiation more strongly than the other.

As used herein, the term "photochromic-dichroic" and similar terms, such as "photochromic-dichroic materials" and "photochromic-dichroic compounds" means materials and compounds that possess and/or provide both photochromic properties (i.e., having an absorption spectrum for at least visible radiation that varies in response to at least actinic radiation), and dichroic properties (i.e., capable of absorbing one of two orthogonal plane polarized components of at least transmitted radiation more strongly than the other).

As used herein the term "absorption ratio" refers to the ratio of the absorbance of radiation linearly polarized in a first plane to the absorbance of the same wavelength radiation linearly polarized in a plane orthogonal to the first plane, in which the first plane is taken as the plane with the highest absorbance.

As used herein to modify the term "state," the terms "first" and "second" are not intended to refer to any particular order or chronology, but instead refer to two different conditions or properties. For purposes of non-limiting illustration, the first state and the second state of the photochromic-dichroic compound of the photochromic-dichroic layer can differ with respect to at least one optical property, such as but not limited to the absorption or linearly polarization of visible and/or UV radiation. Thus, according to various non-limiting embodiments disclosed herein, the photochromic-dichroic compound of the photochromic-dichroic layer can have a different absorption spectrum in each of the first and second state. For example, while not limiting herein, the photochromic-dichroic compound of the photochromic-dichroic layer can be clear in the first state and colored in the second state. Alternatively, the photochromic-dichroic compound of the photochromic-dichroic layer can have a first color in the first state and a second color in the second state. Further, as discussed below in more detail, the photochromic-dichroic compound of the photochromic-dichroic layer can be non-linearly polarizing (or "non-polarizing") in the first state, and linearly polarizing in the second state.

As used herein the term "optical" means pertaining to or associated with light and/or vision. For example, according to various non-limiting embodiments disclosed herein, the optical article or element or device can be chosen from ophthalmic articles, elements and devices, display articles, elements and devices, windows, mirrors, and active and passive liquid crystal cell articles, elements and devices.

As used herein the term "ophthalmic" means pertaining to or associated with the eye and vision. Non-limiting examples of ophthalmic articles or elements include corrective and non-corrective lenses, including single vision or multi-vision lenses, which may be either segmented or non-segmented multi-vision lenses (such as, but not limited to, bifocal lenses, trifocal lenses and progressive lenses), as well as other elements used to correct, protect, or enhance (cosmetically or otherwise) vision, including without limitation, contact lenses, intra-ocular lenses, magnifying lenses, and protective lenses or visors.

As used herein the term "ophthalmic substrate" means lenses, partially formed lenses, and lens blanks.

As used herein the term "display" means the visible or machine-readable representation of information in words, numbers, symbols, designs or drawings. Non-limiting examples of display articles, elements and devices include screens, monitors, and security elements, such as security marks.

As used herein the term "window" means an aperture adapted to permit the transmission of radiation therethrough. Non-limiting examples of windows include automotive and aircraft transparencies, filters, shutters, and optical switches.

As used herein the term "mirror" means a surface that specularly reflects a large or substantial fraction of incident light.

As used herein the term "liquid crystal cell" refers to a structure containing a liquid crystal material that is capable of being ordered. Active liquid crystal cells are cells in which the liquid crystal material is capable of being reversibly and controllably switched or converted between ordered and disordered states, or between two ordered states by the application of an external force, such as electric or magnetic fields. Passive liquid crystal cells are cells in which the liquid crystal material maintains an ordered state. A non-limiting example of an active liquid crystal cell element or device is a liquid crystal display.

As used herein the term "coating" means a supported film derived from a flowable composition, which may or may not have a uniform thickness, and specifically excludes polymeric sheets. The primer layer, the photochromic-dichroic layer and the optional topcoat layer of the photochromic articles of the present invention can, in some embodiments, each independently be a coating.

As used herein the term "sheet" means a pre-formed film having a generally uniform thickness and capable of self-support.

As used herein the term "connected to" means in direct contact with an object or indirect contact with an object through one or more other structures or materials, at least one of which is in direct contact with the object. For purposes of non-limiting illustration, the primer layer, for example, can be in direct contact (e.g., abutting contact) with at least a portion of the substrate or it can be in indirect contact with at least a portion of the substrate through one or more other interposed structures or materials, such as a monomolecular layer of a coupling or adhesive agent. For example, although not limiting herein, the primer layer can be in contact with one or more other interposed coatings, polymer sheets or combinations thereof, at least one of which is in direct contact with at least a portion of the substrate.

As used herein, the term "photosensitive material" means materials that physically or chemically respond to electromagnetic radiation, including, but not limited to, phosphorescent materials and fluorescent materials.

As used herein, the term "non-photosensitive materials" means materials that do not physically or chemically respond to electromagnetic radiation, including, but not limited to, static dyes.

As used herein, molecular weight values of polymers, such as weight average molecular weights (Mw) and number average molecular weights (Mn), are determined by gel permeation chromatography using appropriate standards, such as polystyrene standards.

As used herein, polydispersity index (PDI) values represent a ratio of the weight average molecular weight (Mw) to the number average molecular weight (Mn) of the polymer (i.e., Mw/Mn).

As used herein, the term "polymer" means homopolymers (e.g., prepared from a single monomer species), copolymers (e.g., prepared from at least two monomer species), and graft polymers.

As used herein, the term "(meth)acrylate" and similar terms, such as "(meth)acrylic acid ester" means methacrylates and/or acrylates. As used herein, the term "(meth)acrylic acid" means methacrylic acid and/or acrylic acid.

Unless otherwise indicated, all ranges or ratios disclosed herein are to be understood to encompass any and all subranges or subratios subsumed therein. For example, a stated range or ratio of "1 to 10" should be considered to include any and all subranges between (and inclusive of) the minimum value of 1 and the maximum value of 10; that is, all subranges or subratios beginning with a minimum value of 1 or more and ending with a maximum value of 10 or less, such as but not limited to, 1 to 6.1, 3.5 to 7.8, and 5.5 to 10.

As used herein and in the claims, unless otherwise indicated, left-to-right representations of linking groups, such as divalent linking groups, are inclusive of other appropriate orientations, such as, but not limited to, right-to-left orientations. For purposes of non-limiting illustration, the left-to-right representation of the divalent linking group

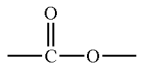

or equivalently —C(O)O—, is inclusive of the right-to-left representation thereof,

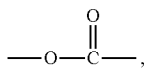

or equivalently —O(O)C— or —OC(O)—.

As used herein, the articles "a," "an," and "the" include plural referents unless otherwise expressly and unequivocally limited to one referent.

As used herein, the term "a first photochromic compound" means at least one photochromic compound. When two or more first photochromic compounds are present, they together have and provide a (e.g., an average) first peak absorbance wavelength, and a (e.g., an average) first terminal minimum absorbance wavelength.

As used herein, the term "a photochromic-dichroic compound" means at least one photochromic-dichroic compound. When two or more photochromic-dichroic compounds are present, they together have and provide a (e.g., an average) second peak absorbance wavelength, and a (e.g., an average) second terminal minimum absorbance wavelength.

As used herein, the term "a second photochromic compound" means at least one second photochromic compound. When two or more second photochromic compounds are present, they together have and provide a (e.g., an average) third peak absorbance wavelength, and a (e.g., an average) third terminal minimum absorbance wavelength.

As used herein, the term "a first peak absorbance wavelength" means the wavelength at which the first photochromic compound has a peak (or maximum) absorbance.

As used herein, the term "a first terminal minimum absorbance wavelength" means the wavelength at which the first photochromic compound has a terminal (or upper) minimum absorbance. The first terminal minimum absorbance wavelength is at higher wavelength than the first peak absorbance wavelength.

As used herein, the term "a second peak absorbance wavelength" means the wavelength at which the photochromic-dichroic compound has a peak (or maximum) absorbance.

As used herein, the term "a second terminal minimum absorbance wavelength" means the wavelength at which the photochromic-dichroic compound has a terminal (or upper) minimum absorbance. The second terminal minimum absorbance wavelength is at higher wavelength than the second peak absorbance wavelength.

As used herein, the term "a third peak absorbance wavelength" means the wavelength at which the second photochromic compound has a peak (or maximum) absorbance.

As used herein, the term "a third terminal minimum absorbance wavelength" means the wavelength at which the second photochromic compound has a terminal (or upper) minimum absorbance. The third terminal minimum absorbance wavelength is at higher wavelength than the third peak absorbance wavelength.

As used herein the term "linearly polarize" means to confine the vibrations of the electric vector of light waves to one direction or plane.

Other than in the operating examples, or where otherwise indicated, all numbers expressing quantities of ingredients, reaction conditions, and so forth used in the specification and claims are to be understood as modified in all instances by the term "about."

As used herein, spatial or directional terms, such as "left", "right", "inner", "outer", "above", "below", and the like, relate to the invention as it is depicted in the drawing figures. However, it is to be understood that the invention can assume various alternative orientations and, accordingly, such terms are not to be considered as limiting.

As used herein, the terms "formed over," "deposited over," "provided over," "applied over," residing over," or "positioned over," mean formed, deposited, provided, applied, residing, or positioned on but not necessarily in direct (or abutting) contact with the underlying element, or surface of the underlying element. For example, a layer "positioned over" a substrate does not preclude the presence of one or more other layers, coatings, or films of the same or different composition located between the positioned or formed layer and the substrate.

All documents, such as but not limited to issued patents and patent applications, referred to herein, and unless otherwise indicated, are to be considered to be "incorporated by reference" in their entirety.

With reference to FIG. 1, and for purposes of non-limiting illustration, a photochromic article 2 according to the present invention is depicted. Photochromic article 2 includes a substrate 11 having a first surface 12 and a second surface 13, in which the first 12 and second 13 surfaces are opposed to each other. First surface 12 of substrate 11 faces incident actinic radiation depicted by arrow 15. Photochromic article 2 further includes a primer layer 14 over (e.g., abutting) substrate 11 and in particular over (e.g., abutting) first surface 12 of substrate 11. Photochromic article 2 further includes a photochromic-dichroic layer 17 over primer layer 14, and an optional topcoat layer 20 over photochromic-dichroic layer 17. Photochromic article 2 of FIG. 1 includes other optional layers, which will be described further herein.

Primer layer 14 includes a first photochromic compound having absorbance properties represented by graph 23, which is a plot of absorbance vs. wavelength for the first photochromic compound. With reference to graph 23 of FIG. 1, the first photochromic compound has a first peak absorbance wavelength 26, and a first terminal minimum absorbance wavelength 29. The first terminal minimum absorbance wavelength 29 of the first photochromic compound is at higher wavelength than the first peak absorbance wavelength 26 thereof.

Photochromic-dichroic layer 17 of photochromic article 2 includes a photochromic-dichroic compound having absorbance properties represented by graph 32, which is a plot of absorbance vs. wavelength for the photochromic-dichroic compound. With reference to graph 32 of FIG. 1, the photochromic-dichroic compound has a second peak absorbance wavelength 35, and a second terminal minimum absorbance wavelength 38. The second terminal minimum absorbance wavelength 38 of the photochromic-dichroic compound is at higher wavelength than the second peak absorbance wavelength 35 thereof.

The optional topcoat layer 20 of photochromic article 2 can in some embodiments of the present invention include a second photochromic compound having absorbance properties represented by graph 41, which is a plot of absorbance vs. wavelength for the second photochromic compound. With reference to graph 41 of FIG. 1, the second photochromic compound has a third peak absorbance 44, and a third terminal minimum absorbance wavelength 47. The third terminal minimum absorbance wavelength 47 of the second photochromic compound is at higher wavelength than the third peak absorbance wavelength 44 thereof.

Graphs 23, 32, and 41 of FIG. 1 each depict absorbance as a function of wavelength from 300 nm to about 420 nm. As recited previously herein, FIG. 1, including graphs 23, 32, and 41, is referenced for purposes of non-limiting illustration. As such, the absorbance of the first photochromic compound, the photochromic-dichroic compound, and the second photochromic compound in each case is not limited to a wavelength range of 300 nm to 420 nm, as will be described in further detail herein.

As graphically depicted in FIG. 1, the second peak absorbance wavelength 35 of the photochromic-dichroic compound of photochromic-dichroic layer 17 is less than the first peak absorbance wavelength 26 of the first photochromic compound of the underlying primer layer 14. In addition, the second terminal minimum absorbance wavelength 38 of the photochromic-dichroic compound of the photochromic-dichroic layer is less than the first terminal minimum absorbance wavelength 29 of the first photochromic compound of the underlying primer layer.

The photochromic-dichroic compound of photochromic-dichroic layer 17 and the first photochromic compound of the underlying primer layer 14 are each selected so as to have the absorbance properties as described above. In addition they are selected such that the photochromic-dichroic compound has an absorbance of less than or equal to 0.1 at a wavelength corresponding or equivalent to the first peak absorbance wavelength 26 (i.e., at the first peak absorbance wavelength 26) of the first photochromic compound of the underlying primer layer 14. With some embodiments of the present invention, the photochromic-dichroic compound has an absorbance of less than or equal to 0.05, or less than or equal to 0.025, or less than or equal to 0.02, or less than or equal to 0.015, or less than or equal to 0.01 at the first peak absorbance wavelength 26 of the first photochromic compound of the underlying primer layer 14. With some further embodiments, the photochromic-dichroic compound has an absorbance of substantially zero at the first peak absorbance wavelength of the first photochromic compound of the underlying primer layer.

In accordance with the photochromic articles of the present invention, in which topcoat layer 20 is not present, or is present but does not include the second photochromic compound, incident actinic radiation, for example as depicted by arrow 15 in FIG. 1, passes through photochromic-dichroic layer 17 and is partially absorbed by the photochromic-dichroic compound thereof. The photochromic-dichroic compound and the first photochromic compound are each selected such that the positions of the second peak absorbance wavelength 35, and the second terminal minimum absorbance wavelength 38, relative to the first peak absorbance wavelength 26, result in the photochromic-dichroic compound having an absorbance of less than 0.1 at the first peak absorbance wavelength 26. This results in a minimum of absorbance of incident actinic radiation 15 by the photochromic-dichroic compound within photochromic-dichroic layer 17, relative to the first peak absorbance wavelength 26 of the first photochromic compound of the underlying primer layer 14. As such, conversion of the photochromic-dichroic compound of the photochromic-dichroic layer 17, and conversion of the first photochromic compound of the underlying primer layer 14, in each case to a colored or darkened state by exposure to the incident actinic radiation 15, is in each case substantially maximized. As a result, photochromic articles according to the present invention are typically darker when exposed to the same level of incident actinic radiation than comparative photochromic articles having, for example, a photochromic-dichroic layer containing a photochromic-dichroic compound in the absence of an underlying primer layer containing a first photochromic compound as described above.

With some embodiments of the present invention, the photochromic-dichroic compound and the first photochromic compound are each selected such that the second terminal minimum absorbance wavelength (e.g., 38 of the photochromic-dichroic compound of photochromic-dichroic layer 17) and the first peak absorbance wavelength (e.g., 26 of the first photochromic compound of primer layer 14) have minimal overlap there-between. With some further embodiments, there is no overlap between the second terminal minimum absorbance wavelength (e.g., 38 of the photochromic-dichroic compound of photochromic-dichroic layer 17) and the first peak absorbance wavelength (e.g., 26 of the first photochromic compound of primer layer 14).

In accordance with some embodiments, the second terminal minimum absorbance wavelength (e.g., 38 of the photochromic-dichroic compound of photochromic-dichroic layer 17) is less than or equal to a first overlap wavelength value calculated from the following Equation-(a1), $$\text{(the first peak absorbance wavelength)} \times 1.05 \qquad \text{Equation-(a1)}$$

For purposes of non-limiting illustration, if the first peak absorbance wavelength (of the first photochromic compound) is 400 nm, then the second terminal minimum absorbance wavelength (of the photochromic-dichroic compound) is less than or equal to 420 nm, as determined in accordance with Equation-(a1).

With some further embodiments of the present invention, the second terminal minimum absorbance wavelength (e.g., 38 of the photochromic-dichroic compound of photochromic-dichroic layer 17) is less than or equal to a first overlap wavelength value calculated from the following Equation-(a2), $$\text{(the first peak absorbance wavelength)} \times 1.025 \qquad \text{Equation-(a2)}$$

For purposes of non-limiting illustration, if the first peak absorbance wavelength (of the first photochromic compound) is 400 nm, then the second terminal minimum absorbance wavelength (of the photochromic-dichroic compound) is less than or equal to 410 nm, as determined in accordance with Equation-(a2).

In accordance with some further embodiments of the present invention, the second terminal minimum absorbance wavelength (e.g., 38 of the photochromic-dichroic compound of photochromic-dichroic layer 17) is less than or equal to the first peak absorbance wavelength (e.g., 26 of the first photochromic compound of primer layer 14). With additional embodiments, the second terminal minimum absorbance wavelength is less than the first peak absorbance wavelength, and correspondingly there is no overlap there-between.

The first peak absorbance wavelength, the first terminal minimum peak absorbance wavelength, the second peak absorbance wavelength, and the second terminal minimum wavelength can each independently be selected from any suitable range of wavelengths, such as wavelengths corresponding to ultraviolet light, visible light, infrared light, and combinations thereof. With some embodiments, the first peak absorbance wavelength, the first terminal minimum peak absorbance wavelength, the second peak absorbance wavelength, and the second terminal minimum wavelength are each independently selected from 300 nm to 780 nm, inclusive of the recited wavelength values.

In accordance with some further embodiments, the first peak absorbance wavelength, the first terminal minimum peak absorbance wavelength, the second peak absorbance wavelength, and the second terminal minimum wavelength are each independently selected from 300 nm to 500 nm, inclusive of the recited wavelength values.

According to some further embodiments of the present invention: the first peak absorbance wavelength (of the first photochromic compound of the primer layer) is selected from 400 nm to 420 nm, inclusive of the recited wavelength values; the second peak absorbance wavelength (of the photochromic dichroic compound of the photochromic-dichroic layer) is selected from 350 nm to 370 nm, inclusive of the recited wavelength values; and the second terminal minimum absorbance wavelength (of the photochromic dichroic compound of the photochromic-dichroic layer) is less than or equal to a first overlap wavelength value calculated from Equation-(a1), that is, (the first peak absorbance)×1.05, or Equation-(a2), that is, (the first peak absorbance)×1.025. With this embodiment, the second minimum absorbance wavelength has an upper limit of from 420 nm to 441 nm, or from 410 nm to 431 nm, in each case inclusive of the recited values. In accordance with this embodiment, the first terminal minimum absorbance wavelength (of the first photochromic compound of the primer layer) can, for example, be from greater than 420 nm to 450 nm.

With some embodiments of the present invention, the photochromic article, in addition to the primer layer and photochromic-dichroic layer as described above, further includes a topcoat layer (e.g., 20) that includes a second photochromic compound having a third peak absorbance wavelength (e.g., 44), and a third terminal minimum absorbance wavelength (e.g., 47), as described previously herein.

In accordance with the photochromic articles of the present invention, in which topcoat layer 20 is present and includes the second photochromic compound, incident actinic radiation, for example as depicted by arrow 15 in FIG. 1, passes through topcoat layer 20 and is partially absorbed by the second photochromic compound thereof. This is referred to herein as the at least three-layered embodiment. The second photochromic compound and the photochromic-dichroic compound are each selected such that the positions of the third peak absorbance wavelength 44, and the third terminal minimum absorbance wavelength 47, relative to the second peak absorbance wavelength 35, result in the second photochromic compound having an absorbance of less than or equal to 0.1 at the second peak absorbance wavelength 35. This results in a minimum of absorbance of incident actinic radiation 15 by the second photochromic compound within topcoat layer 20, relative to the second peak absorbance wavelength 35 of the photochromic-dichroic compound of the underlying photochromic-dichroic layer 17.

The second photochromic compound of topcoat layer 20 and the photochromic-dichroic compound of the underlying photochromic-dichroic layer 17 are each selected so as to have the absorbance properties as described above, and such that the second photochromic compound has an absorbance of less than or equal to 0.1 at a wavelength corresponding or equivalent to the second peak absorbance wavelength 35 (i.e., at the second peak absorbance wavelength 35) of the photochromic-dichroic compound of the underlying photochromic-dichroic layer 17. With some embodiments of the present invention, the second photochromic compound has an absorbance of less than or equal to 0.05, or less than or equal to 0.025, or less than or equal to 0.02, or less than or equal to 0.015, or less than or equal to 0.01 at the second peak absorbance wavelength 35 of the photochromic-dichroic compound of the underlying photochromic-dichroic layer 17. With some further embodiments, the second photochromic compound has an absorbance of substantially zero at the second peak absorbance wavelength of the photochromic-dichroic compound of the underlying photochromic-dichroic layer.

As the incident actinic radiation passes from topcoat layer 20, and further down through photochromic-dichroic layer 17 and primer layer 14, the relative absorbance as between the photochromic-dichroic compound and the underlying first photochromic compound is as described previously herein (e.g., the photochromic-dichroic compound has an absorbance of less than or equal to 0.1 at the first peak absorbance wavelength 26). As such, conversion of the second photochromic compound of topcoat layer 20, conversion of the photochromic-dichroic compound of the underlying photochromic-dichroic layer 17, and conversion of the first photochromic compound of the underlying primer layer 14, in each case to a colored or darkened state by exposure to the incident actinic radiation 15, is in each case substantially maximized. As a result, photochromic articles according to the present invention, having at least three photochromic layers, are typically darker when exposed to the same level of incident actinic radiation than comparative photochromic articles, for example, having a photochromic-dichroic layer containing a photochromic-dichroic compound in the absence of both of an overlaying topcoat having a second photochromic compound, and an underlying primer layer containing a first photochromic compound as described above.

With some embodiments of the present invention, the second photochromic compound and the photochromic-dichroic compound are each selected such that the third terminal minimum absorbance wavelength (e.g., 47 of the second photochromic compound of topcoat layer 20) and the second peak absorbance wavelength (e.g., 35 of the photochromic-dichroic compound of photochromic-dichroic layer 17) have minimal overlap there-between. With some further embodiments, there is no overlap between the third terminal minimum absorbance wavelength (e.g., 47 of the second photochromic compound of topcoat layer 20) and the second peak absorbance wavelength (e.g., 35 of the photochromic-dichroic compound of photochromic-dichroic layer 17).

In accordance with some embodiments, the third terminal minimum absorbance wavelength (e.g., 47 of the second photochromic compound of topcoat layer 20) is less than or equal to a second overlap wavelength value calculated from the following Equation-(b1), $$(\text{the second peak absorbance wavelength}) \times 1.05 \quad \text{Equation-(b1)}$$

For purposes of non-limiting illustration, if the second peak absorbance wavelength (of the photochromic-dichroic compound) is 360 nm, then the third terminal minimum absorbance wavelength (of the second photochromic compound) is less than or equal to 378 nm, as determined in accordance with Equation-(b1). The first overlap wavelength as between the second terminal minimum wavelength (of the photochromic-dichroic compound of the photochromic-dichroic layer) and the first peak absorbance wavelength (of the first photochromic compound of the underlying primer layer) can concurrently be determined with regard to Equation-(a1) as described above.

With some further embodiments of the present invention, the third terminal minimum absorbance wavelength (e.g., 47 of the second photochromic compound of topcoat layer 20) is less than or equal to a second overlap wavelength value calculated from the following Equation-(b2), (the second peak absorbance wavelength)×1.025    Equation-(b2)

For purposes of non-limiting illustration, if the second peak absorbance wavelength (of the photochromic-dichroic compound) is 360 nm, then the third terminal minimum absorbance wavelength (of the second photochromic compound) is less than or equal to 369 nm, as determined in accordance with Equation-(b2). The first overlap wavelength as between the second terminal minimum wavelength (e.g., 38 of the photochromic-dichroic compound of the photochromic-dichroic layer 17) and the first peak absorbance wavelength (e.g., 26 of the first photochromic compound of the underlying primer layer 14) can concurrently be determined with regard to Equation-(a2) as described above.

In accordance with some further embodiments of the present invention, the third terminal minimum absorbance wavelength (e.g., 47 of the second photochromic compound of topcoat layer 20) is less than or equal to the second peak absorbance wavelength (e.g., 35 of the photochromic-dichroic compound of photochromic-dichroic layer 17). With additional embodiments, the third terminal minimum absorbance wavelength is less than the second peak absorbance wavelength, and correspondingly there is no overlap therebetween. Concurrently, and as described previously herein, the second terminal minimum absorbance (e.g., 38 of the photochromic-dichroic compound of photochromic-dichroic layer 17) can be less than or equal to (or less than) the first peak absorbance wavelength (e.g., 26 of the first photochromic compound of the underlying primer layer 14).

With some embodiments of the present invention, when the topcoat layer is present and includes a second photochromic compound, the first peak absorbance wavelength, the first terminal minimum peak absorbance wavelength, the second peak absorbance wavelength, the second terminal minimum wavelength, the third peak absorbance wavelength, and the third terminal minimum absorbance wavelength can each independently be selected from any suitable range of wavelengths, such as wavelengths corresponding to ultraviolet light, visible light, infrared light, and combinations thereof. With some embodiments, the first peak absorbance wavelength, the first terminal minimum peak absorbance wavelength, the second peak absorbance wavelength, the second terminal minimum wavelength, the third peak absorbance wavelength, and the third terminal minimum absorbance wavelength are each independently selected from 300 nm to 780 nm, inclusive of the recited wavelength values.

With some embodiments of the present invention, when the topcoat layer is present and includes a second photochromic compound, the first peak absorbance wavelength, the first terminal minimum peak absorbance wavelength, the second peak absorbance wavelength, the second terminal minimum wavelength, the third peak absorbance wavelength, and the third terminal minimum wavelength are each independently selected from 300 nm to 500 nm, inclusive of the recited wavelength values.

In accordance with some further embodiments of the present invention, when the topcoat layer is present and includes a second photochromic compound: the first peak absorbance wavelength (of the first photochromic compound of the primer layer) is selected from 400 nm to 420 nm, inclusive of the recited wavelength values; the second peak absorbance wavelength (of the photochromic-dichroic compound of the photochromic-dichroic layer) is selected from 350 nm to 370 nm, inclusive of the recited wavelength values; the third peak absorbance wavelength (of the second photochromic compound of the topcoat layer) is selected from 310 nm to 330 nm, inclusive of the recited wavelength values. In addition, the second terminal minimum absorbance wavelength (of the photochromic-dichroic compound of the photochromic-dichroic layer) is less than or equal to a first overlap wavelength value calculated from Equation-(a1), that is, (the first peak absorbance wavelength)×1.05, or from Equation-(a2), that is, (the first peak absorbance wavelength)×1.025. Further additionally, the third terminal minimum absorbance wavelength (of the second photochromic compound of the topcoat layer) is less than or equal to a second overlap wavelength calculated from Equation-(b1), that is, (the second peak absorbance wavelength)×1.05, or from Equation-(b2), that is, (the second peak absorbance wavelength)×1.025.

With this embodiment, the third terminal minimum absorbance wavelength (of the second photochromic compound of the topcoat layer) has an upper limit of from 368 nm to 389 nm, or from 359 nm to 380 nm, in each case inclusive of the recited values. Additionally with this embodiment, the second terminal minimum absorbance wavelength (of the photochromic-dichroic compound of the photochromic-dichroic layer) has an upper limit of from 420 nm to 441 nm, or from 410 nm to 431 nm, in each case inclusive of the recited values. In accordance with this embodiment, the first terminal minimum absorbance wavelength (of the first photochromic compound of the primer layer) can, for example, be from greater than 420 nm to 450 nm, inclusive of the recited values.

Substrates from which the substrate of the photochromic articles of the present invention can be selected include, but are not limited to, substrates formed from organic materials, inorganic materials, or combinations thereof (for example, composite materials). Non-limiting examples of substrates that can be used in accordance with various non-limiting embodiments disclosed herein are described in more detail below.

Non-limiting examples of organic materials that can be used to form the substrate of the photochromic articles of the present invention, include polymeric materials, for example, homopolymers and copolymers, prepared from the monomers and mixtures of monomers disclosed in U.S. Pat. No. 5,962,617 and in U.S. Pat. No. 5,658,501 from column 15, line 28 to column 16, line 17, the disclosures of which U.S. patents are specifically incorporated herein by reference. For example, such polymeric materials can be thermoplastic or thermoset polymeric materials, can be transparent or optically clear, and can have any refractive index required. Non-limiting examples of such disclosed monomers and polymers include: polyol(allyl carbonate) monomers, e.g., allyl diglycol carbonates such as diethylene glycol bis(allyl carbonate), which monomer is sold under the trademark CR-39 by PPG Industries, Inc.; polyurea-polyurethane (polyurea-urethane)

polymers, which are prepared, for example, by the reaction of a polyurethane prepolymer and a diamine curing agent, a composition for one such polymer being sold under the trademark TRIVEX by PPG Industries, Inc.; polyol(meth)acryloyl terminated carbonate monomer; diethylene glycol dimethacrylate monomers; ethoxylated phenol methacrylate monomers; diisopropenyl benzene monomers; ethoxylated trimethylol propane triacrylate monomers; ethylene glycol bismethacrylate monomers; poly(ethylene glycol) bismethacrylate monomers; urethane acrylate monomers; poly(ethoxylated bisphenol A dimethacrylate); poly(vinyl acetate); poly(vinyl alcohol); poly(vinyl chloride); poly(vinylidene chloride); polyethylene; polypropylene; polyurethanes; polythiourethanes; thermoplastic polycarbonates, such as the carbonate-linked resin derived from bisphenol A and phosgene, one such material being sold under the trademark LEXAN; polyesters, such as the material sold under the trademark MYLAR; poly(ethylene terephthalate); polyvinyl butyral; poly(methyl methacrylate), such as the material sold under the trademark PLEXIGLAS, and polymers prepared by reacting polyfunctional isocyanates with polythiols or polyepisulfide monomers, either homopolymerized or co- and/or terpolymerized with polythiols, polyisocyanates, polyisothiocyanates and optionally ethylenically unsaturated monomers or halogenated aromatic-containing vinyl monomers. Also contemplated are copolymers of such monomers and blends of the described polymers and copolymers with other polymers, for example, to form block copolymers or interpenetrating network products.

The substrate can, with some embodiments, be an ophthalmic substrate. Non-limiting examples of organic materials suitable for use in forming ophthalmic substrates include, but are not limited to, the art-recognized polymers that are useful as ophthalmic substrates, such as organic optical resins that are used to prepare optically clear castings for optical applications, such as ophthalmic lenses.

Other non-limiting examples of organic materials suitable for use in forming the substrate of the photochromic articles of the present invention include both synthetic and natural organic materials, including without limitation: opaque or transluscent polymeric materials, natural and synthetic textiles, and cellulosic materials such as, paper and wood.

Non-limiting examples of inorganic materials suitable for use in forming the substrate of the photochromic articles of the present invention include glasses, minerals, ceramics, and metals. For example, in one non-limiting embodiment the substrate can include glass. In other non-limiting embodiments, the substrate can have a reflective surface, for example, a polished ceramic substrate, metal substrate, or mineral substrate. In other non-limiting embodiments, a reflective coating or layer can be deposited or otherwise applied to a surface of an inorganic or an organic substrate to make it reflective or to enhance its reflectivity.

Further, according to certain non-limiting embodiments disclosed herein, the substrate can have a protective coating, such as, but not limited to, an abrasion-resistant coating, such as a "hard coat," on its exterior surfaces. For example, commercially available thermoplastic polycarbonate ophthalmic lens substrates are often sold with an abrasion-resistant coating already applied to its exterior surfaces because these surfaces tend to be readily scratched, abraded or scuffed. An example of such a lens substrate is the GENTEX™ polycarbonate lens (available from Gentex Optics). Therefore, as used herein the term "substrate" includes a substrate having a protective coating, such as but not limited to an abrasion-resistant coating, on its surface(s).

Still further, the substrate of the photochromic article of the present invention can be untinted, tinted, linearly polarizing, circularly polarizing, elliptically polarizing, photochromic, or tinted-photochromic substrates. As used herein with reference to substrates the term "untinted" means substrates that are essentially free of coloring agent additions (such as, but not limited to, conventional dyes) and have an absorption spectrum for visible radiation that does not vary significantly in response to actinic radiation. Further, with reference to substrates the term "tinted" means substrates that have a coloring agent addition (such as, but not limited to, conventional dyes) and an absorption spectrum for visible radiation that does not vary significantly in response to actinic radiation.

As used herein the term "linearly polarizing" with regard to the substrate means substrates that are adapted to linearly polarize radiation. As used herein the term "circularly polarizing" with regard to the substrate means substrates that are adapted to circularly polarize radiation. As used herein the term "elliptically polarizing" with regard to the substrate means substrates that are adapted to elliptically polarize radiation. As used herein with the term "photochromic" with regard to the substrate means substrates having an absorption spectrum for visible radiation that varies in response to at least actinic radiation. Further, as used herein with regard to the substrate, the term "tinted-photochromic" means substrates containing a coloring agent addition as well as a photochromic material, and having an absorption spectrum for visible radiation that varies in response to at least actinic radiation. Thus, for example and without limitation, a tinted-photochromic substrate can have a first color characteristic of the coloring agent and a second color characteristic of the combination of the coloring agent the photochromic material when exposed to actinic radiation.

The photochromic articles of the present invention include a photochromic-dichroic layer that further includes a photochromic-dichroic compound. The photochromic-dichroic layer can, in some embodiments, be non-polarizing in a first state (that is, the coating will not confine the vibrations of the electric vector of light waves to one direction), and be linearly polarizing in a second state with regard to transmitted radiation. As used herein the term "transmitted radiation" refers to radiation that is passed through at least a portion of an object. Although not limiting herein, the transmitted radiation can be ultraviolet radiation, visible radiation, infrared radiation, or a combination thereof. Thus, according to various non-limiting embodiments disclosed herein, the photochromic-dichroic layer can be non-polarizing in the first state and linearly polarizing transmitted ultraviolet radiation, transmitted visible radiation, or a combination thereof in the second state.

According to still other non-limiting embodiments, the photochromic-dichroic layer can have a first absorption spectrum in the first state, a second absorption spectrum in the second state, and can be linearly polarizing in both the first and second states.

With some embodiments, the photochromic-dichroic layer can have an average absorption ratio of at least 1.5 in at least one state. With some further embodiments, the photochromic-dichroic layer can have an average absorption ratio ranging from at least 1.5 to 50 (or greater) in at least one state. The term "absorption ratio" refers to the ratio of the absorbance of radiation linearly polarized in a first plane to the absorbance of radiation linearly polarized in a plane orthogonal to the first plane, in which the first plane is taken as the plane with the highest absorbance. Thus, the absorption ratio (and the average absorption ratio which is described below) is an indication of how strongly one of two orthogonal plane polarized components of radiation is absorbed by an object or material.

The average absorption ratio of a photochromic-dichroic layer that includes a photochromic-dichroic compound can be determined as set forth below. For example, to determine the average absorption ratio of a photochromic-dichroic layer that includes a photochromic-dichroic compound, a substrate having a coating is positioned on an optical bench and the coating is placed in a linearly polarizing state by activation of the photochromic-dichroic compound. Activation is achieved by exposing the coating to UV radiation for a time sufficient to reach a saturated or near saturated state (that is, a state wherein the absorption properties of the coating do not substantially change over the interval of time during which the measurements are made). Absorption measurements are taken over a period of time (typically 10 to 300 seconds) at 3 second intervals for light that is linearly polarized in a plane perpendicular to the optical bench (referred to as the 0° polarization plane or direction) and light that is linearly polarized in a plane that is parallel to the optical bench (referred to as the 90° polarization plane or direction) in the following sequence: 0°, 90°, 90°, 0° etc. The absorbance of the linearly polarized light by the coating is measured at each time interval for all of the wavelengths tested and the unactivated absorbance (i.e., the absorbance of the coating in an unactivated state) over the same range of wavelengths is subtracted to obtain absorption spectra for the coating in an activated state in each of the 0° and 90° polarization planes to obtain an average difference absorption spectrum in each polarization plane for the coating in the saturated or near-saturated state.

Figure 2:
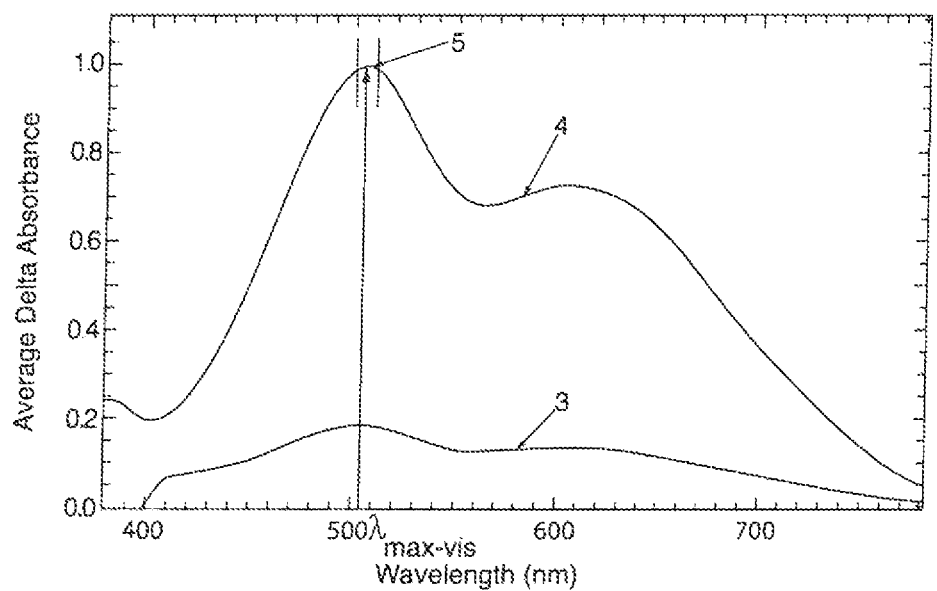
FIG. 2 is a graphical representation of average delta absorbance as a function of wavelength, and depicts two average difference absorption spectra obtained for a photochromic-dichroic layer that includes a photochromic-dichroic compound that can be included in the photochromic articles of the present invention.

For example, with reference to FIG. 2, there is shown the average difference absorption spectrum (generally indicated 4) in one polarization plane that was obtained for a photochromic-dichroic layer according to one non-limiting embodiment disclosed herein. The average absorption spectrum (generally indicated 3) is the average difference absorption spectrum obtained for the same photochromic-dichroic layer in the orthogonal polarization plane.

Based on the average difference absorption spectra obtained for the photochromic-dichroic layer, the average absorption ratio for the photochromic-dichroic layer is obtained as follows. The absorption ratio of the photochromic-dichroic layer at each wavelength in a predetermined range of wavelengths corresponding to $\lambda_{max-vis}+/-5$ nanometers (generally indicated as 5 in FIG. 2), wherein $\lambda_{max-vis}$ is the wavelength at which the coating had the highest average absorbance in any plane, is calculated according to the following equation (Eq. 1):

$$AR_{\lambda,i} = Ab^1_{\lambda,i}/Ab^2_{\lambda,i} \qquad \text{Eq. 1}$$

With reference to equation Eq. 1, is the absorption ratio at wavelength $\lambda_i$, $Ab^1_{\lambda,i}$ is the average absorption at wavelength $\lambda_i$ in the polarization direction (i.e., 0° or 90°) having the higher absorbance, and $Ab^2_{\lambda,i}$ is the average absorption at wavelength $\lambda_i$ in the remaining polarization direction. As previously discussed, the "absorption ratio" refers to the ratio of the absorbance of radiation linearly polarized in a first plane to the absorbance of the same wavelength radiation linearly polarized in a plane orthogonal to the first plane, wherein the first plane is taken as the plane with the highest absorbance.

The average absorption ratio ("AR") for the photochromic-dichroic layer is then calculated by averaging the individual absorption ratios over the predetermined range of wavelengths (i.e., $\lambda_{max-vis}+/-5$ nanometers) according to the following equation (Eq. 2):

$$AR = (\Sigma AR_{\lambda,i})/n_i \qquad \text{Eq. 2}$$

With reference to equation Eq. 2, AR is average absorption ratio for the coating, $AR_{\lambda,i}$ are the individual absorption ratios (as determined above in Eq. 1) for each wavelength within the predetermined range of wavelengths, and $n_i$ is the number of individual absorption ratios averaged. A more detailed description of this method of determining the average absorption ratio is provided in the Examples of U.S. Pat. No. 7,256,921 at column 102, line 38 through column 103, line 15, the disclosure of which is specifically incorporated herein by reference.

With some embodiments, the photochromic-dichroic compound of the photochromic-dichroic layer can be at least partially aligned. As previously discussed, the term "photochromic-dichroic" means displaying both photochromic and dichroic (i.e., linearly polarizing) properties under certain conditions, which properties are at least detectible by instrumentation. Accordingly, "photochromic-dichroic compounds" are compounds displaying both photochromic and dichroic (i.e., linearly polarizing) properties under certain conditions, which properties are at least detectible by instrumentation. Thus, photochromic-dichroic compounds have an absorption spectrum for at least visible radiation that varies in response to at least actinic radiation and are capable of absorbing one of two orthogonal plane polarized components of at least transmitted radiation more strongly than the other. Additionally, as with conventional photochromic compounds discussed above, the photochromic-dichroic compounds disclosed herein can be thermally reversible. That is, the photochromic-dichroic compounds can switch from a first state to a second state in response to actinic radiation and revert back to the first state in response to thermal energy. As used herein the term "compound" means a substance formed by the union of two or more elements, components, ingredients, or parts and includes, without limitation, molecules and macromolecules (for example polymers and oligomers) formed by the union of two or more elements, components, ingredients, or parts.

For example, the photochromic-dichroic layer can have a first state having a first absorption spectrum, a second state having a second absorption spectrum that is different from the first absorption spectrum, and can be adapted to switch from the first state to the second state in response to at least actinic radiation and to revert back to the first state in response to thermal energy. Further, the photochromic-dichroic compound can be dichroic (i.e., linearly polarizing) in one or both of the first state and the second state. For example, although not required, the photochromic-dichroic compound can be linearly polarizing in an activated state and non-polarizing in the bleached or faded (i.e., not activated) state. As used herein, the term "activated state" refers to the photochromic-dichroic compound when exposed to sufficient actinic radiation to cause the at least a portion of the photochromic-dichroic compound to switch from a first state to a second state. Further, although not required, the photochromic-dichroic compound can be dichroic in both the first and second states. While not limiting herein, for example, the photochromic-dichroic compound can linearly polarize visible radiation in both the activated state and the bleached state. Further, the photochromic-dichroic compound can linearly polarize visible radiation in an activated state, and can linearly polarize UV radiation in the bleached state.

Although not required, according to various non-limiting embodiments disclosed herein, the photochromic-dichroic compound of the photochromic-dichroic layer can have an average absorption ratio of at least 1.5 in an activated state as determined according to the CELL METHOD. According to other non-limiting embodiments disclosed herein, the at least one photochromic-dichroic compound can have an average absorption ratio greater than 2.3 in an activated state as determined according to the CELL METHOD. According to still other non-limiting embodiments, the at least partially aligned photochromic-dichroic compound of the photochromic-dichroic layer can have an average absorption ratio ranging from 1.5 to 50 in an activated state as determined according to the CELL METHOD. According to other non-limiting embodiments, the at least partially aligned photochromic-dichroic compound of the photochromic-dichroic layer can have an average absorption ratio ranging from 4 to 20, can further having an average absorption ratio ranging from 3 to 30, and can still further having an average absorption ratio ranging from 2.5 to 50 in an activated state as determined according to the CELL METHOD. More typically, however, the average absorption ratio of the at least partially aligned photochromic-dichroic compound can be any average absorption ratio that is sufficient to impart the desired properties to the photochromic article of the present invention. Non-limiting examples of suitable photochromic-dichroic compounds are described in detail herein below.

The CELL METHOD for determining the average absorption ratio of the photochromic-dichroic compound is essentially the same as the method used to determine the average absorption ratio of the photochromic-dichroic layer, except that, instead of measuring the absorbance of a coated substrate, a cell assembly containing an aligned liquid crystal material and the photochromic-dichroic compound is tested. More specifically, the cell assembly includes two opposing glass substrates that are spaced apart by 20 microns+/−1 micron. The substrates are sealed along two opposite edges to form a cell. The inner surface of each of the glass substrates is coated with a polyimide coating, the surface of which has been at least partially ordered by rubbing. Alignment of the photochromic-dichroic compound is achieved by introducing the photochromic-dichroic compound and the liquid crystal medium into the cell assembly, and allowing the liquid crystal medium to align with the rubbed polyimide surface. Once the liquid crystal medium and the photochromic-dichroic compound are aligned, the cell assembly is placed on an optical bench (which is described in detail in the Examples) and the average absorption ratio is determined in the manner previously described for the coated substrates, except that the unactivated absorbance of the cell assembly is subtracted from the activated absorbance to obtain the average difference absorption spectra.

As previously discussed, while dichroic compounds are capable of preferentially absorbing one of two orthogonal components of plane polarized light, it is generally necessary to suitably position or arrange the molecules of a dichroic compound in order to achieve a net linear polarization effect. Similarly, it is generally necessary to suitably position or arrange the molecules of a photochromic-dichroic compound to achieve a net linear polarization effect. That is, it is generally necessary to align the molecules of the photochromic-dichroic compound such that the long axis of the molecules of the photochromic-dichroic compound in an activated state are generally parallel to each other. Therefore, as discussed above, according to various non-limiting embodiments disclosed herein, the photochromic-dichroic compound is at least partially aligned. Further, if the activated state of the photochromic-dichroic compound corresponds to a dichroic state of the material, the photochromic-dichroic compound can be at least partially aligned such that the long axis of the molecules of the photochromic-dichroic compound in the activated state are aligned. As used herein the term "align" means to bring into suitable arrangement or position by interaction with another material, compound or structure.

Further, although not limiting herein, the photochromic-dichroic layer of the photochromic article of the present invention can include a plurality of photochromic-dichroic compounds. Although not limiting herein, when two or more photochromic-dichroic compounds are used in combination, the photochromic-dichroic compounds can be chosen to complement one another to produce a desired color or hue. For example, mixtures photochromic-dichroic compounds can be used according to certain non-limiting embodiments disclosed herein to attain certain activated colors, such as a near neutral gray or near neutral brown. See, for example, U.S. Pat. No. 5,645,767, column 12, line 66 to column 13, line 19, the disclosure of which is specifically incorporated by reference herein, which describes the parameters that define neutral gray and brown colors. Additionally or alternatively, the at least partial coating can comprise mixtures of photochromic-dichroic compounds having complementary linear polarization states. For example, the photochromic-dichroic compounds can be chosen to have complementary linear polarization states over a desired range of wavelengths to produce an optical element that is capable of polarizing light over the desired range of wavelengths. Still further, mixtures of complementary photochromic-dichroic compounds having essentially the same polarization states at the same wavelengths can be chosen to reinforce or enhance the overall linear polarization achieved. For example, according to one non-limiting embodiment, the photochromic-dichroic layer can include at least two at least partially aligned photochromic-dichroic compounds, in which each at least partially aligned photochromic-dichroic compounds have: complementary colors; and/or complementary linear polarization states.

The photochromic-dichroic layer can further include at least one additive that may facilitate one or more of the processing, the properties, or the performance of the at least partial coating. Non-limiting examples of such additives include dyes, alignment promoters, kinetic enhancing additives, photoinitiators, thermal initiators, polymerization inhibitors, solvents, light stabilizers (such as, but not limited to, ultraviolet light absorbers and light stabilizers, such as hindered amine light stabilizers (HALS)), heat stabilizers, mold release agents, rheology control agents, leveling agents (such as, but not limited to, surfactants), free radical scavengers, and adhesion promoters (such as hexanediol diacrylate and coupling agents).

Examples of dyes that can be present in the photochromic-dichroic layer include, but are not limited to, organic dyes that are capable of imparting a desired color or other optical property to the photochromic-dichroic layer.

As used herein, the term "alignment promoter" means an additive that can facilitate at least one of the rate and uniformity of the alignment of a material to which it is added. Non-limiting examples of alignment promoters that can be present in the photochromic-dichroic layer include, but are not limited to, those described in U.S. Pat. No. 6,338,808 and U.S. Patent Publication No. 2002/0039627, which are hereby specifically incorporated by reference herein.

Non-limiting examples of kinetic enhancing additives that can be present in the various layers of the photochromic article of the present invention, such as the photochromic-dichroic layer, include epoxy-containing compounds, organic polyols, and/or plasticizers. More specific examples of such kinetic enhancing additives are disclosed in U.S. Pat.

No. 6,433,043 and U.S. Patent Publication No. 2003/0045612, which are hereby specifically incorporated by reference herein.

Non-limiting examples of photoinitiators that can be present in the various layers of the photochromic article of the present invention, such as the primer layer, the photochromic-dichroic layer, and/or the topcoat layer, include, but are not limited to, cleavage-type photoinitiators and abstraction-type photoinitiators. Non-limiting examples of cleavage-type photoinitiators include acetophenones, α-aminoalkylphenones, benzoin ethers, benzoyl oximes, acylphosphine oxides and bisacylphosphine oxides or mixtures of such initiators. A commercial example of such a photoinitiator is DAROCURE® 4265, which is available from Ciba Chemicals, Inc. Non-limiting examples of abstraction-type photoinitiators include benzophenone, Michler's ketone, thioxanthone, anthraquinone, camphorquinone, fluorone, ketocoumarin or mixtures of such initiators.

Another non-limiting example of a photoinitiator that can be present in one or more of the layers of the photochromic article of the present invention, such as the primer layer, the photochromic-dichroic layer, and/or the topcoat layer, is a visible light photoinitiator. Non-limiting examples of suitable visible light photoinitiators are set forth at column 12, line 11 to column 13, line 21 of U.S. Pat. No. 6,602,603, which is specifically incorporated by reference herein.

Examples of thermal initiators include, but are not limited to, organic peroxy compounds and azobis(organonitrile) compounds. Examples of organic peroxy compounds that are useful as thermal initiators include, but are not limited to, peroxymonocarbonate esters, such as tertiarybutylperoxy isopropyl carbonate; peroxydicarbonate esters, such as di(2-ethylhexyl) peroxydicarbonate, di(secondary butyl) peroxydicarbonate and diisopropylperoxydicarbonate; diacyperoxides, such as 2,4-dichlorobenzoyl peroxide, isobutyryl peroxide, decanoyl peroxide, lauroyl peroxide, propionyl peroxide, acetyl peroxide, benzoyl peroxide and p-chlorobenzoyl peroxide; peroxyesters such as t-butylperoxy pivalate, t-butylperoxy octylate and t-butylperoxyisobutyrate; methylethylketone peroxide, and acetylcyclohexane sulfonyl peroxide. In one non-limiting embodiment the thermal initiators used are those that do not discolor the resulting polymerizate. Examples of azobis(organonitrile) compounds that can be used as thermal initiators include, but are not limited to, azobis(isobutyronitrile), azobis(2,4-dimethylvaleronitrile) or a mixture thereof.

Examples of polymerization inhibitors include, but are not limited to: nitrobenzene, 1,3,5,-trinitrobenzene, p-benzoquinone, chloranil, DPPH, $FeCl_3$, $CuCl_2$, oxygen, sulfur, aniline, phenol, p-dihydroxybenzene, 1,2,3-trihydroxybenzene, and 2,4,6-trimethylphenol.

Examples of solvents that can be present in forming the various layers of the photochromic articles of the present invention, such as the primer layer, the photochromic-dichroic layer, and/or the topcoat layer, include, but are not limited to, those that will dissolve solid components of the coating, that are compatible with the coating and the elements and substrates, and/or can ensure uniform coverage of the exterior surface(s) to which the coating is applied. Examples of solvents include, but are not limited to, the following: propylene glycol monomethyl ether acetate and their derivates (sold as DOWANOL® industrial solvents), acetone, amyl propionate, anisole, benzene, butyl acetate, cyclohexane, dialkyl ethers of ethylene glycol, e.g., diethylene glycol dimethyl ether and their derivates (sold as CELLOSOLVE® industrial solvents), diethylene glycol dibenzoate, dimethyl sulfoxide, dimethyl formamide, dimethoxybenzene, ethyl acetate, isopropyl alcohol, methyl cyclohexanone, cyclopentanone, methyl ethyl ketone, methyl isobutyl ketone, methyl propionate, propylene carbonate, tetrahydrofuran, toluene, xylene, 2-methoxyethyl ether, 3-propylene glycol methyl ether, and mixtures thereof.

In another non-limiting embodiment, the photochromic-dichroic layer can include at least one conventional dichroic compound. Examples of suitable conventional dichroic compounds include, but are not limited to, azomethines, indigoids, thioindigoids, merocyanines, indans, quinophthalonic dyes, perylenes, phthaloperines, triphenodioxazines, indoloquinoxalines, imidazo-triazines, tetrazines, azo and (poly) azo dyes, benzoquinones, naphthoquinones, anthroquinone and (poly)anthraquinones, anthropyrimidinones, iodine and iodates. In another non-limiting embodiment, the dichroic material can include at least one reactive functional group that is capable of forming at least one covalent bond with another materials. With some embodiments, the dichroic material can be a polymerizable dichroic compound, Correspondingly, the dichroic material can include at least one group that is capable of being polymerized (i.e., a "polymerizable group"). For example, although not limiting herein, in one non-limiting embodiment the dichroic compound can have at least one alkoxy, polyalkoxy, alkyl, or polyalkyl substituent terminated with at least one polymerizable group.

With some embodiments, the photochromic-dichroic layer can include at least one conventional photochromic compound. As used herein, the term "conventional photochromic compound" includes both thermally reversible and non-thermally reversible (or photo-reversible) photochromic compounds. Generally, although not limiting herein, when two or more conventional photochromic materials are used in combination with each other or with a photochromic-dichroic compound, the various materials can be chosen to complement one another to produce a desired color or hue. For example, mixtures of photochromic compounds can be used according to certain non-limiting embodiments disclosed herein to attain certain activated colors, such as a near neutral gray or near neutral brown. See, for example, U.S. Pat. No. 5,645,767, column 12, line 66 to column 13, line 19, the disclosure of which is specifically incorporated by reference herein, which describes the parameters that define neutral gray and brown colors.

In accordance with some embodiments, the photochromic-dichroic layer is free of conventional photochromic compounds.

The photochromic-dichroic layer can include one or more suitable photochromic-dichroic compounds. Examples of photochromic-dichroic compounds that can be included in the photochromic-dichroic layer of the photochromic articles of the present invention include, but are not limited to, the following:

(PCDC-1) 3-phenyl-3-(4-(4-(3-piperidin-4-yl-propyl)piperidino)phenyl)-13,13-dimethyl-indeno[2',3':3,4]-naphtho[1,2-b]pyran;

(PCDC-2) 3-phenyl-3-(4-(4-(3-(1-(2-hydroxyethyl)piperidin-4-yl)propyl)piperidino)phenyl)-13,13-dimethyl-indeno[2',3':3,4]naphtho[1,2-b]pyran;

(PCDC-3) 3-phenyl-3-(4-(4-(4-butyl-phenylcarbamoyl)-piperidin-1-yl)phenyl)-13,13-dimethyl-6-methoxy-7-(4-phenyl-piperazin-1-yl)indeno[2',3':3,4]naphtho[1,2-b]pyran;

(PCDC-4) 3-phenyl-3-(4-([1,4]bipiperidinyl-1'-yl)phenyl)-13,13-dimethyl-6-methoxy-7-([1,4]bipiperidinyl-1'-yl)indeno[2',3':3,4]naphtho[1,2-b]pyran;

(PCDC-5) 3-phenyl-3-(4-(4-phenyl-piperazin-1-Dphenyl)-13,13-dimethyl-6-methoxy-7-(4-(4-hexylbenzoyloxy)-piperidin-1-yl)indeno[2',3':3,4]naphtho[1,2-b]pyran;

(PCDC-6) 3-phenyl-3-(4-(4-phenyl-piperazin-1-yl)phenyl)-13,13-dimethyl-6-methoxy-7-(4-(4'-octyloxy-biphenyl-4-carbonyloxy)-piperidin-1-yl)indeno[2',3':3,4]naphtho[1,2-b]pyran;

(PCDC-7) 3-phenyl-3-(4-(4-phenyl-piperazin-1-yl)phenyl)-13,13-dimethyl-6-methoxy-7-{4-[17-(1,5-dimethyl-hexyl)-10,13-dimethyl-2,3,4,7,8,9,10,11,12,13,14,15,16,17-tetradecahydro-1H-cyclopenta[a]phenanthren-3-yloxycarbonyloxy]-piperidin-1-yl}-indeno[2',3':3,4]naphtho[1,2-b]pyran;

(PCDC-8) 3-phenyl-3-(4-{4-[17-(1,5-dimethyl-hexyl)-10,13-dimethyl-2,3,4,7,8,9,10,11,12,13,14,15,16,17-tetradecahydro-1H-cyclopenta[a]phenanthren-3-yloxycarbonyloxy]-piperidin-1-yl}-phenyl)-13,13-dimethyl-6-methoxy-7-{4-[17-(1,5-dimethyl-hexyl)-10,13-dimethyl-2,3,4,7,8,9,10,11,12,13,14,15,16,17-tetradecahydro-1H-cyclopenta[a]phenanthren-3-yloxycarbonyloxy]-piperidin-1-yl}-)indeno[2',3':3,4]naphtho[1,2-b]pyran;

(PCDC-9) 3-phenyl-3-(4-(4-phenylpiperazin-1-yl)phenyl)-13,13-dimethyl-6-methoxy-7-(4-(4-(4'-octyloxy-biphenyl-4-carbonyloxy)phenyl)piperazin-1-yl)indeno[2',3':3,4]naphtho[1,2-b]pyran;

(PCDC-10) 3-phenyl-3-(4-(4-phenyl-piperazin-1-yl)phenyl)-13,13-dimethyl-6-methoxy-7-(4-(4-(4-hexyloxyphenylcarbonyloxy)phenyl)piperazin-1-yl)indeno[2',3':3,4]naphtho[1,2-b]pyran;

(PCDC-11) 3-phenyl-3-(4-(4-phenyl-piperazin-1-yl)phenyl)-13,13-dimethyl-6-methoxy-7-(4-(4-(4-(2-fluorobenzoyloxy)benzoyloxy)phenyl)piperazin-1-yl)indeno[2',3':3,4]naphtho[1,2-b]pyran;

(PCDC-12) 3-phenyl-3-(4-(pyrrolidin-1-yl)phenyl)-13-hydroxy-13-ethyl-6-methoxy-7-(4-(4-(4-hexylbenzoyloxy)phenyl)piperazin-1-yl)indeno[2',3':3,4]naphtho[1,2-b]pyran;

(PCDC-13) 3-phenyl-3-(4-(pyrrolidin-1-yl)phenyl)-13,13-dimethyl-6-methoxy-7-(4-(4-hexylbenzoyloxy)benzoyloxy)-indeno[2',3':3,4]naphtho[1,2-b]pyran;

(PCDC-14) 3-phenyl-3-(4-(pyrrolidin-1-yl)phenyl)-13,13-dimethyl-6-methoxy-7-(4-(4-(4-hexylbenzoyloxy)benzoyloxy)benzoyloxy)indeno[2',3':3,4]naphtho[1,2-b]pyran;

(PCDC-15) 3-phenyl-3-(4-(4-methoxyphenyl)-piperazin-1-yl))phenyl)-13,13-dimethyl-6-methoxy-7-(4-(4-(3-phenylprop-2-ynoyloxy)phenyl)piperazin-1-yl)-indeno[2',3':3,4]naphtho[1,2-b]pyran;

(PCDC-16) 3-(4-methoxyphenyl)-3-(4-(4-methoxyphenyl)piperazin-1-yl)phenyl)-13-ethyl-13-hydroxy-6-methoxy-7-(4-(4-(4-hexylbenzoyloxy)phenyl)piperazin-1-yl)indeno[2',3':3,4]naphtho[1,2-b]pyran;

(PCDC-17) 3-phenyl-3-{4-(pyrrolidin-1-yl)phenyl)-13-[17-(1,5-dimethyl-hexyl)-10,13-dimethyl-2,3,4,7,8,9,10,11,12,13,14,15,16,17-tetradecahydro-1H-cyclopenta[a]phenanthren-3-yloxy]-13-ethyl-6-methoxy-7-(4-[17-(1,5-dimethyl-hexyl)-10,13-dimethyl-2,3,4,7,8,9,10,11,12,13,14,15,16,17-tetradecahydro-1H-cyclopenta[a]phenanthren-3-yloxycarbonyloxy]-piperadin-1-yl)-indeno[2',3':3,4]naphtho[1,2-b]pyran;

(PCDC-18) 3-phenyl-3-(4-{4-[17-(1,5-dimethyl-hexyl)-10,13-dimethyl-2,3,4,7,8,9,10,11,12,13,14,15,16,17-tetradecahydro-1H-cyclopenta[a]phenanthren-3-yloxycarbonyloxy]-piperidin-1-yl}-phenyl)-13-ethyl-13-hydroxy-6-methoxy-7-{4-[17-(1,5-dimethyl-hexyl)-10,13-dimethyl-2,3,4,7,8,9,10,11,12,13,14,15,16,17-tetradecahydro-1H-cyclopenta[a]phenanthren-3-yloxycarbonyloxy]-piperidin-1-yl}-)indeno[2',3':3,4]naphtho[1,2-b]pyran;

(PCDC-19) 3-phenyl-3-{4-(pyrrolidin-1-yl)phenyl)-13,13-dimethyl-6-methoxy-7-(4-(4-(4-(3-phenyl-3-{4-(pyrrolidin-1-yl)phenyl}-13,13-dimethyl-6-methoxy-indeno[2',3':3,4]naphtho[1,2-b]pyran-7-yl)-piperadin-1-yl)oxycarbonyl)phenyl)phenyl)cabonyloxy)-indeno[2',3':3,4]naphtho[1,2-b]pyran;

(PCDC-20) 3-{4-[4-(4-methoxy-phenyl)-piperazin-1-yl]-phenyl}-3-phenyl-7-methoxycarbonyl-3H-naphtho[2,1-b]pyran;

(PCDC-21) 3-{4-[4-(4-methoxy-phenyl)-piperazin-1-yl]-phenyl}-3-phenyl-7-hydroxycarbonyl-3H-naphtho[2,1-b]pyran;

(PCDC-22) 3-{(4-[4-(4-methoxy-phenyl)-piperazin-1-yl]-phenyl}-3-phenyl-7-(4-phenyl-(phen-1-oxy)carbonyl)-3H-naphtho[2,1-b]pyran;

(PCDC-23) 3-{4-[4-(4-methoxy-phenyl)-piperazin-1-yl]-phenyl}-3-phenyl-7-(N-(4-((4-dimethylamino)phenyl)diazenyl)phenyl)carbamoyl-3H-naphtho[2,1-b]pyran;

(PCDC-24) 2-phenyl-2-{4-[4-(4-methoxy-phenyl)-piperazin-1-yl]-phenyl}-benzofuro[3',2':7,8]benzo[b]pyran;

(PCDC-25) 2-phenyl-2-{4-[4-(4-methoxy-phenyl)-piperazin-1-yl]-phenyl}-benzothieno[3',2':7,8]benzo[b]pyran;

(PCDC-26) 7-{17-(1,5-dimethyl-hexyl)-10,13-dimethyl-2,3,4,7,8,9,10,11,12,13,14,15,16,17-tetradecahydro-1H-cyclopenta[a]phenanthren-3-yloxycarbonyloxy}-2-phenyl-2-(4-pyrrolidin-1-yl-phenyl)-6-methoxycarbonyl-2H-benzo[b]pyran;

(PCDC-27) 2-phenyl-2-{4-[4-(4-methoxy-phenyl)-piperazin-1-yl]-phenyl}-9-hydroxy-8-methoxycarbonyl-2H-naphtho[1,2-b]pyran;

(PCDC-28) 2-phenyl-2-{4-[4-(4-methoxy-phenyl)-piperazin-1-yl]-phenyl}-9-hydroxy-8-(N-(4-butyl-phenyl))carbamoyl-2H-naphtho[1,2-b]pyran;

(PCDC-29) 2-phenyl-2-{4-[4-(4-methoxy-phenyl)-piperazin-1-yl]-phenyl}-9-hydroxy-8-(N-(4-phenyl)phenyl)carbamoyl-2H-naphtho[1,2-b]pyran;

(PCDC-30) 1,3,3-trimethyl-6'-(4-ethoxycarbonyl)-piperidin-1-yl)-spiro[indoline-2,3'-3H-naphtho[2,1-b][1,4]oxazine];

(PCDC-31) 1,3,3-trimethyl-6'-(4-[N-(4-butylphenyl)carbamoyl]-piperidin-1-yl)-spiro[indoline-2,3'-3H-naphtho[2,1-b][1,4]oxazine];

(PCDC-32) 1,3,3-trimethyl-6'-(4-(4-methoxyphenyl)piperazin-1-yl)-spiro[indoline-2,3'-3H-naphtho[2,1-b][1,4]oxazine];

(PCDC-33) 1,3,3-trimethyl-6'-(4-(4-hydroxyphenyl)piperazin-1-yl)-spiro[indoline-2,3'-3H-naphtho[2,1-b][1,4]oxazine];

(PCDC-34) 1,3,3,5,6-pentamethyl-7'-(4-(4-methoxyphenyl)piperazin-1-yl)-spiro[indoline-2,3'-3H-naphtho[2,1-b][1,4]oxazine];

(PCDC-35) 1,3-diethyl-3-methyl-5-methoxy-6'-(4-(4'-Hexyloxy-biphenyl-4-carbonyloxy)-piperidin-1-yl)-spiro[indoline-2,3'-3H-naphtho[2,1-b][1,4]oxazine];

(PCDC-36) 1,3-diethyl-3-methyl-5-[4-(4-pentadecafluoroheptyloxy-phenylcarbamoyl)-benzyloxy]-6'-(4-(4'-hexyloxy-biphenyl-4-carbonyloxy)-piperidin-1-yl)-spiro[indoline-2,3'-3H-naphtho[2,1-b][1,4]oxazine];

(PCDC-37) 2-phenyl-2-{4-[4-(4-methoxy-phenyl)-piperazin-1-yl]-phenyl}-5-carbomethoxy-8-(N-(4-phenyl)phenyl)carbamoyl-2H-naphtho[1,2-b]pyran;

(PCDC-38) 2-phenyl-2-{4-[4-(4-methoxy-phenyl)-piperazin-1-yl]-phenyl}-5-carbomethoxy-8-(N-(4-phenyl)phenyl)carbamoyl-2H-fluoantheno[1,2-b]pyran;

(PCDC-39) 2-phenyl-2-{4-[4-(4-methoxy-phenyl)-piperazin-1-yl]-phenyl}-5-carbomethoxy-11-(4-{17-(1,5-dimethyl-hexyl)-10,13-dimethyl-2,3,4,7,8,9,10,11,12,13,14, 15,16,17-tetradecahydro-1H-cyclopenta[a]phenanthren-3-yloxycarbonyloxy}phenyl)-2H-fluoantheno[1,2-b]pyran;

(PCDC-40) 1-(4-carboxybutyl)-6-(4-(4-propylphenyl)carbonyloxy)phenyl)-3,3-dimethyl-6'-(4-ethoxycarbonyl)-piperidin-1-yl)-spiro[(1,2-dihydro-9H-dioxolano[4'5,':6,7]indoline-2,3'-3H-naphtho[2,1-b][1,4]oxazine];

(PCDC-41) 1-(4-carboxybutyl)-6-(4-(4-propylphenyl)carbonyloxy)phenyl)-3,3-dimethyl-7'-(4-ethoxycarbonyl)-piperidin-1-yl)-spiro[(1,2-dihydro-9H-dioxolano[4',5':6,7]indoline-2,3'-3H-naphtho[1,2-b][1,4]oxazine];

(PCDC-42) 1,3-diethyl-3-methyl-5-(4-{17-(1,5-dimethyl-hexyl)-10,13-dimethyl-2,3,4,7,8,9,10,11,12,13,14,15,16,17-tetradecahydro-1H-cyclopenta[a]phenanthren-3-yloxycarbonyloxy}phenyl)-6'-(4-(4'-hexyloxy-biphenyl-4-carbonyloxy)-piperidin-1-yl)-spiro[indoline-2,3'-3H-naphtho[2,1-b][1,4]oxazine];

(PCDC-43) 1-butyl-3-ethyl-3-methyl-5-methoxy-7'-(4-(4'-Hexyloxy-biphenyl-4-carbonyloxy)-piperidin-1-yl)-spiro[indoline-2,3'-3H-naphtho[1,2-b][1,4]oxazine];

(PCDC-44) 2-phenyl-2-{4-[4-(4-methoxy-phenyl)-piperazin-yl]-phenyl}-5-methoxycarbonyl-6-methyl-2H-9-(4-(4-propylphenyl)carbonyloxy)phenyl)(1,2-dihydro-9H-dioxolano[4',5':6,7]naphtho[1,2-b]pyran;

(PCDC-45) 3-(4-methoxyphenyl)-3-(4-(4-methoxyphenyl)piperazin-1-yl)phenyl)-13-ethyl-13-hydroxy-6-methoxy-7-(4-(4-propylphenyl)carbonyloxy)phenyl)-[1,2-dihydro-9H-dioxolano[4'',5'':6,7][indeno[2',3':3,4]naphtho[1,2-b]pyran;

(PCDC-46) 3-phenyl-3-(4-(4-methoxyphenyl)piperazin-1-yl)phenyl)-13-ethyl-13-hydroxy-6-methoxy-7-(4-(4-hexylphenyl)carbonyloxy)phenyl)-[1,2-dihydro-9H-dioxolano[4'',5'':5,6][indeno[2',3':3,4]naphtho[1,2-b]pyran;

(PCDC-47) 4-(4-((4-cyclohexylidene-1-ethyl-2,5-dioxopyrrolin-3-ylidene)ethyl)-2-thienyl)phenyl-(4-propyl)benzoate;

(PCDC-48) 4-(4-((4-adamantan-2-ylidene-1-(4-(4-hexylphenyl)carbonyloxy)phenyl)-2,5-dioxopyrrolin-3-ylidene)ethyl)-2-thienyl)phenyl-(4-propyl)benzoate;

(PCDC-49) 4-(4-((4-adamantan-2-ylidene-2,5-dioxo-1-(4-(4-(4-propylphenyl)piperazinyl)phenyl)pyrrolin-3-ylidene)ethyl)-2-thienyl)phenyl(4-propyl)benzoate;

(PCDC-50) 4-(4-((4-adamantan-2-ylidene-2,5-dioxo-1-(4-(4-(4-propylphenyl)piperazinyl)phenyl)pyrrolin-3-ylidene)ethyl)-1-methylpyrrol-2-yl)phenyl(4-propyl)benzoate;

(PCDC-51) 4-(4-((4-adamantan-2-ylidene-2,5-dioxo-1-(4-{17-(1,5-dimethyl-hexyl)-10,13-dimethyl-2,3,4,7,8,9,10,11,12,13,14,15,16,17-tetradecahydro-1H-cyclopenta[a]phenanthren-3-yloxycarbonyloxy}phenyl)pyrrolin-3-ylidene)ethyl)-1-methylpyrrol-2-yl)phenyl (4-propyl)benzoate;

(PCDC-52) 4-(4-methyl-5,7-dioxo-6-(4-(4-(4-propylphenyl)piperazinyl)phenyl)spiro[8,7a-dihydrothiapheno[4,5-f]isoindole-8,2'-adamantane]-2-yl)phenyl (4-propyl)phenyl benzoate;

(PCDC-53) N-(4-{17-(1,5-dimethyl-hexyl)-10,13-dimethyl-2,3,4,7,8,9,10,11,12,13,14,15,16,17-tetradecahydro-1H-cyclopenta[a]phenanthren-3-yloxycarbonyloxy}phenyl-6,7-dihydro-4-methyl-2-phenylspiro(5,6-benzo[b]thiophenedicarboxylmide-7,2-tricyclo[3.3.1.1]decane);

(PCDC-54) N-cyanomethyl-6,7-dihydro-2-(4-(4-(4-propylphenyl)piperazinyl)phenyl)-4-methylspiro(5,6-benzo[b]thiophenedicarboxylmide-7,2-tricyclo[3.3.1.1]decane);

(PCDC-55) N-phenylethyl-6,7-dihydro-2-(4-(4-(4-hexyl-benzoyloxy)phenyl)piperazin-1-yl)phenyl-4-methylspiro(5,6-benzo[b]thiophenedicarboxylmide-7,2-tricyclo[3.3.1.1]decane);

(PCDC-56) N-phenylethyl-6,7-dihydro-2-(4-(4-(4-hexyl-benzoyloxy)phenyl)piperazin-1-yl)phenyl-4-cyclopropyl spiro(5,6-benzo[b]thiophenedicarboxylmide-7,2-tricyclo[3.3.1.1]decane);

(PCDC-57) N-phenylethyl-6,7-dihydro-2-(4-(4-(4-hexyl-benzoyloxy)phenyl)piperazin-1-yl)phenyl-4-cyclopropyl spiro(5,6-benzo[b]furodicarboxyimide-7,2-tricyclo[3.3.1.1]decane);

(PCDC-58) N-cyanomethyl-6,7-dihydro-4-(4-(4-(4-hexyl-benzoyloxy)phenyl)piperazin-1-yl)phenyl-2-phenylspiro(5,6-benzo[b]thiophenedicarboxylmide-7,2-tricyclo[3.3.1.1]decane);

(PCDC-59) N-17-(1,5-dimethyl-hexyl)-10,13-dimethyl-2,3,4,7,8,9,10,11,12,13,14,15,16,17-tetradecahydro-1H-cyclopenta[a]phenanthren-3-yloxycarbonyl-6,7-dihydro-2-(4-methoxyphenyl)phenyl-4-methylspiro(5,6-benzo[b]thiophenedicarboxylmide-7,2-tricyclo[3.3.1.1]decane);

(PCDC-60) N-cyanomethyl-2-(4-(6-(4-butylphenyl)carbonyloxy-(4,8-dioxabicyclo[3.3.0]oct-2-yl))oxycarbonyl)phenyl-6,7-dihydro-4-cyclopropylspiro(5,6-benzo[b]thiophenedicarboxylmide-7,2-tricyclo[3.3.1.1]decane);

(PCDC-61) 6,7-dihydro-N-methoxycarbonylmethyl-4-(4-(6-(4-butylphenyl)carbonyloxy-(4,8-dioxabicyclo[3.3.0]oct-2-yl))oxycarbonyl)phenyl-2-phenylspiro(5,6-benzo[b]thiophenedicarboxylmide-7,2-tricyclo[3.3.1.1]decane); and (PCDC-62) 3-phenyl-3-(4-pyrrolidinylphenyl)-13,13-dimethyl-6-methoxy-7-(4-(4-(4-(6-(4-(4-(4-onylphenylcabonyloxy)phenyl)oxycarbonyl)phenoxy)hexyloxy)phenyl)piperazin-1-yl)indeno[2',3':3,4]naphtho[1,2-b]pyran.

With some further embodiments, the photochromic-dichroic compounds of the photochromic articles of the present invention, can be chosen from the following:

(PCDC-a1) 3,3-Bis(4-methoxyphenyl)-10-[4-(4-(trans-4-pentylcyclohexyl)benzamido)phenyl]-13,13-dimethyl-12-bromo-3,13-dihydro-indeno[2',3':3,4]naphtho[1,2-b]pyran;

(PCDC-a2) 3,3-Bis(4-methoxyphenyl)-10-[4-((4-(trans-4-pentylcyclohexyl)phenoxy)carbonyl)phenyl]-6,13,13-trimethyl-3,13-dihydro-indeno[2',3':3,4]naphtho[1,2-b]pyran;

(PCDC-a3) 3-(4-Fluorophenyl)-3-(4-piperidinophenyl)-10-[4-(4-(4-(trans-4-pentylcyclohexyl)phenyl)benzamido)phenyl]-6-trifluoromethyl-11,13,13-trimethyl-3,13-dihydro-indeno[2',3':3,4]naphtho[1,2-b]pyran;

(PCDC-a4) 3,3-Bis(4-methoxyphenyl)-10-[4-(4-(trans-4-pentylcyclohexyl)benzamido)phenyl]-5,7-difluoro-13,13-dimethyl-3,13-dihydro-indeno[2',3':3,4]naphtho[1,2-b]pyran;

(PCDC-a5) 3-(4-Methoxyphenyl)-3-(4-piperidinophenyl)-10-[4-(4-(4-(trans-4-pentylcyclohexyl)phenyl)benzamido)phenyl]-5,7-difluoro-13,13-dimethyl-3,13-dihydro-indeno[2',3':3,4]naphtho[1,2-b]pyran;

(PCDC-a6) 3-(4-Methoxyphenyl)-3-(4-morpholinophenyl)-10-[4-(4-(4-(trans-4-pentylcyclohexyl)phenyl)benzamido)phenyl]-5,7-difluoro-13,13-dimethyl-3,13-dihydro-indeno[2',3':3,4]naphtho[1,2-b]pyran;

(PCDC-a7) 3-(4-Fluorophenyl)-3-(4-piperidinophenyl)-10-[4-((4-(trans-4-pentylcyclohexyl)phenoxy)carbonyl)phenyl]-12-bromo-5,7-difluoro-13,13-dimethyl-3,13-dihydro-indeno[2',3':3,4]naphtho[1,2-b]pyran;

(PCDC-a8) 3-Phenyl-3-(4-piperidinophenyl)-10-[4-(4-(4-(trans-4-pentylcyclohexyl)phenyl)benzamido)phenyl]-

12-bromo-5,7-difluoro-13,13-dimethyl-3,13-dihydro-indeno[2',3':3,4]naphtho[1,2-b]pyran;
(PCDC-a9) 3-Phenyl-3-(4-piperidinophenyl)-10-[4-((4-(trans-4-pentylcyclohexyl)phenoxy)carbonyl)phenyl]-12-bromo-5,7-difluoro-13,13-dimethyl-3,13-dihydro-indeno[2',3':3,4]naphtho[1,2-b]pyran;
(PCDC-a10) 3-(4-Fluorophenyl)-3-(4-piperidinophenyl)-10-[4-(4-(4-(trans-4-pentylcyclohexyl)phenyl)benzamido)phenyl]-12-bromo-13,13-dimethyl-3,13-dihydro-indeno[2',3':3,4]naphtho[1,2-b]pyran;
(PCDC-a11) 3,3-Bis(4-methoxydinophenyl)-10-[4-(4-(4-(trans-4-pentylcyclohexyl)phenyl)benzamido)phenyl]-12-bromo-6,7-dimethoxy-11,13,13-trimethyl-3,13-dihydro-indeno[2',3':3,4]naphtho[1,2-b]pyran;
(PCDC-a12) 3,3-Bis(4-methoxyphenyl)-10-[4-(4-(4-(trans-4-pentylcyclohexyl)phenyl)benzamido)phenyl]-6-trifluoromethyl-12-bromo-13,13-dimethyl-3,13-dihydro-indeno[2',3':3,4]naphtho[1,2-b]pyran;
(PCDC-a13) 3,3-Bis(4-methoxyphenyl)-10,12-bis[4-(4-(4-(trans-4-pentylcyclohexyl)phenyl)benzamido)phenyl]-6-trifluoromethyl-13,13-dimethyl-3,13-dihydro-indeno[2',3':3,4]naphtho[1,2-b]pyran;
(PCDC-a14) 3,3-Bis(4-methoxyphenyl)-10-[4-(4-(4-(trans-4-pentylcyclohexyl)phenyl)benzamido)phenyl]-5,7-difluoro-13,13-dimethyl-3,13-dihydro-indeno[2',3':3,4]naphtho[1,2-b]pyran;
(PCDC-a15) 3,3-Bis(4-methoxyphenyl)-10-[4-(4-(4-(trans-4-pentylcyclohexyl)phenyl)benzamido)phenyl]-6-trifluoromethyl-13,13-dimethyl-3,13-dihydro-indeno[2',3':3,4]naphtho[1,2-b]pyran;
(PCDC-a16) 3,3-Bis(4-methoxyphenyl)-10-[4-(4-(4-(trans-4-pentylcyclohexyl)phenyl)benzamido)phenyl]-5,7-difluoro-12-bromo-13,13-dimethyl-3,13-dihydro-indeno[2',3':3,4]naphtho[1,2-b]pyran;
(PCDC-a17) 3-(4-Fluorophenyl)-3-(4-morpholinophenyl)-10-[4-(4-(4-(trans-4-pentylcyclohexyl)phenyl)benzamido)phenyl]-6-trifluoromethyl-13-methyl-13-butyl-3,13-dihydro-indeno[2',3':3,4]naphtho[1,2-b]pyran;
(PCDC-a18) 3-(4-Fluorophenyl)-3-(4-morpholinophenyl)-10-[4-(4-(4-(trans-4-pentylcyclohexyl)phenyl)benzamido)phenyl]-5,7-difluoro-12-bromo-13,13-dimethyl-3,13-dihydro-indeno[2',3':3,4]naphtho[1,2-b]pyran;
(PCDC-a19) 3-Phenyl-3-(4-methoxyphenyl)-10-[4-(4-(4-(trans-4-pentylcyclohexyl)phenyl)benzamido)phenyl]6-trifluoromethyl-13,13-dimethyl-3,13-dihydro-indeno[2',3':3,4]naphtho[1,2-b]pyran;
(PCDC-a20) 3-Phenyl-3-(4-morpholinophenyl)-10-[4-(4-(4-(trans-4-pentylcyclohexyl)phenyl)benzamido)phenyl]-6-trifluoromethyl-13,13-dimethyl-3,13-dihydro-indeno[2',3':3,4]naphtho[1,2-b]pyran;
(PCDC-a21) 3,3-Bis(4-fluorophenyl)-10-[4-(4-(4-(trans-4-pentylcyclohexyl)phenyl)benzamido)phenyl]-6-trifluoromethyl-12-bromo-13,13-dimethyl-3,13-dihydro-indeno[2',3':3,4]naphtho[1,2-b]pyran;
(PCDC-a22) 3,3-Bis(4-fluorophenyl)-10-[4-(4-(4-(trans-4-pentylcyclohexyl)phenyl)benzamido)phenyl]-6-trifluoromethyl-13,13-dimethyl-3,13-dihydro-indeno[2',3':3,4]naphtho[1,2-b]pyran;
(PCDC-a23) 3-(4-Methoxyphenyl)-3-(4-butoxyphenyl)-10-[4-(4-(4-(trans-4-pentylcyclohexyl)phenyl)benzamido)phenyl]-6-trifluoromethyl-13,13-dimethyl-3,13-dihydro-indeno[2',3':3,4]naphtho[1,2-b]pyran;
(PCDC-a24) 3-(4-Fluorophenyl)-13,13-dimethyl-3-(4-morpholinophenyl)-10-(4-(4'-(trans-4-pentylcyclohexyl)-[1,1'-biphenyl]-4-ylcarboxamido)phenyl)-6-(trifluoromethyl)-3,13-dihydro-indeno[2',3':3,4]naphtho[1,2-b]pyran;
(PCDC-a25) 3-(4-Butoxyphenyl)-3-(4-fluorophenyl)-13,13-dimethyl-10-(4-(4'-(trans-4-pentylcyclohexyl)-[1,1'-biphenyl]-4-ylcarboxamido)phenyl)-6-(trifluoromethyl)-3,13-dihydro-indeno[2',3':3,4]naphtho[1,2-b]pyran;
(PCDC-a26) 3-(4-(4-(4-Methoxyphenyl)piperazin-1-yl)phenyl)-13,13-dimethyl-10-(4-(4'-(trans-4-pentylcyclohexyl)-[1,1'-biphenyl]-4-ylcarboxamido)phenyl)-3-phenyl-6-(trifluoromethyl)-3,13-dihydro-indeno[2',3':3,4]naphtho[1,2-b]pyran;
(PCDC-a27) 3-(4-Butoxyphenyl)-3-(4-fluorophenyl)-13,13-dimethyl-10-(4-(((trans,trans-4'-pentyl-[1,1'-bi(cyclohexan)]-4-yl)oxy)carbonyl)phenyl)-6-(trifluoromethyl)-3,13-dihydro-indeno[2',3':3,4]naphtho[1,2-b]pyran;
(PCDC-a28) 3-(4-Fluorophenyl)-13,13-dimethyl-10-(4-(4'-(trans-4-pentylcyclohexyl)-[1,1'-biphenyl]-4-ylcarboxamido)phenyl)-3-(4-butoxyphenyl)-6-(trifluoromethyl)-3,13-dihydro indeno[2',3':3,4]naphtho[1,2-b]pyran;
(PCDC-a29) 3-(4-Methoxyphenyl)-13,13-dimethyl-10-(4-(4'-(trans-4-pentylcyclohexyl)-[1,1'-biphenyl]-4-ylcarboxamido)phenyl)-3-(4-(trifluoromethoxy)phenyl)-6-(trifluormethyl)-3,13-dihydro-indeno[2',3':3,4]naphtho[1,2-b]pyran;
(PCDC-a30) 3,3-Bis(4-hydroxyphenyl)-10-[4-(4-(4-(trans-4-pentylcyclohexyl)phenyl)benzamido)phenyl]-6-trifluoromethyl-13,13-dimethyl-3,13-dihydro-indeno[2',3':3,4]naphtho[1,2-b]pyran;
(PCDC-a40) 12-Bromo-3-(4-butoxyphenyl)-3-(4-fluorophenyl)-13,13-dimethyl-10-(4-((4'-(trans-4-pentylcyclohexyl)-[1,1'-biphenyl]-4-carbonyl)oxy)benzamido)-6-(trifluoromethyl)-3,13-dihydro-indeno[2',3':3,4]naphtho[1,2-b]pyran;
(PCDC-a41) 3-(4-Butoxyphenyl)-5,7-dichloro-11-methoxy-3-(4-methoxyphenyl)-13,13-dimethyl-10-(4-(4'-(trans-4-pentylcyclohexyl)-[1,1'-biphenyl]-4-ylcarboxamido)phenyl)-3,13-dihydro-indeno[2',3':3,4]naphtho[1,2-b]pyran;
(PCDC-a42) 3-(4-Butoxyphenyl)-3-(4-fluorophenyl)-13,13-dimethyl-10-(4-((4'-(trans-4-pentylcyclohexyl)-[1,1'-biphenyl]-4-carbonyl)oxy)benzamido)-6-(trifluoromethyl)-3,13-dihydro-indeno[2',3':3,4]naphtho[1,2-b]pyran;
(PCDC-a43) 5,7-Dichloro-3,3-bis(4-hydroxyphenyl)-11-methoxy-13,13-dimethyl-10-(4-(4'-(trans-4-pentylcyclohexyl)-[1,1'-biphenyl]-4-ylcarboxamido)phenyl)-3,13-dihydro-indeno[2',3':3,4]naphtho[1,2-b]pyran;
(PCDC-a44) 6,8-Dichloro-3,3-bis(4-hydroxyphenyl)-11-methoxy-13,13-dimethyl-10-(4-(4'-(trans-4-pentylcyclohexyl)-[1,1'-biphenyl]-4-ylcarboxamido)phenyl)-3,13-dihydro-indeno[2',3':3,4]naphtho[1,2-b]pyran;
(PCDC-a45) 3-(4-Butoxyphenyl)-5,8-difluoro-3-(4-fluorophenyl)-13,13-dimethyl-10-(4-(4'-(trans-4-pentylcyclohexyl)-[1,1'-biphenyl]-4-ylcarboxamido)phenyl)-3,13-dihydro-indeno[2',3':3,4]naphtho[1,2-b]pyran;
(PCDC-a46) 3-(4-Butoxyphenyl)-3-(4-fluorophenyl)-13,13-dimethyl-10-(4-(4'-(trans-4-pentylcyclohexyl)-[1,1'-biphenyl]-4-carbonyl)piperazin-1-yl)-6-(trifluoromethyl)-3,13-dihydro-indeno[2',3':3,4]naphtho[1,2-b]pyran;
(PCDC-a47) 3-(4-Morpholinophenyl)-3-(4-methoxyphenyl)-10,7-bis[4-(4-(4-(trans-4-pentylcyclohexyl)phenyl)benzamido)phenyl]-5-fluoro-13,13-dimethyl-3,13-dihydro-indeno[2',3':3,4]naphtho[1,2-b]pyran;
(PCDC-a48) 3-(4-Morpholinophenyl)-3-(4-methoxyphenyl)-10-[4-(4-(4-(trans-4-pentylcyclohexyl)phenyl)benzamido)-2-(trifluoromethyl)phenyl]-13,13-dimethyl-3,13-dihydro-indeno[2',3':3,4]naphtho[1,2-b]pyran;
(PCDC-a49) 3,3-Bis(4-methoxyphenyl)-10-[4-(4-(4-(trans-4-pentylcyclohexyl)phenyl)benzamido)-2-(trifluoromethyl)phenyl]-13,13-dimethyl-3,13-dihydro-indeno[2',3':3,4]naphtho[1,2-b]pyran;

(PCDC-a50) 3-(4-Morpholinophenyl)-3-(4-methoxyphenyl)-10-[4-(4-(4-(trans-4-pentylcyclohexyl)phenyl)benzamido)-2-(trifluoromethyl)phenyl]-13,13-dimethyl-3,13-dihydro-indeno[2',3':3,4]naphtho[1,2-b]pyran;

(PCDC-a51) 3,3-Bis(4-methoxyphenyl)-13,13-dimethyl-10-(2-methyl-4-(trans-4-((4'-((trans-4-pentylcyclohexyl)biphenyl-4-yloxy)carbonyl)cyclohexanecarboxamido)phenyl)-3,13-dihydro-indeno[2',3':3,4]naphtho[1,2-b]pyran;

(PCDC-a52) 3-(4-(4-(4-Butylphenyl)piperazin-1-yl)phenyl)-3-(4-methoxyphenyl)-13,13-dimethyl-10-(4-(4'-(trans-4-pentylcyclohexyl)biphenyl-4-ylcarboxamido)-2-(trifluoromethyl)phenyl)-3,13-dihydro-indeno[2',3':3,4]naphtho[1,2-b]pyran;

(PCDC-a53) 3-(4-(4-(4-Butylphenyl)piperazin-1-yl)phenyl)-3-(4-methoxyphenyl)-13,13-dimethyl-10-(2-methyl-4-(4'-(trans-4-pentylcyclohexyl)biphenyl-4-ylcarboxamido)phenyl)-7-(4-(4-(trans-4-pentylcyclohexyl)benzamido)phenyl)-3,13-dihydro-indeno[2',3':3,4]naphtho[1,2-b]pyran;

(PCDC-a54) 3-(4-Methoxyphenyl)-13,13-dimethyl-7,10-bis(4-(4'-(trans-4-pentylcyclohexyl)biphenyl-4-ylcarboxamido)phenyl)-3-phenyl-3,13-dihydro-indeno[2',3':3,4]naphtho[1,2-b]pyran;

(PCDC-a55) 3-p-Tolyl-3-(4-methoxyphenyl)-6-methoxy-13,13-dimethyl-7-(4'-(trans,trans-4'-pentylbi(cyclohexane-4-)carbonyloxy)biphenylcarbonyloxy)-10-(4-(4'-(trans-4-pentylcyclohexyl)biphenyl-4-ylcarboxamido)phenyl)-3,13-dihydro-indeno[2',3':3,4]naphtho[1,2-b]pyran;

(PCDC-a56) 10-(4-(((3S,8S,9S,10R,13R,14S,17R)-10,13-Dimethyl-17-((R)-6-methylheptan-2-yl)-2,3,4,7,8,9,10,11,12,13,14,15,16,17-tetradecahydro-1H-cyclopenta[a]phenanthren-3-yloxy)carbonyl)piperazin-1-yl)-3-(4-methoxyphenyl)-13,13-dimethyl-3-(4-morpholinophenyl)-3,13-dihydro-indeno[2',3':3,4]naphtho[1,2-b]pyran;

(PCDC-a57) 6-Methoxy-3-(4-methoxyphenyl)-13,13-dimethyl-3-(4-((S)-2-methylbutoxy)phenyl)-10-(4-(4'-(trans-4-pentylcyclohexyl)biphenyl-4-ylcarboxamido)phenyl)-3,13-dihydro-indeno[2',3':3,4]naphtho[1,2-b]pyran;

(PCDC-a58) 6-Methoxy-3-(4-methoxyphenyl)-13,13-dimethyl-3-(4-((S)-2-methylbutoxy)phenyl)-7-(4'-(trans,trans-4'-pentylbi(cyclohexane-4-)carbonyloxy)biphenylcarbonyloxy)-10-(4-(4'-(trans-4-pentylcyclohexyl)biphenyl-4-ylcarboxamido)phenyl)-3,13-dihydro-indeno[2',3':3,4]naphtho[1,2-b]pyran; and (PCDC-a59) 6-Methoxy-3-(4-methoxyphenyl)-13,13-dimethyl-3-(4-((S)-2-methylbutoxy)phenyl)-10-(4-(((3R,3aS,6S,6aS)-6-(4'-(trans-4-pentylcyclohexyl)biphenylcarbonyloxy)hexahydrofuro[3,2-b]furan-3-yloxy)carbonyl)phenyl)-3,13-dihydro-indeno[2',3':3,4]naphtho[1,2-b]pyran.

More generally, the photochromic-dichroic compounds of the photochromic articles of the present invention include: (a) at least one photochromic group (PC), which can be chosen from, for example, pyrans, oxazines, and fulgides; and (b) at least one lengthening agent or group attached to the photochromic group. The lengthening agent (L) is represented by the following Formula I:

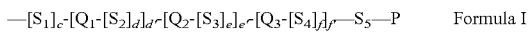

Formula I

As used herein, the term "attached" with regard to the photochromic group of the photochromic-dichroic compound means directly bonded to or indirectly bonded through another group. Thus, for example, according to various non-limiting embodiments disclosed herein, L can be directly bonded to PC as a substituent on PC, or L can be a substituent on another group (such as a group represented by which is discussed below) that is directly bonded to PC (i.e., L is indirectly bonded to PC). Although not limiting herein, according to various non-limiting embodiments, L can be attached to PC so as to extend or lengthen PC in an activated state such that the absorption ratio of the extended PC (i.e., the photochromic compound) is enhanced as compared to PC alone. Although not limiting herein, according to various non-limiting embodiments, the location of attachment of L on PC can be chosen such that L lengthens PC in at least one of a direction parallel to and a direction perpendicular to a theoretical transitional dipole moment of the activated form of PC. As used herein the term "theoretical transitional dipole moment" refers to transient dipolar polarization created by interaction of electromagnetic radiation with the molecule. See, for example, *IUPAC Compendium of Chemical Technology, 2nd Ed.*, International Union of Pure and Applied Chemistry (1997).

With reference to Formula I above, each $Q_1$, $Q_2$, and $Q_3$ can be independently chosen for each occurrence from: a divalent group chosen from an unsubstituted or a substituted aromatic group, an unsubstituted or a substituted alicyclic group, an unsubstituted or a substituted heterocyclic group, and mixtures thereof, wherein substituents are chosen from: a group represented by P (as set forth below), aryl, thiol, amide, liquid crystal mesogens, halogen, $C_1$-$C_{18}$ alkoxy, poly($C_1$-$C_{18}$ alkoxy), amino, amino($C_1$-$C_{18}$)alkylene, $C_1$-$C_{18}$alkylamino, di-($C_1$-$C_{18}$)alkylamino, $C_1$-$C_{18}$ alkyl, $C_2$-$C_{18}$ alkene, $C_2$-$C_{18}$ alkyne, $C_1$-$C_{18}$ alkyl($C_1$-$C_{18}$)alkoxy, $C_1$-$C_{18}$ alkoxycarbonyl, $C_1$-$C_{18}$ alkylcarbonyl, $C_1$-$C_{18}$ alkyl carbonate, aryl carbonate, $C_1$-$C_{18}$ acetyl, $C_3$-$C_{10}$ cycloalkyl, $C_3$-$C_{10}$ cycloalkoxy, isocyanato, amido, cyano, nitro, a straight-chain or branched $C_1$-$C_{18}$ alkyl group that is mono-substituted with cyano, halo, or $C_1$-$C_{18}$ alkoxy, or poly-substituted with halo, and a group represented by one of the following formulae: -M(T)$_{(t-1)}$ and -M(OT)$_{(t-1)}$, wherein M is chosen from aluminum, antimony, tantalum, titanium, zirconium and silicon, T is chosen from organofunctional radicals, organofunctional hydrocarbon radicals, aliphatic hydrocarbon radicals and aromatic hydrocarbon radicals, and t is the valence of M. As used herein, the prefix "poly" means at least two.

With reference to Formula I above, each $Q_1$, $Q_2$, and $Q_3$ can be independently chosen for each occurrence from: a divalent group chosen from an unsubstituted or a substituted aromatic group, an unsubstituted or a substituted alicyclic group, an unsubstituted or a substituted heterocyclic group, and mixtures thereof, wherein substituents are chosen from: a group represented by P (as set forth below), aryl, thiol, amide, liquid crystal mesogens, halogen, $C_1$-$C_{18}$ alkoxy, poly($C_1$-$C_{18}$ alkoxy), amino, amino($C_1$-$C_{18}$)alkylene, $C_1$-$C_{18}$alkylamino, di-($C_1$-$C_{18}$)alkylamino, $C_1$-$C_{18}$ alkyl, $C_2$-$C_{18}$ alkene, $C_2$-$C_{18}$ alkyne, $C_1$-$C_{18}$ alkyl($C_1$-$C_{18}$)alkoxy, $C_1$-$C_{18}$ alkoxycarbonyl, $C_1$-$C_{18}$ alkylcarbonyl, $C_1$-$C_{18}$ alkyl carbonate, aryl carbonate, $C_1$-$C_{18}$ acetyl, $C_3$-$C_{10}$ cycloalkyl, $C_3$-$C_{10}$ cycloalkoxy, isocyanato, amido, cyano, nitro, a straight-chain or branched $C_1$-$C_{18}$ alkyl group that is mono-substituted with cyano, halo, or $C_1$-$C_{18}$ alkoxy, or poly-substituted with halo, and a group represented by one of the following formulae: -M(T)$_{(t-1)}$ and -M(OT)$_{(t-1)}$, wherein M is chosen from aluminum, antimony, tantalum, titanium, zirconium and silicon, T is chosen from organofunctional radicals, organofunctional hydrocarbon radicals, aliphatic hydrocarbon radicals and aromatic hydrocarbon radicals, and t is the valence of M. As used herein, the prefix "poly" means at least two.

As discussed above, $Q_1$, $Q_2$, and $Q_3$ can be independently chosen for each occurrence from a divalent group, such as an unsubstituted or a substituted aromatic group, unsubstituted or substituted heterocyclic group, and an unsubstituted or substituted alicylic group. Non-limiting examples of useful aromatic groups include: benzo, naphtho, phenanthro, biphenyl, tetrahydro naphtho, terphenyl, and anthraceno.

As used herein the term "heterocyclic group" means a compound having a ring of atoms, wherein at least one atom forming the ring is different than the other atoms forming the ring. Further, as used herein, the term heterocyclic group specifically excludes fused heterocyclic groups. Non-limiting examples of suitable heterocyclic groups from which $Q_1$, $Q_2$, and $Q_3$ can be chosen include: isosorbitol, dibenzofuro, dibenzothieno, benzofuro, benzothieno, thieno, furo, dioxino, carbazolo, anthranilyl, azepinyl, benzoxazolyl, diazepinyl, dioazlyl, imidazolidinyl, imidazolyl, imidazolinyl, indazolyl, indoleninyl, indolinyl, indolizinyl, indolyl, indoxazinyl, isobenzazolyl, isoindolyl, isooxazolyl, isooxazyl, isopyrroyl, isoquinolyl, isothiazolyl, morpholino, morpholinyl, oxadiazolyl, oxathiazolyl, oxathiazyl, oxathiolyl, oxatriazolyl, oxazolyl, piperazinyl, piperazyl, piperidyl, purinyl, pyranopyrrolyl, pyrazinyl, pyrazolidinyl, pyrazolinyl, pyrazolyl, pyrazyl, pyridazinyl, pyridazyl, pyridyl, pyrimidinyl, pyrimidyl, pyridenyl, pyrrolidinyl, pyrrolinyl, pyrroyl, quinolizinyl, quinuclidinyl, quinolyl, thiazolyl, triazolyl, triazyl, N-arylpiperazino, aziridino, arylpiperidino, thiomorpholino, tetrahydroquinolino, tetrahydroisoquinolino, pyrryl, unsubstituted, mono- or di-substituted $C_4$-$C_{18}$ spirobicyclic amines, and unsubstituted, mono- or di-substituted $C_4$-$C_{18}$ spirotricyclic amines.

As discussed above, $Q_1$, $Q_2$, and $Q_3$ can be chosen from mono- or di-substituted $C_4$-$C_{18}$ spirobicyclic amine and $C_4$-$C_{18}$ spirotricyclic amine. Non-limiting examples of suitable substituents include aryl, $C_1$-$C_6$ alkyl, $C_1$-$C_6$ alkoxy or phenyl ($C_1$-$C_6$) alkyl. Specific non-limiting examples of mono- or di-substituted spirobicyclic amines include: 2-azabicyclo[2.2.1]hept-2-yl; 3-azabicyclo[3.2.1]oct-3-yl; 2-azabicyclo[2.2.2]oct-2-yl; and 6-azabicyclo[3.2.2]nonan-6-yl. Specific non-limiting examples of mono- or di-substituted tricyclic amines include: 2-azatricyclo[3.3.1.1(3,7)]decan-2-yl; 4-benzyl-2-azatricyclo[3.3.1.1(3,7)]decan-2-yl; 4-methoxy-6-methyl-2-azatricyclo[3.3.1.1(3,7)]decan-2-yl; 4-azatricyclo[4.3.1.1(3,8)]undecan-4-yl; and 7-methyl-4-azatricyclo[4.3.1.1(3,8)]undecan-4-yl. Examples of alicyclic groups from which $Q_1$, $Q_2$, and $Q_3$ can be chosen include, without limitation, cyclohexyl, cyclopropyl, norbornenyl, decalinyl, adamantanyl, bicycloctane, per-hydrofluorene, and cubanyl.

With continued reference to Formula I, each $S_1$, $S_2$, $S_3$, $S_4$, and $S_5$ is independently chosen for each occurrence from a spacer unit chosen from:

(1) —$(CH_2)_g$—, —$(CF_2)_h$—, —$Si(CH_2)_g$—, —$Si[(CH_3)_2]O)_h$—, wherein g is independently chosen for each occurrence from 1 to 20; h is chosen from 1 to 16;

(2) —N(Z)—, —C(Z)=C(Z)—, —C(Z)=N—, —C(Z')—C(Z')—, wherein Z is independently chosen for each occurrence from hydrogen, $C_1$-$C_6$ alkyl, cycloalkyl and aryl, and Z' is independently chosen for each occurrence from $C_1$-$C_6$ alkyl, cycloalkyl and aryl; and (3) —O—, —C(O)—, —C=C—, —N=N—, —S—, —S(O)—, —S(O)(O)—, straight-chain or branched $C_1$-$C_{24}$ alkylene residue, said $C_1$-$C_{24}$ alkylene residue being unsubstituted, mono-substituted by cyano or halo, or poly-substituted by halo;

The selection of $S_1$, $S_2$, $S_3$, $S_4$, and $S_5$ is subject, however, to the proviso, that when two spacer units including heteroatoms are linked together, the spacer units are linked so that heteroatoms are not directly linked to each other, and when $S_1$ and $S_5$ are linked to PC and P, respectively, they are linked so that two heteroatoms are not directly linked to each other. As used herein the term "heteroatom" means atoms other than carbon or hydrogen.

Further, in Formula I, according to various non-limiting embodiments, c, d, e, and f each can be independently chosen from an integer ranging from 1 to 20, inclusive; and d', e' and f' each can be independently chosen from 0, 1, 2, 3, and 4, provided that the sum of d'+e'+f' is at least 1. According to other non-limiting embodiments, c, d, e, and f each can be independently chosen from an integer ranging from 0 to 20, inclusive; and d', e' and f' each can be independently chosen from 0, 1, 2, 3, and 4, provided that the sum of d'+e'+f' is at least 2. According to still other non-limiting embodiments, c, d, e, and f each can be independently chosen from an integer ranging from 0 to 20, inclusive; and d', e' and f' each can be independently chosen from 0, 1, 2, 3, and 4, provided that the sum of d'+e'+f' is at least 3. According to still other non-limiting embodiments, c, d, e, and f each can be independently chosen from an integer ranging from 0 to 20, inclusive; and d', e' and f' each can be independently chosen from 0, 1, 2, 3, and 4, provided that the sum of d'+e'+f' is at least 1.

Further, in Formula I, P can be chosen from: aziridinyl, hydrogen, hydroxy, aryl, alkyl, alkoxy, amino, alkylamino, alkylalkoxy, alkoxyalkoxy, nitro, polyalkyl ether, ($C_1$-$C_6$) alkyl($C_1$-$C_6$)alkoxy($C_1$-$C_6$)alkyl, polyethyleneoxy, polypropyleneoxy, ethylene, acrylate, methacrylate, 2-chloroacrylate, 2-phenylacrylate, acryloylphenylene, acrylamide, methacrylamide, 2-chloroacrylamide, 2-phenylacrylamide, epoxy, isocyanate, thiol, thioisocyanate, itaconic acid ester, vinyl ether, vinyl ester, a styrene derivative, siloxane, main-chain and side-chain liquid crystal polymers, a liquid crystal mesogen, ethyleneimine derivatives, maleic acid derivatives, fumaric acid derivatives, unsubstituted cinnamic acid derivatives, cinnamic acid derivatives that are substituted with at least one of methyl, methoxy, cyano and halogen, and substituted and unsubstituted chiral and non-chiral monovalent or divalent groups chosen from steroid radicals, terpenoid radicals, alkaloid radicals and mixtures thereof, wherein the substituents are independently chosen from an alkyl, an alkoxy, amino, cycloalkyl, alkylalkoxy, a fluoroalkyl, a cyanoalkyl, a cyanoalkoxy and mixtures thereof.

Further, although not limiting herein, when P is a polymerizable group, the polymerizable group can be any functional group adapted to participate in a polymerization reaction. Non-limiting examples of polymerization reactions include those described in the definition of "polymerization" in *Hawley's Condensed Chemical Dictionary Thirteenth Edition*, 1997, John Wiley & Sons, pages 901-902, which disclosure is incorporated herein by reference. For example, although not limiting herein, polymerization reactions include: "addition polymerization," in which free radicals are the initiating agents that react with the double bond of a monomer by adding to it on one side at the same time producing a new free electron on the other side; "condensation polymerization," in which two reacting molecules combine to form a larger molecule with elimination of a small molecule, such as a water molecule; and "oxidative coupling polymerization." Further, non-limiting examples of polymerizable groups include hydroxy, acryloxy, methacryloxy, 2-(acryloxy)ethylcarbamyl, 2-(methacryloxy)ethylcarbamyl, isocyanate, aziridine, allylcarbonate, and epoxy, e.g., oxiranylmethyl.

In accordance with some embodiments, P can be chosen from a main-chain or a side-chain liquid crystal polymer and a liquid crystal mesogen. As used herein, the term liquid crystal "mesogen" means rigid rod-like or disc-like liquid crystal molecules. Further, as used herein the term "main-chain liquid crystal polymer" refers to a polymer having liquid crystal mesogens within the backbone (i.e., the main chain) structure of the polymer. As used herein the term "side-chain liquid crystal polymer" refers to a polymer having liquid crystal mesogens attached to the polymer at the side chains. Although not limiting herein, generally, the mesogens are made up of two or more aromatic rings that restrict the movement of a liquid crystal polymer. Examples of suitable rod-like liquid crystal mesogens include without limitation: substituted or unsubstituted aromatic esters, substituted or unsubstituted linear aromatic compounds, and substituted or unsubstituted terphenyls. According to another specific, non-limiting embodiment, P can be chosen from a steroid, for example and without limitation, a cholesterolic compound.

In accordance with some embodiments of the present invention, each lengthening agent L of the photochromic-dichroic compounds of the photochromic articles of the present invention can each be independently selected from lengthening groups represented by the following Formulas L(1) through L(37).

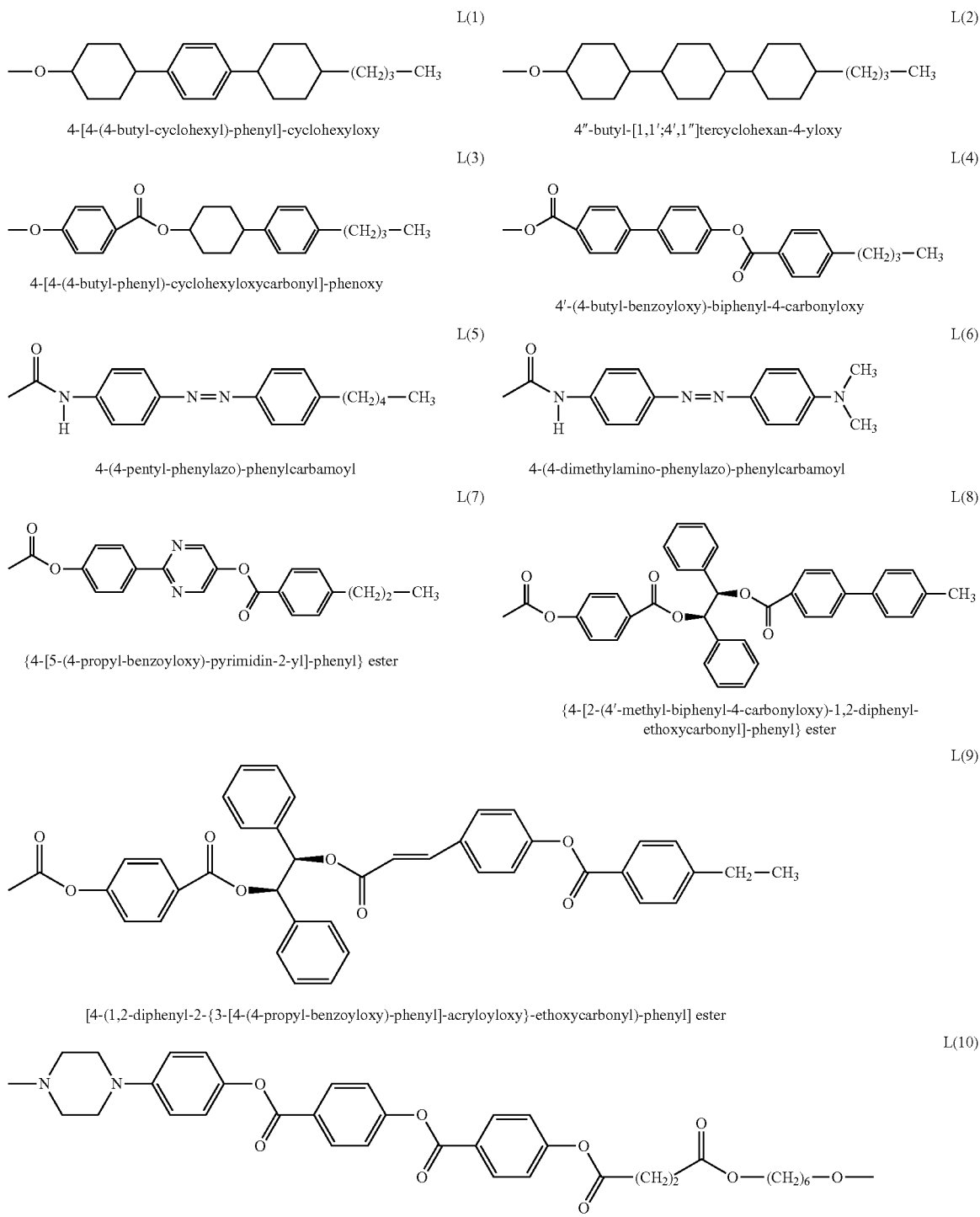

-continued

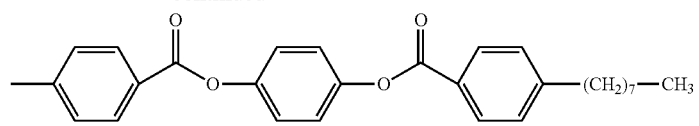

4-[4-(4-{4-[3-(6-{4-[4-(4-nonyl-benzoyloxy)-phenoxycarbonyl]-phenoxy}-hexyloxycarbonyl)-propionyloxy]-benzoyloxy}-benzoyloxy)-phenyl]-piperazin-1-yl

L(11)

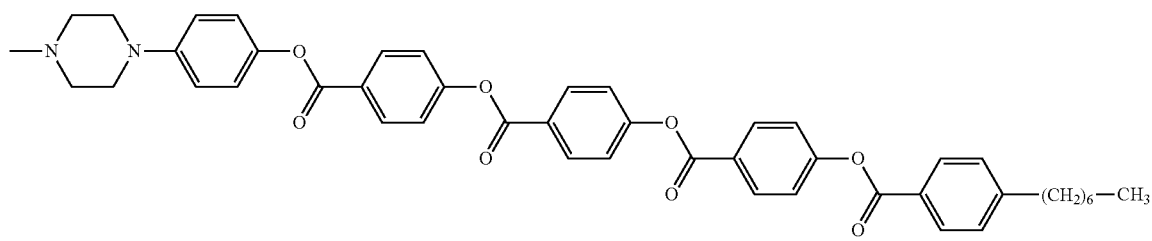

{4-[4-(4-{4-[4-(4-nonyl-benzoyloxy)-benzoyloxy]-benzoyloxy}-benzoyloxy)-phenyl]-piperazin-1-yl}

L(12)

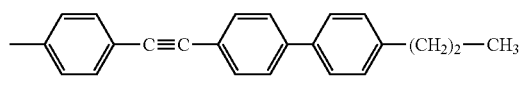

4-(4′-propyl-biphenyl-4-ylethynyl)-phenyl

L(13)

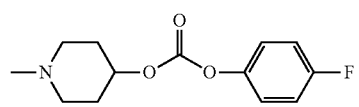

4-(4-fluoro-phenoxycarbonyloxy)-piperidin-1-yl

L(14)

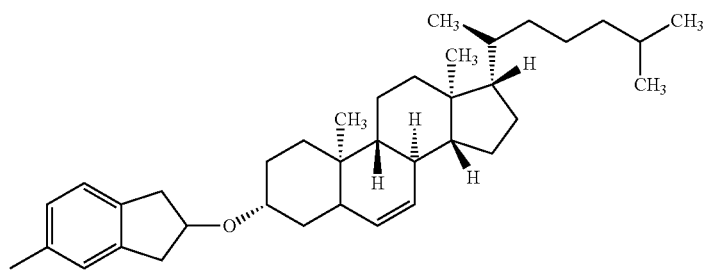

2-[17-(1,5-dimethyl-hexyl)-10,13-dimethyl-2,3,4,7,8,9,10,11,12,13,14,15,16,17-tetradecahydro-1H-cyclopenta[a]phenanthren-3-yloxy]-indan-5-yl

L(15)

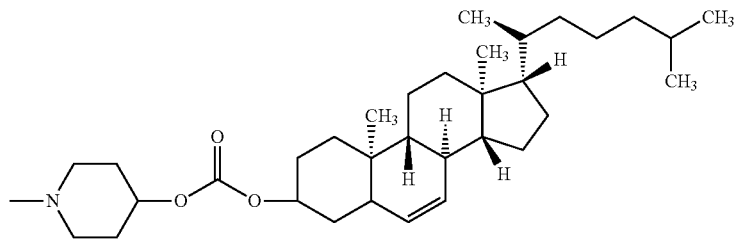

4-[17-(1,5-dimethyl-hexyl)-10,13-dimethyl-2,3,4,7,8,9,10,11,12,13,14,15,16,17-tetradecahydro-1H-cyclopenta[a]phenanthren-3-yloxycarbonyloxy]-piperidin-1-yl

L(16)                                                L(17)

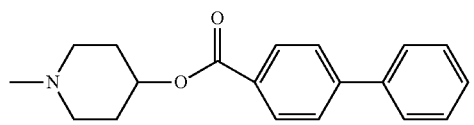    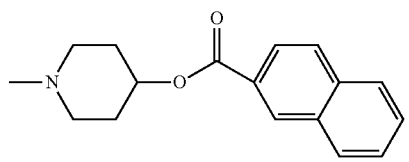

4-(biphenyl-4-carbonyloxy)-piperidin-1-yl        4-(naphthalene-2-carbonyloxy)-piperidin-1-yl -continued L(18)
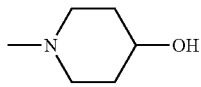
4-hydroxy-piperidin-1-yl L(19)
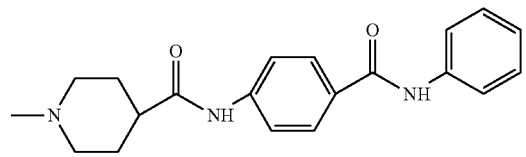
4-(4-phenylcarbamoyl-phenylcarbamoyl)-piperidin-1-yl L(20)
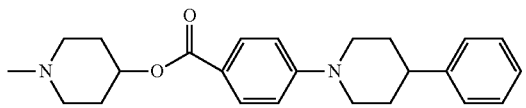
4-(4-(4-phenylpiperidin-1-yl)-benzoyloxy)-piperidin-1-yl L(21)
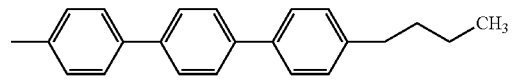
4-butyl-[1,1';4',1"]terphenyl-4-yl L(22)
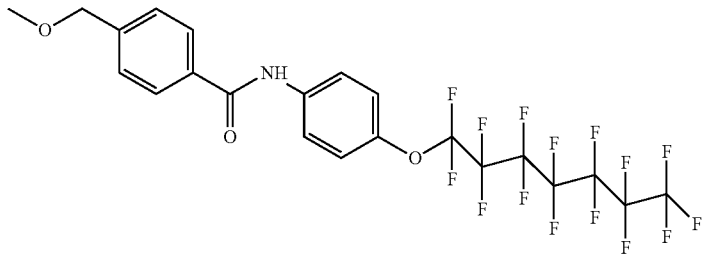
4-(4-pentadecafluoroheptyloxy-phenylcarbamoyl)-benzyloxy

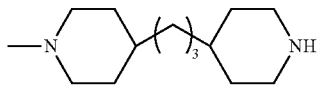
4-(3-piperidin-4-yl-propyl)-piperidin-1-yl

L(23)

L(24)
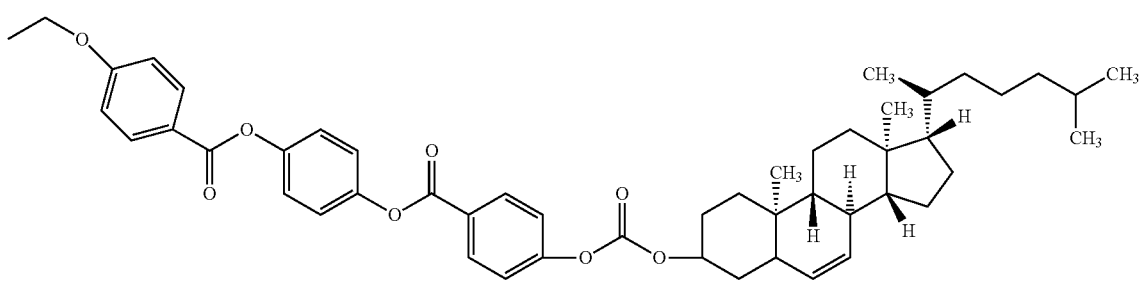
4-(4-{4-[17-(1,5-dimethyl-hexyl)-10,13-dimethyl-2,3,4,7,8,9,10,11,12,13,14,15,16,17-tetradecahydro-1H-cyclopenta[a]phenanthren-3-yloxycarbonyloxy]-benzoyloxy}-phenoxycarbonyl)-phenoxymethyl L(25)
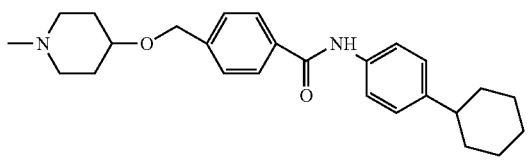
4-[4-(4-cyclohexyl-phenylcarbamoyl)-benzyloxy]-piperidin-1-yl L(26)
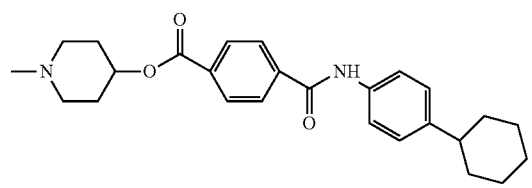
4-[4-(4-cyclohexyl-phenylcarbamoyl)-benzoyloxy]-piperidin-1-yl -continued

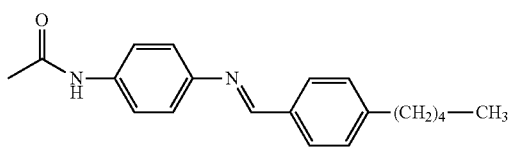

N-{4-[(4-pentyl-benzylidene)-amino]-phenyl}-acetamidyl  L(27)

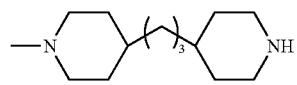

4-(3-piperidin-4-yl-propyl)-piperidin-1-yl  L(28)

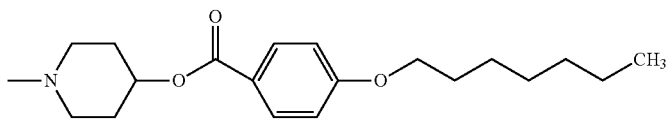

4-(4-hexyloxy-benzoyloxy)-piperidin-1-yl]  L(29)

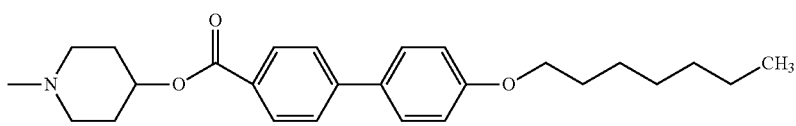

4-(4'-hexyloxy-biphenyl-4-carbonyloxy)-piperidin-1-yl  L(30)

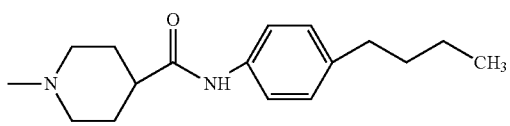

4-(4-butyl-phenylcarbamoyl)-piperidin-1-yl  L(31)

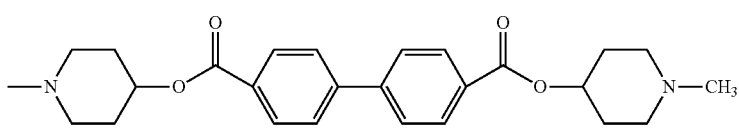

biphenyl-4,4'-dicarboxylic acid bis-[1-Name of PC Group]-piperidin-4-yl] ester  L(32)

4-(4-(9-(4-butylphenyl)-2,4,8,10-tetraoxaspiro[5.5]undec-3-yl)phenyl)piperazin-1-yl  L(33)

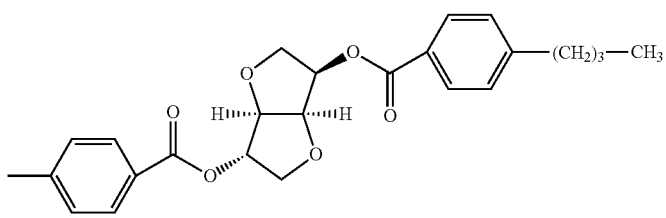

4-(6-(4-butylphenyl)carbonyloxy-(4,8-dioxabicyclo[3.3.0]oct-2-yl))oxycarbonyl)pheny  L(34)

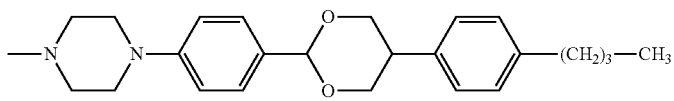

1-{4-[5-(4-butyl-phenyl)-[1,3]dioxan-2-yl]-phenyl}-4-methyl-piperazin-1-yl  L(35)

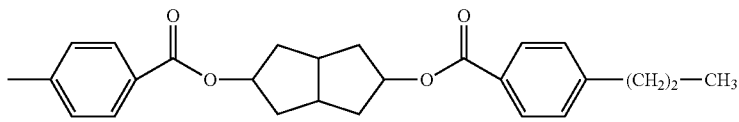

4-(7-(4-propylphenylcarbonyloxy)bicyclo[3.3.0]oct-2-yl)oxycarbonyl)phenyl L(36)

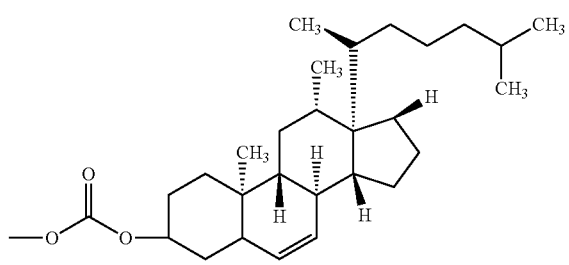

4-[17-(1,5-dimethyl-hexyl)-10,13-dimethyl-2,3,4,7,8,9,10,11,12,13,14,15,16,17-tetradecahydro-1H-cyclopenta[a]phenanthren-3-yloxycarbonyloxy L(37)

With some further embodiments, the lengthening groups L (or agents) of the photochromic-dichroic compounds of the photochromic articles of the present invention can each be independently selected from lengthening groups represented by the following Formulas L(a) through L(u).

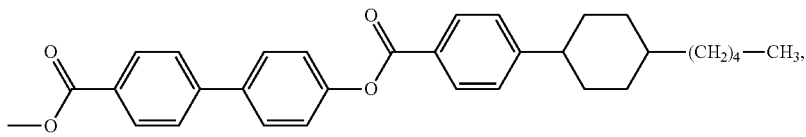

L(a)

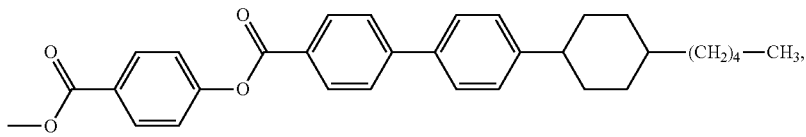

L(b)

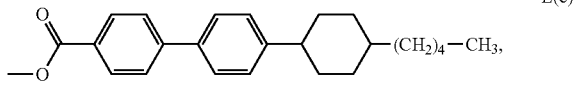 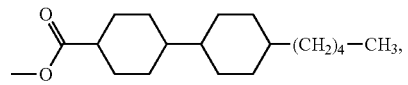

L(c)  L(d)

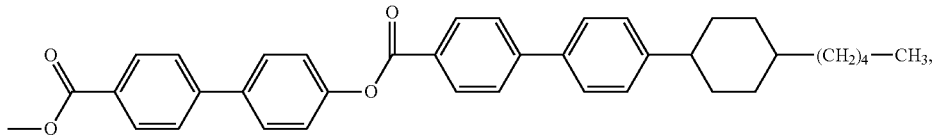

L(e)

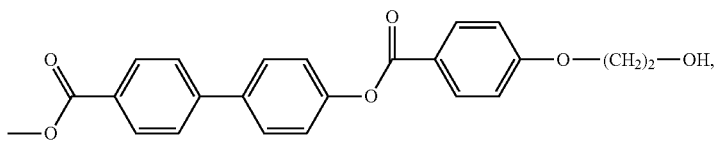

L(f)

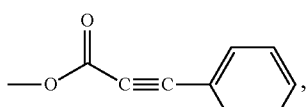 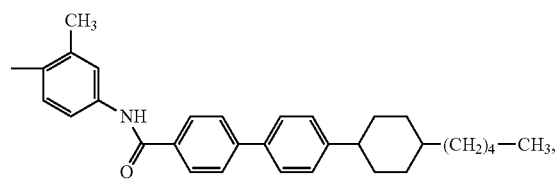

L(g)  L(h)

-continued
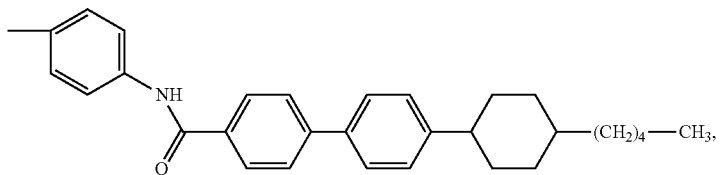
L(i)
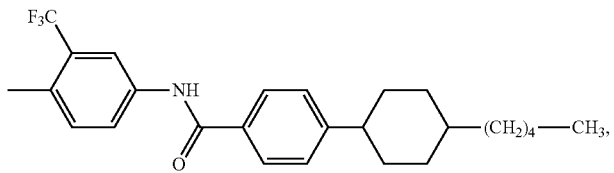
L(j)
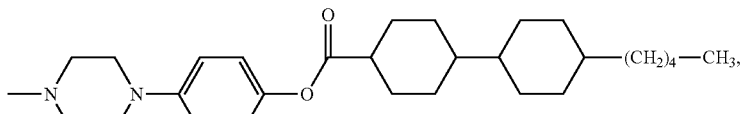
L(k)
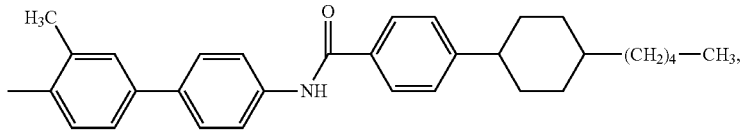
L(l)
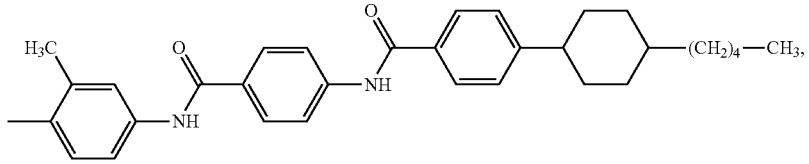
L(m)
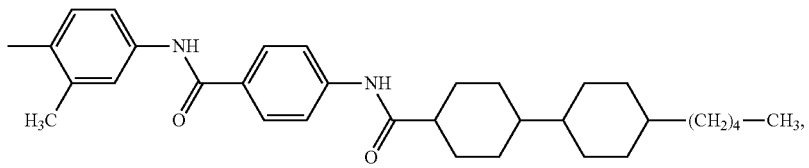
L(n)
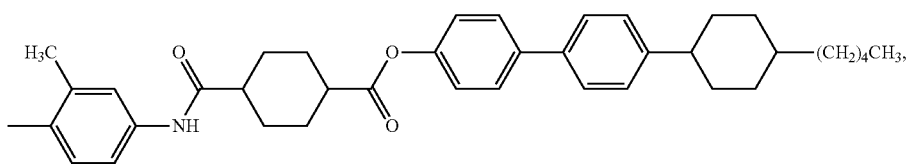
L(o)
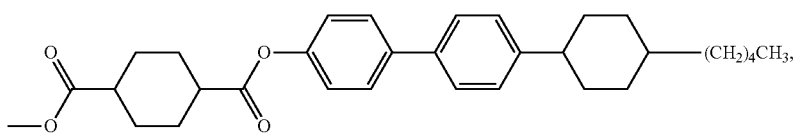
L(p)
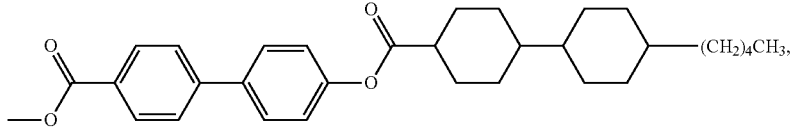
L(q)
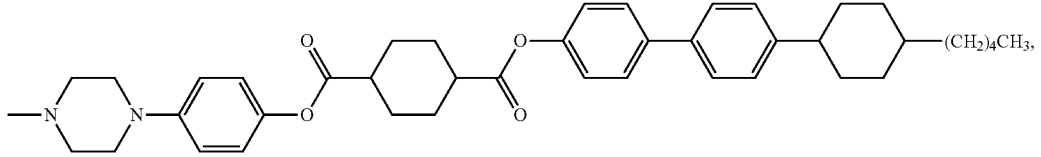
L(r)

-continued

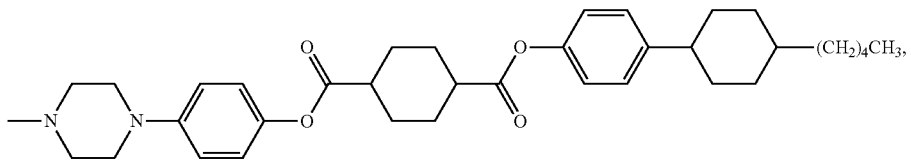

L(s)

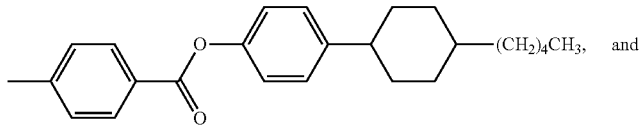 and

L(t)

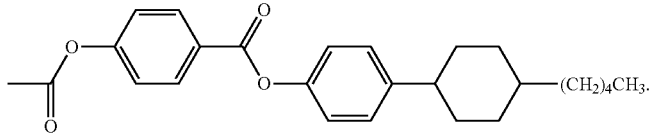

L(u)

With additional further embodiments, the lengthening groups L (or agents) of the photochromic-dichroic compounds of the photochromic articles of the present invention can each be independently selected from:
(4-trans-(4-pentylcyclohexyl)benzamido)phenyl;
(4-(4-trans-(4-pentylcyclohexyl)phenoxy)carbonyl)phenyl;
4-(4-(4-trans-(4-pentylcyclohexyl)phenyl)benzamido)phenyl;
4-((trans-(4'-pentyl-[1,1'-bi(cyclohexan)]-4-yl)oxy)carbonyl)phenyl;
4-(4'-(4-pentylcyclohexyl)-[1,1'-biphenyl]-4-ylcarboxamido)phenyl;
4-((4'-(4-pentylcyclohexyl)-[1,1'-biphenyl]-4-carbonyl)oxy)benzamido;
4-(4'-(4-pentylcyclohexyl)-[1,1'-biphenyl]-4-carbonyl)piperazin-1-yl;
4-(4-(4-trans-(4-pentylcyclohexyl)phenyl)benzamido)-2-(trifluoromethyl)phenyl;
2-methyl-4-trans-(4-((4'-trans-(4-pentylcyclohexyl)biphenyl-4-yloxy)carbonyl)cyclohexanecarboxamido)phenyl;
4'-(4'-pentylbi(cyclohexane-4-)carbonyloxy)biphenylcarbonyloxy;
4-(((3S,8S,9S,10R,13R,14S,17R)-10,13-dimethyl-17-((R)-6-methylheptan-2-yl)-2,3,4,7,8,9,10,11,12,13,14,15,16,17-tetradecahydro-1H-cyclopenta[a]phenanthren-3-yloxy)carbonyl)piperazin-1-yl; and
4-((S)-2-methylbutoxy)phenyl)-10-(4-(((3R,3aS,6S,6aS)-6-(4'-trans-(4-pentylcyclohexyl)biphenylcarbonyloxy) hexahydrofuro[3,2-b]furan-3-yloxy)carbonyl)phenyl.

Non-limiting examples of thermally reversible photochromic pyrans from which the photochromic (PC) group, of the photochromic-dichroic compound, can be chosen include benzopyrans, naphthopyrans, e.g., naphtho[1,2-b]pyrans, naphtho[2,1-b]pyrans, indeno-fused naphthopyrans, such as those disclosed in U.S. Pat. No. 5,645,767, and heterocyclic-fused naphthopyrans, such as those disclosed in U.S. Pat. Nos. 5,723,072, 5,698,141, 6,153,126, and 6,022,497, which are hereby incorporated by reference; spiro-9-fluoreno[1,2-b]pyrans; phenanthropyrans; quinopyrans; fluoroanthenopyrans; spiropyrans, e.g., spiro(benzindoline)naphthopyrans, spiro(indoline)benzopyrans, spiro(indoline)naphthopyrans, spiro(indoline)quinopyrans and spiro(indoline)pyrans. More specific examples of naphthopyrans and the complementary organic photochromic substances are described in U.S. Pat. No. 5,658,501, which are hereby specifically incorporated by reference herein. Spiro(indoline)pyrans are also described in the text, *Techniques in Chemistry*, Volume III, "Photochromism", Chapter 3, Glenn H. Brown, Editor, John Wiley and Sons, Inc., New York, 1971, which is hereby incorporated by reference.

Non-limiting examples of photochromic oxazines from which PC can be chosen include benzoxazines, naphthoxazines, and spiro-oxazines, e.g., spiro(indoline)naphthoxazines, spiro(indoline)pyridobenzoxazines, spiro(benzindoline)pyridobenzoxazines, spiro(benzindoline) naphthoxazines, spiro(indoline)benzoxazines, spiro (indoline)fluoranthenoxazine, and spiro(indoline) quinoxazine. Non-limiting examples of photochromic fulgides from which PC can be chosen include: fulgimides, and the 3-furyl and 3-thienyl fulgides and fulgimides, which are disclosed in U.S. Pat. No. 4,931,220 (which are hereby specifically incorporated by reference) and mixtures of any of the aforementioned photochromic materials/compounds.

In accordance with some embodiments, the photochromic-dichroic compound can include at least two photochromic compounds (PCs), in which case the PCs can be linked to one another via linking group substituents on the individual PCs. For example, the PCs can be polymerizable photochromic groups or photochromic groups that are adapted to be compatible with a host material ("compatibilized photochromic group"). Non-limiting examples of polymerizable photochromic groups from which PC can be chosen and that are useful in conjunction with various non-limiting embodiments disclosed herein are disclosed in U.S. Pat. No. 6,113,814, which is hereby specifically incorporated by reference herein. Non-limiting examples of compatiblized photochromic groups from which PC can be chosen and that are useful in conjunction with various non-limiting embodiments disclosed herein are disclosed in U.S. Pat. No. 6,555,028, which is hereby specifically incorporated by reference herein.

Other suitable photochromic groups and complementary photochromic groups are described in U.S. Pat. Nos. 6,080,338 at column 2, line 21 to column 14, line 43; 6,136,968 at column 2, line 43 to column 20, line 67; 6,296,785 at column 2, line 47 to column 31, line 5; 6,348,604 at column 3, line 26 to column 17, line 15; 6,353,102 at column 1, line 62 to column 11, line 64; and 6,630,597 at column 2, line 16 to column 16, line 23; the disclosures of the aforementioned patents are incorporated herein by reference.

In addition to at least one lengthening agent (L), the photochromic compounds can further include at least one group represented by $R^1$ that is directly bonded to the PC. Although not required, as previously discussed, the at least one lengthening agent (L) can be indirectly bonded to the PC through the at least one group represented by $R^1$. That is, L can be a substituent on at least one group $R^1$ that is bonded to PC.

According to various non-limiting embodiments disclosed herein, each $R^1$ can be independently chosen for each occurrence from, (i) hydrogen, $C_1$-$C_{12}$ alkyl, $C_2$-$C_{12}$ alkylidene, $C_2$-$C_{12}$ alkylidyne, vinyl, $C_3$-$C_7$ cycloalkyl, $C_1$-$C_{12}$ haloalkyl, allyl, halogen, and benzyl that is unsubstituted or mono-substituted with at least one of $C_1$-$C_{12}$ alkyl and $C_1$-$C_{12}$ alkoxy.

With some embodiments, each $R^1$ can be independently chosen for each occurrence from, (ii) phenyl that is mono-substituted at the para position with at least one substituent chosen from: $C_1$-$C_7$ alkoxy, linear or branched chain $C_1$-$C_{20}$ alkylene, linear or branched chain $C_1$-$C_4$ polyoxyalkylene, cyclic $C_3$-$C_{20}$ alkylene, phenylene, naphthylene, $C_1$-$C_4$ alkyl substituted phenylene, mono- or poly-urethane($C_1$-$C_{20}$)alkylene, mono- or poly-ester($C_1$-$C_{20}$)alkylene, mono- or poly-carbonate($C_1$-$C_{20}$)alkylene, polysilanylene, polysiloxanylene and mixtures thereof, wherein the at least one substituent is connected to an aryl group of a photochromic material.

In accordance with additional embodiments, each $R^1$ can be independently chosen for each occurrence from, (iii) —CH(CN)$_2$ and —CH(COOX$_1$)$_2$, wherein $X_1$ is chosen from at least one of a lengthening agent L represented by Formula I above, H, $C_1$-$C_{12}$ alkyl that is unsubstituted or mono-substituted with phenyl, phenyl($C_1$-$C_{12}$)alkyl that is mono-substituted with $C_1$-$C_{12}$ alkyl or $C_1$-$C_{12}$ alkoxy, and an aryl group that is unsubstituted, mono- or di-substituted, wherein each aryl substituent is independently chosen from $C_1$-$C_{12}$ alkyl and $C_1$-$C_{12}$ alkoxy.

In accordance with further embodiments, each $R^1$ can be independently chosen for each occurrence from, (iv) —CH($X_2$)($X_3$), in which:
- (A) $X_2$ is chosen from at least one of a lengthening agent L represented by Formula I above, hydrogen, $C_1$-$C_{12}$ alkyl and an aryl group that is unsubstituted, mono- or di-substituted, wherein each aryl substituent is independently chosen from $C_1$-$C_{12}$ alkyl and $C_1$-$C_{12}$ alkoxy; and
- (B) $X_3$ is chosen from at least one of —COOX$_1$, —COX$_1$, —COX$_4$, and —CH$_2$OX$_5$, wherein:
  - (1) $X_4$ is chosen from at least one of morpholino, piperidino, amino that is unsubstituted, mono- or di-substituted with $C_1$-$C_{12}$ alkyl, and an unsubstituted, mono or di-substituted group chosen from phenylamino and diphenylamino, wherein each substituent is independently chosen from $C_1$-$C_{12}$ alkyl or $C_1$-$C_{12}$ alkoxy; and
  - (2) $X_5$ is chosen from a lengthening agent L represented by Formula I above, hydrogen, —C(O)X$_2$, $C_1$-$C_{12}$ alkyl that is unsubstituted or mono-substituted with ($C_1$-$C_{12}$)alkoxy or phenyl, phenyl($C_1$-$C_{12}$)alkyl that is mono-substituted with ($C_1$-$C_{12}$)alkoxy, and an aryl group that is mono- or di-substituted, wherein each aryl substituent is independently chosen from $C_1$-$C_{12}$ alkyl and $C_1$-$C_{12}$ alkoxy;

In accordance with additional further embodiments, each $R^1$ can be independently chosen for each occurrence from, (v) an unsubstituted, mono-, di-, or tri-substituted aryl group, such as phenyl, naphthyl, phenanthryl, or pyrenyl; 9-julolidinyl; or an unsubstituted, mono- or di-substituted heteroaromatic group chosen from pyridyl, furanyl, benzofuran-2-yl, benzofuran-3-yl, thienyl, benzothien-2-yl, benzothien-3-yl, dibenzofuranyl, dibenzothienyl, carbazoyl, benzopyridyl, indolinyl, and fluorenyl; wherein the substituents are independently chosen for each occurrence from:

(A) a lengthening agent L represented by Formula I above;

(B) —C(O)X$_6$, wherein $X_6$ is chosen from at least one of: a lengthening agent L represented by Formula I above, H, $C_1$-$C_{12}$ alkoxy, phenoxy that is unsubstituted, mono- or di-substituted with $C_1$-$C_{12}$ alkyl or $C_1$-$C_{12}$ alkoxy, an aryl group that is unsubstituted, mono- or di-substituted with $C_1$-$C_{12}$ alkyl or $C_1$-$C_{12}$ alkoxy, an amino group that is unsubstituted, mono- or di-substituted with $C_1$-$C_{12}$ alkyl, and a phenylamino group that is unsubstituted, mono- or di-substituted with $C_1$-$C_{12}$ alkyl or $C_1$-$C_{12}$ alkoxy;

(C) aryl, haloaryl, $C_3$-$C_7$ cycloalkylaryl, and an aryl group that is mono- or di-substituted with $C_1$-$C_{12}$ alkyl or $C_1$-$C_{12}$ alkoxy;

(D) $C_1$-$C_{12}$ alkyl, $C_3$-$C_7$ cycloalkyl, $C_3$-$C_7$ cycloalkyloxy($C_1$-$C_{12}$)alkyl, aryl($C_1$-$C_{12}$)alkyl, aryloxy($C_1$-$C_{12}$)alkyl, mono- or di-($C_1$-$C_{12}$)alkylaryl($C_1$-$C_{12}$)alkyl, mono- or di-($C_1$-$C_{12}$)alkoxyaryl($C_1$-$C_{12}$)alkyl, haloalkyl, and mono($C_1$-$C_{12}$)alkoxy($C_1$-$C_{12}$)alkyl;

(E) $C_1$-$C_{12}$ alkoxy, $C_3$-$C_7$ cycloalkoxy; cycloalkyloxy($C_1$-$C_{12}$)alkoxy; aryl($C_1$-$C_{12}$)alkoxy, aryloxy($C_1$-$C_{12}$)alkoxy, mono- or di-($C_1$-$C_{12}$)alkylaryl($C_1$-$C_{12}$)alkoxy, and mono- or di-($C_1$-$C_{12}$)alkoxyaryl($C_1$-$C_{12}$)alkoxy;

(F) amido, amino, mono- or di-alkylamino, diarylamino, piperazino, N—($C_1$-$C_{12}$)alkylpiperazino, N-arylpiperazino, aziridino, indolino, piperidino, morpholino, thiomorpholino, tetrahydroquinolino, tetrahydroisoquinolino, pyrrolidyl, hydroxy, acryloxy, methacryloxy, and halogen;

(G) —OX$_7$ and —N(X$_7$)$_2$, wherein $X_7$ is chosen from:
  - (1) a lengthening agent L represented by Formula I above, hydrogen, $C_1$-$C_{12}$ alkyl, $C_1$-$C_{12}$ acyl, phenyl($C_1$-$C_{12}$)alkyl, mono($C_1$-$C_{12}$)alkyl substituted phenyl($C_1$-$C_{12}$)alkyl, mono($C_1$-$C_{12}$)alkoxy substituted phenyl($C_1$-$C_{12}$)alkyl; $C_1$-$C_{12}$ alkoxy($C_1$-$C_{12}$)alkyl; $C_3$-$C_7$ cycloalkyl; mono($C_1$-$C_{12}$)alkyl substituted $C_3$-$C_7$ cycloalkyl, $C_1$-$C_{12}$ haloalkyl, allyl, benzoyl, mono-substituted benzoyl, naphthoyl or mono-substituted naphthoyl, wherein each of said benzoyl and naphthoyl substituents are independently chosen from $C_1$-$C_{12}$ alkyl, and $C_1$-$C_{12}$ alkoxy;
  - (2) —CH(X$_8$)X$_9$, wherein $X_8$ is chosen from a lengthening agent L represented by Formula I above, H or $C_1$-$C_{12}$ alkyl; and $X_9$ is chosen from a lengthening agent L represented by Formula I above, —CN, —CF$_3$, or —COOX$_{10}$, wherein $X_{10}$ is chosen from a lengthening agent L represented by Formula I above, H or $C_1$-$C_{12}$ alkyl;
  - (3) —C(O)X$_6$; and
  - (4) tri($C_1$-$C_{12}$)alkylsilyl, tri($C_1$-$C_{12}$)alkoxysilyl, di($C_1$-$C_{12}$)alkyl($C_1$-$C_{12}$alkoxy)silyl, or di($C_1$-$C_{12}$)alkoxy($C_1$-$C_{12}$ alkyl)silyl;

(H) SX$_{11}$, wherein $X_{11}$ is chosen from a lengthening agent L represented by Formula I above, $C_1$-$C_{12}$ alkyl, an aryl group that is unsubstituted, or mono- or di-substituted with $C_1$-$C_{12}$ alkyl, $C_1$-$C_{12}$ alkoxy or halogen;

(I) a nitrogen containing ring represented by Formula i:

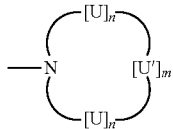

wherein:
(1) n is an integer chosen from 0, 1, 2, and 3, provided that if n is 0, U' is U, and each U is independently chosen for each occurrence from —CH$_2$—, —CH(X$_{12}$)—, —C(X$_{12}$)$_2$—, —CH(X$_{13}$)—, —C(X$_{13}$)$_2$—, and —C(X$_{12}$)(X$_{13}$)—, wherein X$_{12}$ is chosen from a lengthening agent L represented by Formula I above and C$_1$-C$_{12}$ alkyl, and X$_{13}$ is chosen from a lengthening agent L represented by Formula I above, phenyl and naphthyl, and (2) U' is chosen from U, —O—, —S—, —S(O)—, —NH—, —N(X$_{12}$)— or —N(X$_{13}$)—, and m is an integer chosen from 1, 2, and 3, provided that when n is 0, m is chosen from 2 or 3; and (J) a group represented by one of Formula ii or iii:

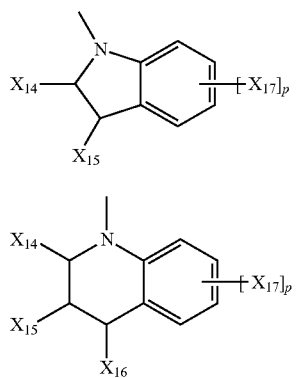

wherein X$_{14}$, X$_{15}$, and X$_{16}$ are independently chosen for each occurrence from a lengthening agent L represented by Formula I above, C$_1$-C$_{12}$ alkyl, phenyl and naphthyl, or X$_{14}$ and X$_{15}$ together form a ring of 5 to 8 carbon atoms; p is an integer chosen from 0, 1, or 2, and X$_{17}$ is independently chosen for each occurrence from a lengthening agent L represented by Formula I above, C$_1$-C$_{12}$ alkyl, C$_1$-C$_{12}$ alkoxy and halogen.

With some embodiments, each R$^1$ can be independently chosen for each occurrence from, (vi) an unsubstituted or mono-substituted group chosen from pyrazolyl, imidazolyl, pyrazolinyl, imidazolinyl, pyrrolidinyl, phenothiazinyl, phenoxazinyl, phenazinyl and acridinyl, wherein each substituent is independently chosen from a lengthening agent L represented by Formula I above, C$_1$-C$_{12}$ alkyl, C$_1$-C$_{12}$ alkoxy, phenyl, hydroxy, amino and halogen.

In accordance with further embodiments, each R$^1$ can be independently chosen for each occurrence from, (vii) a group represented by one of Formula iv or v:

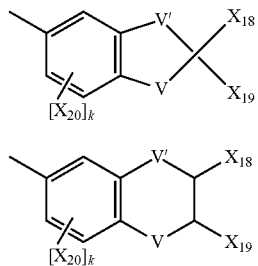

With reference to Formulas iv and v,
(A) V' is independently chosen in each formula from —O—, —CH—, C$_1$-C$_6$ alkylene, and C$_3$-C$_7$ cycloalkylene,
(B) V is independently chosen in each formula from —O— or —N(X$_{21}$)—, wherein X$_{21}$ is from a lengthening agent L represented by Formula I above, hydrogen, C$_1$-C$_{12}$ alkyl, and C$_2$-C$_{12}$ acyl, provided that if V is —N(X$_{21}$)—, V' is —CH$_2$—,
(C) X$_{18}$ and X$_{19}$ are each independently chosen from a lengthening agent L represented by Formula I above, hydrogen and C$_1$-C$_{12}$ alkyl, and
(D) k is chosen from 0, 1, and 2, and each X$_{20}$ is independently chosen for each occurrence from a lengthening agent L represented by Formula I above, C$_1$-C$_{12}$ alkyl, C$_1$-C$_{12}$ alkoxy, hydroxy and halogen;

In accordance with some further embodiments, each R$^1$ can be independently chosen for each occurrence from, (viii) a group represented by Formula vi:

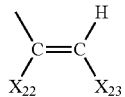

With reference to Formula vi,
(A) X$_{22}$ is chosen from a lengthening agent L represented by Formula I above, hydrogen and C$_1$-C$_{12}$ alkyl, and
(B) X$_{23}$ is chosen from a lengthening agent L represented by Formula I above or an unsubstituted, mono-, or di-substituted group chosen from naphthyl, phenyl, furanyl and thienyl, wherein each substituent is independently chosen for each occurrence from C$_1$-C$_{12}$ alkyl, C$_1$-C$_{12}$ alkoxy, and halogen.

With some additional embodiments, each R$^1$ can be independently chosen for each occurrence from, (ix) —C(O)X$_{24}$, wherein X$_{24}$ is chosen from a lengthening agent L represented by Formula I above, hydroxy, C$_1$-C$_{12}$ alkyl, C$_1$-C$_{12}$ alkoxy, phenyl that is unsubstituted or mono-substituted with C$_1$-C$_{12}$ alkyl or C$_1$-C$_{12}$ alkoxy, amino that is unsubstituted, mono- or di-substituted with at least one of C$_1$-C$_{12}$ alkyl, phenyl, benzyl, and napthyl.

With some additional further embodiments, each R$^1$ can be independently chosen for each occurrence from: (x) —OX$_7$ and —N(X$_7$)$_2$, wherein X$_7$ is as set forth above; (xi) —SX$_{11}$, wherein X$_{11}$ is as set forth above; (xii) the nitrogen containing ring represented by Formula iv, which is set forth above; and (xiii) the group represented by one of Formula v or vi, which are set forth above; and In accordance with some additional further embodiments, each R$^1$ can be independently chosen for each occurrence from, (xiv) immediately adjacent $R^1$ groups that together form a group represented by one of Formula vii, viii, and ix:

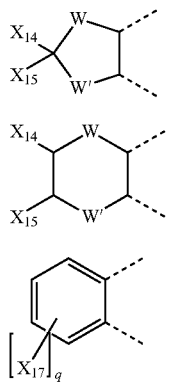

With reference to Formula vii, viii, and ix,
(A) W and W' are independently chosen for each occurrence from —O—, —N($X_7$)—, —C($X_{14}$)—, —C($X_{17}$)—, (wherein $X_7$, $X_{14}$, and $X_{17}$ are as set forth above),
(B) $X_{14}$, $X_{15}$ and $X_{17}$ are as set forth above, and
(C) q is an integer chosen from 0, 1, 2, 3, and 4.

In accordance with some embodiments, the photochromic-dichroic compound can be a photochromic pyran that is represented by Formula II.

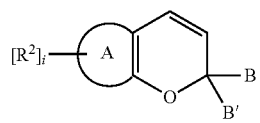

With reference to Formula II, A is an aromatic ring or a fused aromatic ring chosen from: naphtho, benzo, phenanthro, fluorantheno, antheno, quinolino, thieno, furo, indolo, indolino, indeno, benzofuro, benzothieno, thiopheno, indeno-fused naphtho, heterocyclic-fused naphtho, and heterocyclic-fused benzo.

With further reference to Formula II, B and B' each can be independently chosen from, (i) hydrogen, $C_1$-$C_{12}$ alkyl, $C_2$-$C_{12}$ alkylidene, $C_2$-$C_{12}$ alkylidyne, vinyl, $C_3$-$C_7$ cycloalkyl, $C_1$-$C_{12}$ haloalkyl, allyl, halogen, and benzyl that is unsubstituted or mono-substituted with at least one of $C_1$-$C_{12}$ alkyl and $C_1$-$C_{12}$ alkoxy.

The B and B' groups of Formula II can each be independently and further chosen from, (ii) phenyl that is mono-substituted at the para position with at least one substituent chosen from: $C_1$-$C_7$ alkoxy, linear or branched chain $C_1$-$C_{20}$ alkylene, linear or branched chain $C_1$-$C_4$ polyoxyalkylene, cyclic $C_3$-$C_{20}$ alkylene, phenylene, naphthylene, $C_1$-$C_4$ alkyl substituted phenylene, mono- or poly-urethane($C_1$-$C_{20}$)alkylene, mono- or poly-ester($C_1$-$C_{20}$)alkylene, mono- or poly-carbonate($C_1$-$C_{20}$)alkylene, polysilanylene, polysiloxanylene and mixtures thereof, wherein the at least one substituent is connected to an aryl group of a photochromic material.

The B and B' groups of Formula II can each be independently and further chosen from: (iii) —CH(CN)$_2$ and —CH(COO$X_1$)$_2$, wherein $X_1$ is as set forth above; and (iv) —CH($X_2$)($X_3$), wherein $X_2$ and $X_3$ are as set forth above.

The B and B' groups of Formula II can each be independently and further chosen from, (v) an unsubstituted, mono-, di-, or tri-substituted aryl group, such as phenyl, naphthyl, phenanthryl, or pyrenyl; 9-julolidinyl; or an unsubstituted, mono- or di-substituted heteroaromatic group chosen from pyridyl, furanyl, benzofuran-2-yl, benzofuran-3-yl, thienyl, benzothien-2-yl, benzothien-3-yl, dibenzofuranyl, dibenzothienyl, carbazoyl, benzopyridyl, indolinyl, and fluorenyl. The substituents can each be independently chosen for each occurrence from:

(A) a lengthening agent L represented by Formula I above;
(B) —C(O)$X_6$, wherein $X_6$ is as set forth above;
(C) aryl, haloaryl, $C_3$-$C_7$ cycloalkylaryl, and an aryl group that is mono- or di-substituted with $C_1$-$C_{12}$ alkyl or $C_1$-$C_{12}$ alkoxy;
(D) $C_1$-$C_{12}$ alkyl, $C_3$-$C_7$ cycloalkyl, $C_3$-$C_7$ cycloalkyloxy($C_1$-$C_{12}$)alkyl, aryl($C_1$-$C_{12}$)alkyl, aryloxy($C_1$-$C_{12}$)alkyl, mono- or di-($C_1$-$C_{12}$)alkylaryl($C_1$-$C_{12}$)alkyl, mono- or di-($C_1$-$C_{12}$)alkoxyaryl($C_1$-$C_{12}$)alkyl, haloalkyl, and mono($C_1$-$C_{12}$)alkoxy($C_1$-$C_{12}$)alkyl;
(E) $C_1$-$C_{12}$ alkoxy, $C_3$-$C_7$ cycloalkoxy; cycloalkyloxy($C_1$-$C_{12}$)alkoxy; aryl($C_1$-$C_{12}$)alkoxy, aryloxy($C_1$-$C_{12}$)alkoxy, mono- or di-($C_1$-$C_{12}$)alkylaryl($C_1$-$C_{12}$)alkoxy, and mono- or di-($C_1$-$C_{12}$)alkoxyaryl($C_1$-$C_{12}$)alkoxy;
(F) amido, amino, mono- or di-alkylamino, diarylamino, piperazino, N—($C_1$-$C_{12}$)alkylpiperazino, N-arylpiperazino, aziridino, indolino, piperidino, morpholino, thiomorpholino, tetrahydroquinolino, tetrahydroisoquinolino, pyrrolidyl, hydroxy, acryloxy, methacryloxy, and halogen;
(G) —O$X_7$ and —N($X_7$)$_2$, wherein $X_7$ is as set forth above;
(H) —S$X_{11}$, wherein $X_{11}$ is as set forth above;
(I) the nitrogen containing ring represented by Formula i, which is set forth above; and
(J) the group represented by one of Formula ii or iii, which are set forth above.

The B and B' groups of Formula II can each be independently and further chosen from, (vi) an unsubstituted or mono-substituted group chosen from pyrazolyl, imidazolyl, pyrazolinyl, imidazolinyl, pyrrodlinyl, phenothiazinyl, phenoxazinyl, phenazinyl, and acridinyl, wherein each substituent is independently chosen from a lengthening agent L, $C_1$-$C_{12}$ alkyl, $C_1$-$C_{12}$ alkoxy, phenyl, hydroxy, amino or halogen; (vii) the group represented by one of Formula iv or v, which are set forth above; and (viii) the group represented by Formula vi, which is set forth above.

In accordance with some alternative embodiments, B and B' can together form: (a) an unsubstituted, mono- or di-substituted fluoren-9-ylidene, wherein each of said fluoren-9-ylidene substituents are chosen from $C_1$-$C_4$ alkyl, $C_1$-$C_4$ alkoxy, fluoro and chloro; (b) a saturated $C_3$-$C_{12}$ spiro-monocyclic hydrocarbon ring, e.g., cyclopropylidene, cyclobutylidene, cyclopentylidene, cyclohexylidene, cycloheptylidene, cyclooctylidene, cyclononylidene, cyclodecylidene cycloundecylidene, cyclododecylidene; (c) a saturated $C_7$-$C_{12}$ spiro-bicyclic hydrocarbon rings, e.g., bicyclo[2.2.1]heptylidene, i.e., norbornylidene, 1,7,7-trimethyl bicyclo[2.2.1]heptylidene, i.e., bornylidene, bicyclo[3.2.1]octylidene, bicyclo[3.3.1]nonan-9-ylidene, bicyclo[4.3.2]undecane; or (d) a saturated $C_7$-$C_{12}$ spiro-tricyclic hydrocarbon rings, e.g., tricyclo[2.2.1.0$^{2,6}$]heptylidene, tricyclo[3.3.1.1$^{3,7}$]decylidene, i.e., adamantylidene, and tricyclo[5.3.1.1$^{2,6}$]dodecylidene. Further according to various non-limiting embodiments discussed in more detail below, B and B' can together form indolino or benzoindolino that is unsubstituted or substituted with at least one group represented by $R^2$.

With further reference to Formula II, according to various non-limiting embodiments, subscript (i) can be an integer chosen from 0 to the total available positions on Ring-A, and each $R^2$ can be independently chosen for each occurrence from: (i) a lengthening agent L represented by Formula I (above); and (ii) a group represented by $R^1$ (above); provided that the photochromic-dichroic compound represented by Formula II includes at least one lengthening agent (L) represented by Formula I above.

For example, and with further reference to Formula II, subscript (I) can be at least 1 and at least one of the $R^2$ groups can be a lengthening agent L. Additionally or alternatively, the photochromic-dichroic compound can include at least one $R^2$ group, at least one B group, or at least one B' group that is substituted with a lengthening agent L. For example, and without limitation, L can be directly bonded to the pyran group, for example, in which subscript (i) is at least 1 and $R^2$ is L, or it can be indirectly bonded to the pyran group, for example, as a substituent on an $R^2$, B, or B' group such that L extends the pyran group in an activated state such that the absorption ratio of the photochromic compound is enhanced as compared to the unextended pyran group. For example, although not limiting herein, the B or B' group can be a phenyl group that is mono-substituted with a lengthening agent L.

In accordance with some embodiments, the photochromic-dichroic compound can be a naphtho[1,2-b]pyran represented by the following Formula III:

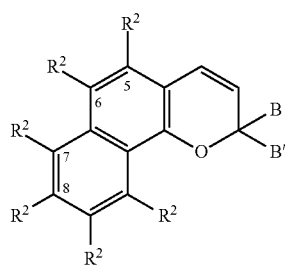

III

With reference to Formula III: (a) at least one of, the $R^2$ substituent in the 6-position, the $R^2$ substituent in the 8-position, and/or B and B' includes a lengthening agent L; or (b) the $R^2$ substituent in the 6-position together with the $R^2$ substituent in the 5-position forms a group represented by one of Formulas x to Formula xiv,

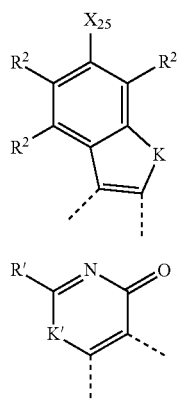

x xi

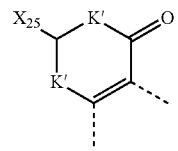

xii

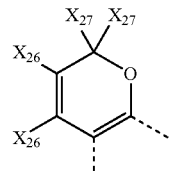

xiii

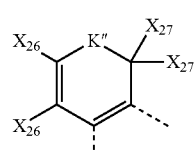

xiv

With reference to Formulas x to Formula xiv, K is chosen from —O—, —S—, —N($X_7$)—; and an unsubstituted C or a C substituted with alkyl, hydroxy, alkoxy, oxo, or aryl; K' is or —N($X_7$)—; K" is chosen from —O— or —N($X_7$)—; $X_{25}$ is a group represented by $R^2$ (which is set forth above in detail); $X_{26}$ can be chosen from hydrogen, alkyl, aryl, or together form benzo or naphtho; and each $X_{27}$ is chosen from alkyl and aryl or together are oxo; provided that at least one of: the $R^2$ substituent in the 8-position, $X_{25}$, K, K', K", B or B' comprises a lengthening agent L.

With some embodiments, and with further reference to Formula II, (c) the $R^2$ substituent in the 6-position together with the $R^2$ substituent in the 7-position from an aromatic group chosen from benzeno and naphtho, provided that at least one of: the $R^2$ substituent in the 8-position, B and B' includes a lengthening agent L.

With some further embodiments, the photochromic-dichroic compound can be an indeno-fused naphtho[1,2-b]pyran represented by the Formula IV:

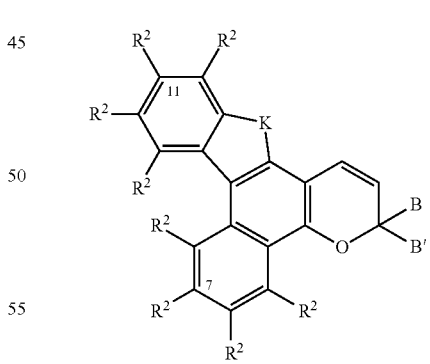

IV

With reference to Formula IV, K is as set forth above, and at least one of: the $R^2$ substituent in the 11-position, the $R^2$ substituent in the 7-position, K, B and B' includes a lengthening agent L. In accordance with some further embodiments, at least of, the $R^2$ substituent in the 11-position, and the $R^2$ substituent in the 7-position, is a lengthening agent L.

With further embodiments, the photochromic-dichroic compound can be a naphtha[2,1-b]pyran represented by the following Formula V:

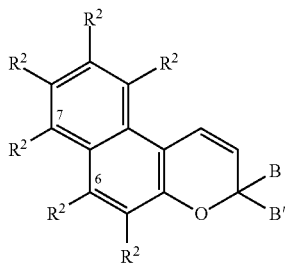

With reference to Formula V, at least one of, the $R^2$ substituent in the 6-position, the $R^2$ substituent in the 7-position, B, and B', includes a lengthening agent L. In accordance with some further embodiments, and with further reference to Formula V, at least one of, the $R^2$ substituent in the 6-position, and the $R^2$ substituent in the 7-position, is a lengthening agent L.

Further, according to still other non-limiting embodiments, the photochromic-dichroic compound can be a benzopyran represented by Formula VI:

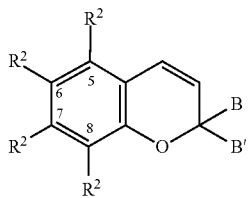

With reference to Formula VI: (a) at least one of, the $R^2$ substituent in the 5-position, the $R^2$ substituent in the 7-position, B or B' includes a lengthening agent L; or (b) at least one of, the R substituent in the 5-position and the $R^2$ substituent in the 7-position, together with an immediately adjacent $R^2$ substituent, (i.e., the $R^2$ substituent in the 7-position together with an $R^2$ substituent in the 6- or 8-positions, or the $R^2$ substituent in the 5-position together with an R substituent in the 6-position) forms a group represented by Formula x to xiv (set forth above), provided that only one of the $R^2$ substituent in the 5-position and the $R^2$ substituent in the 7-position join together with the $R^2$ substituent in the 6-position, and provided that at least one of, the $R^2$ substituent in the 5-position, the $R^2$ substituent in the 7-position, $X_{25}$, K, K', K", B or B' includes a lengthening agent L.

A general reaction sequence for forming photochromic-dichroic compounds that can be used in various non-limiting embodiments disclosed herein and that are generally represented by Formula II above is depicted below in Reaction Sequence A.

Reaction Sequence A

Part 1:

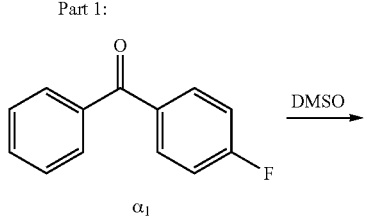

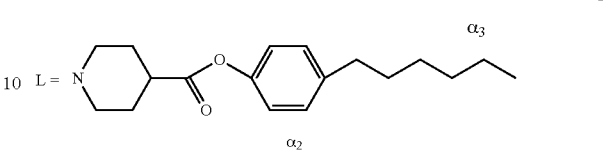

In Reaction Sequence A, Part 1,4-fluorobenzophenone, which is represented by Formula $\alpha_1$, can be reacted under nitrogen in the anhydrous solvent dimethyl sulfoxide (DMSO) with a lengthening agent L represented by Formula $\alpha_2$, to form an L substituted ketone represented by Formula $\alpha_3$. It will be appreciated by those skilled in the art that 4-fluorobenzophenone can either be purchased or prepared by Friedel-Crafts methods known in the art. For example, see the publication *Friedel-Crafts and Related Reactions*, George A. Olah, Interscience Publishers, 1964, Vol. 3, Chapter XXXI (Aromatic Ketone Synthesis), and "Regioselective Friedel-Crafts Acylation of 1,2,3,4-Tetrahydroquinoline and Related Nitrogen Heterocycles: Effect on NH Protective Groups and Ring Size" by Ishihara, Yugi et al, J. Chem. Soc., Perkin Trans. 1, pages 3401 to 3406, 1992.

Part 2:

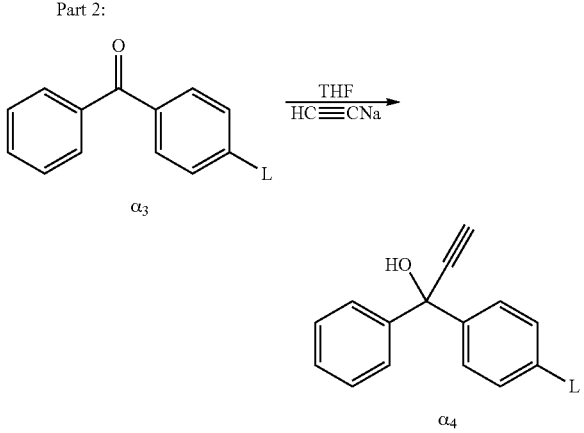

As depicted in Part 2 of Reaction Sequence A, the L substituted ketone represented by Formula $\alpha_3$ can be reacted with sodium acetylide in a suitable solvent, such as but not limited to anhydrous tetrahydrofuran (THF), to form the corresponding propargyl alcohol (represented by Formula $\alpha_4$).

Part 3:

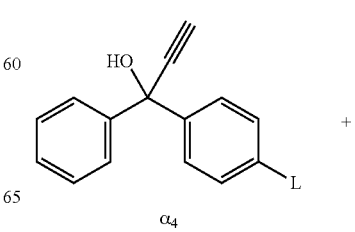

Reaction Sequence B

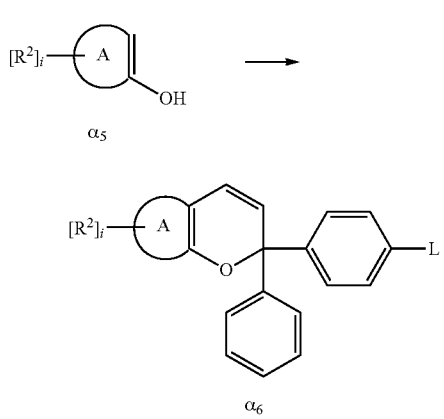

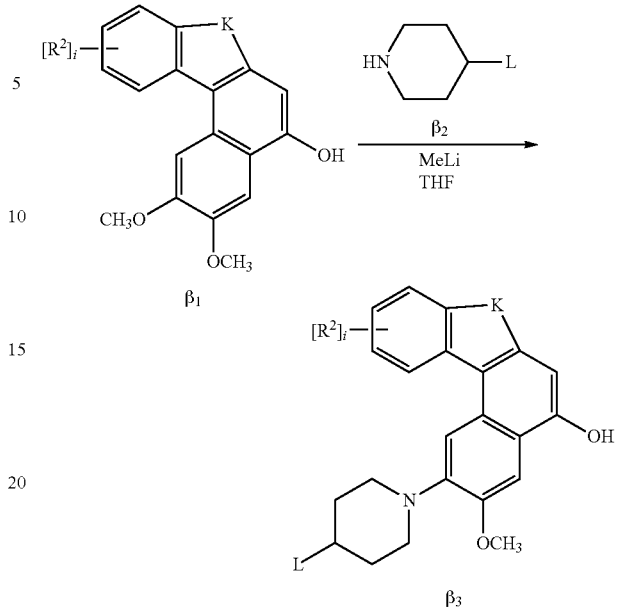

In Part 3 of Reaction Sequence A, the propargyl alcohol represented by Formula $\alpha_4$ can be coupled with a hydroxy substituted A group (represented by Formula $\alpha_5$) to form the photochromic pyran represented by Formula $\alpha_6$ according to one non-limiting embodiment disclosed herein. Optionally, the A group can be substituted with one or more $R^2$ groups, each of which may comprise a lengthening agent L that is the same or different from the remaining L substituents. Non-limiting examples of A and $R^2$ groups that are suitable for use in conjunction with various non-limiting embodiments disclosed herein are set forth above in detail. Non-limiting examples of general reaction sequences for forming hydroxylated A groups that are substituted with at least one lengthening agent L, are shown below in Reaction Sequences B, C, and D.

Although Reaction Sequence A depicts a general reaction sequence for forming a photochromic compound represented by Formula II □and having B and B' groups selected from L substituted phenyl and phenyl, it will be appreciated by those skilled in the art that photochromic compounds generally represented by Formula II and having B and B' groups other than those shown in Formula $\alpha_6$ above, and which optionally can be substituted with one or more L groups or one or more $R^2$ groups comprising L, can be prepared from commercially available ketones, or by reaction of an acyl halide with a substituted or unsubstituted material such as naphthalene or a heteroaromatic compound. Non-limiting examples of B and B' substituent groups that are suitable for use in conjunction with various non-limiting embodiments disclosed herein are set forth above in detail.

Reaction Sequences B, C and D depict three different general reaction sequences for forming hydroxylated A groups that are substituted with at least one lengthening agent L, that can be used in the formation of photochromic pyrans according to various non-limiting embodiments disclosed herein. For example, although not limiting herein, as discussed above in Reaction Sequence A, the resulting L substituted hydroxylated A group can be coupled with propargyl alcohol to form a photochromic pyran according to various non-limiting embodiments disclosed herein. Further, as discussed above, optionally, the A group can also be substituted with one or more additional $R^2$ groups, each of which may comprise a lengthening agent L that is the same or different from the remaining Ls.

In Reaction Sequence B, the hydroxlylated A group represented by Formula $\beta_1$ is reacted with the L substituted piperidine represented by Formula $\beta_2$ in the presence of an alkyl lithium, such as but not limited to methyllithium (MeLi), in anhydrous tetrahydrofuran to produce the L substituted $R^2$ group attached to the hydroxylated A group represented by Formula $\beta_3$. Further, as indicated above, the A group may also be substituted with one or more additional $R^2$ groups, each of which may also comprise a lengthening agent L that is the same or different from the remaining Ls. Further, K can be chosen from —O—, —S—, —N(X$_7$)— or carbon that is substituted or unsubstituted. For example, K can be a carbon that is di-substituted with methyl or can be substituted with an ethyl group and a hydroxyl group.

Reaction Sequence C

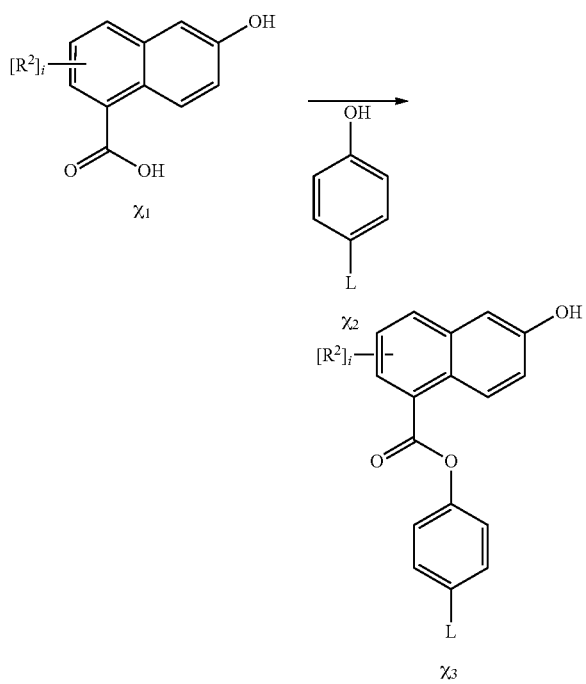

In Reaction Sequence C, the $R^2$ substituted hydroxylated A group represented by Formula $\chi_1$ is reacted with the L substituted phenol represented by Formula $\chi_2$ in an esterification reaction in the presence of dicyclohexylcarbodiimide in methylene chloride to produce the L substituted $R^2$ group attached to the hydroxylated A group represented by Formula $\chi_3$. Further, as indicated in Reaction Sequence C, the group represented by Formula $\chi_3$ optionally can be substituted with one or more additional $R^2$ groups, each of which may also comprise a lengthening agent L that is the same or different from the remaining Ls.

In Reaction Sequence D (below), the hydroxy substituted naphthol represented by Formula $\delta_1$ is reacted with chlorine to form the compound represented by Formula $\delta_2$. The compound represented by Formula $\delta_2$ is reacted with the L substituted piperidine represented by Formula $\delta_3$ to form the material represented by Formula $\delta_4$. The material represented by Formula $\delta_4$ is reduced in a hydrogen atmosphere over a palladium on carbon catalyst to form the L substituted $R^2$ group attached to the hydroxylated A group represented by Formula $\delta_5$.

Reaction Sequence D

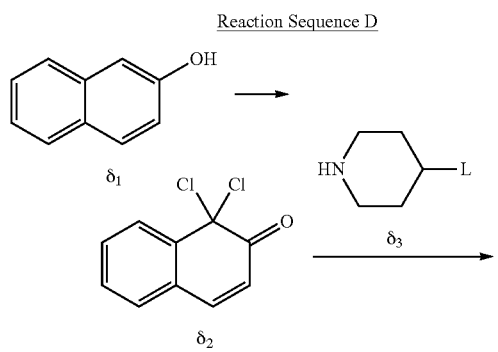

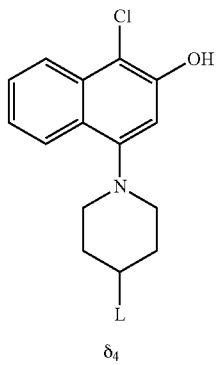

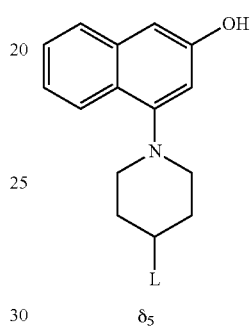

Reaction Sequences E and F demonstrate two different methods of forming a naphthopyran substituted with a lengthening agent L to form a photochromic naphthopyran according to various non-limiting embodiments disclosed herein.

Reaction Sequence E

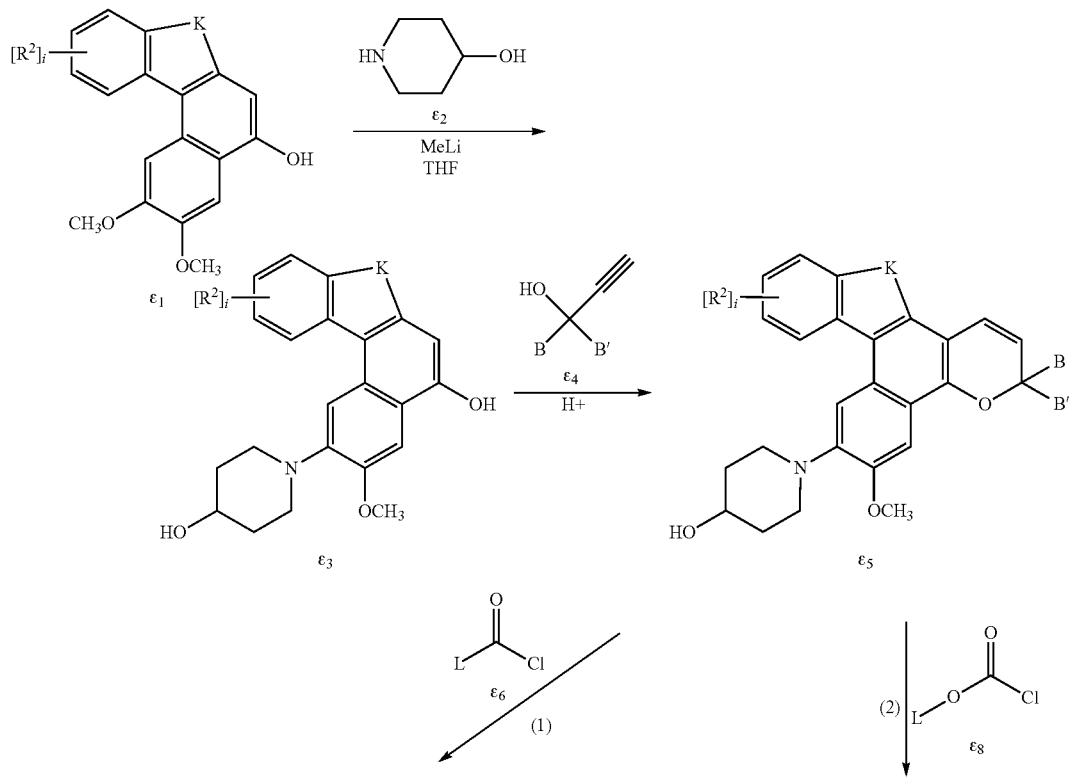

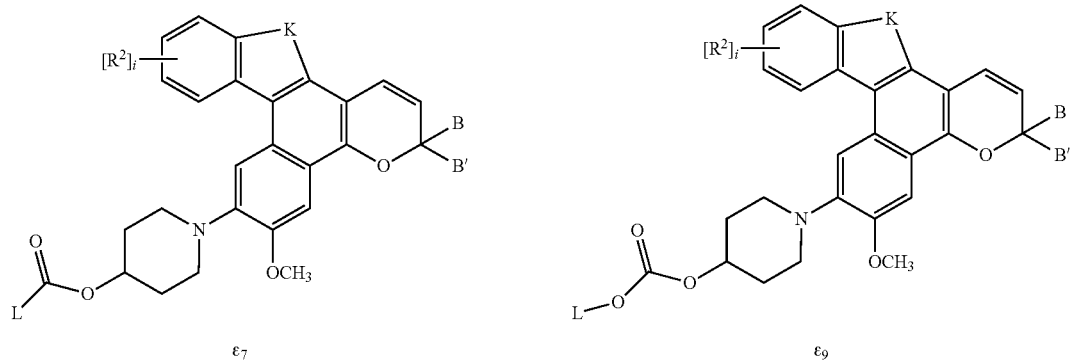

In Reaction Sequence E, the hydroxy substituted A group represented by Formula $\epsilon_1$, which is optionally substituted with at least one $R^2$ group, is reacted with the hydroxy substituted piperidine represented by Formula $\epsilon_2$ in the presence of an alkyl lithium, such as but not limited to methyllithium (MeLi), in anhydrous tetrahydrofuran to produce the 4-hydroxy piperidinyl attached to the hydroxylated A group represented by Formula $\epsilon_3$. The compound represented by Formula $\epsilon_3$ is then coupled with the propargyl alcohol represented by Formula $\epsilon_4$ to form the 4-hydroxy piperidinyl attached to the indeno-fused naphthopyran represented by Formula $\epsilon_5$. The naphthopyran represented by Formula $\epsilon_5$ can be further reacted, as indicated by path (1) Reaction Sequence E, in an acetylation reaction using a tertiary amine, such as but not limited to triethylamine, in a solvent, such as but not limited to methylene chloride, with the L substituted compound represented by Formula $\epsilon_6$ to produce the L substituted piperidinyl attached to the indeno-fused naphthopyran according to one non-limiting embodiment disclosed herein and represented by Formula $\epsilon_7$. Alternatively, as indicated by path (2), the naphthopyran represented by Formula $\epsilon_5$ can be reacted with the L substituted compound represented by Formula $\epsilon_8$ to produce the L substituted piperidinyl attached to the indeno-fused naphthopyran according to one non-limiting embodiment disclosed herein and represented by Formula $\epsilon_9$. Further, as indicated in Reaction Sequence E, the L substituted piperidinyl attached to the indeno-fused naphthopyrans represented by Formula $\epsilon_7$ and Formula $\epsilon_9$ can optionally be substituted with one or more additional $R^2$ groups, each of which may comprise lengthening agent L that is the same or different from the remaining Ls.

In Reaction Sequence F (below), the hydroxylated A group represented by Formula $\phi_1$ is coupled with the propargyl alcohol represented by Formula $\phi_2$ to produce the naphthopyran represented by Formula $\phi_3$. The naphthopyran by Formula $\phi_3$ is then reacted with the L substituted phenylamine of Formula $\phi_4$ to produce the L substituted phenylamine attached to the naphthopyran represented by Formula $\phi_5$ according to various non-limiting embodiments disclosed herein. Non-limiting examples of suitable B and B' substituent groups are set forth above in detail.

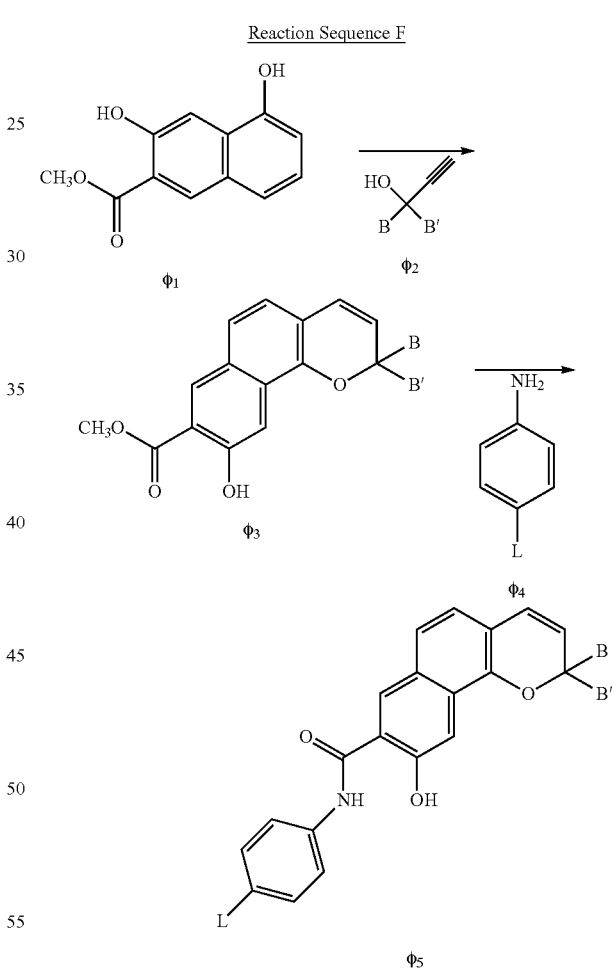

Although not limiting herein, in the hydroxy substituted A group represented by Formulae $\beta_1$ and $\epsilon_1$ (which are set forth in Reaction Sequences B and E, respectively), K can be a carbon that is di-substituted with methyl to form 2,3-dimethoxy-7,7-dimethyl-7H-benzo[c]fluoren-5-ol. Those skilled in the art will recognize numerous methods of making such a hydroxy substituted A group. For example, and without limitation, one method of forming 2,3-dimethoxy-7,7-dimethyl-7H-benzo[c]fluoren-5-ol is set forth in step 2 of Example 9 of U.S. Pat. No. 6,296,785, which is hereby specifically incorporated by reference. More specifically, as set forth in step 2 of Example 9 of U.S. Pat. No. 6,296,785, one non-limiting method of forming 2,3-dimethoxy-7,7-dimethyl-7H-benzo[c]fluoren-5-ol is as follows.

In a first step, 1,2-dimethoxybenzene (92.5 grams) and a solution of benzoyl chloride (84.3 grams) in 500 milliliters (mL) of methylene chloride is added to a reaction flask fitted with a solid addition funnel under a nitrogen atmosphere. Solid anhydrous aluminum chloride (89.7 grams) is added to the reaction mixture with occasionally cooling of the reaction mixture in an ice/water bath. The reaction mixture is stirred at room temperature for 3 hours. The resulting mixture is poured into 300 mL of a 1:1 mixture of ice and 1N hydrochloric acid and stirred vigorously for 15 minutes. The mixture is extracted twice with 100 mL methylene chloride. The organic layers are combined and washed with 50 mL of 10 weight percent sodium hydroxide followed by 50 mL of water. The methylene chloride solvent is removed by rotary evaporation to give a yellow solid. Recrystallization from 95 percent ethanol yields 147 grams of beige needles having a melting point of 103-105° C. The product is believed to have a structure consistent with 3,4,-dimethoxybenzophenone.

In a second step, potassium t-butoxide (62 grams) and 90 grams of the product from preceding Step 1, is added to a reaction flask containing 300 mL of toluene under a nitrogen atmosphere. The mixture is heated to reflux and dimethyl succinate (144.8 grams) is added dropwise over 1 hour. The mixture is refluxed for 5 hours and cooled to room temperature. 300 mL of water is added to the reaction mixture and vigorously stirred for 20 minutes. The aqueous and organic phases separate and the organic phase is extracted with 100 mL portions of water three times. The combined aqueous layers are washed with 50 mL portions of chloroform three times. The aqueous layer is acidified to pH 2 with 6N hydrochloric acid and a precipitate forms and is removed by filtration. The aqueous layer is extracted with three 100 mL portions of chloroform. The organic extracts are combined and concentrated by rotary evaporation. The resulting oil is believed to have a structure consistent with a mixture of (E and Z) 4-(3,4-dimethoxyphenyl)-4-phenyl-3-methoxycarbonyl-3-butenoic acids.

In a third step, the product from preceding Step 2 (8.6 grams), 5 mL of acetic anhydride, and 50 mL of toluene are added to a reaction flask under a nitrogen atmosphere. The reaction mixture is heated to 110° C. for 6 hours and cooled to room temperature, and the solvents (toluene and acetic anhydride) are removed by rotary evaporation. The residue is dissolved in 300 mL of methylene chloride and 200 mL of water. Solid sodium carbonate is added to the biphasic mixture until bubbling ceased. The layers separate and the aqueous layer is extracted with two 50 mL portions of methylene chloride. The organic layers are combined and the solvent (methylene chloride) is removed by rotary evaporation to yield a thick red oil. The oil is dissolved in warm methanol and chilled at 0° C. for 2 hours. The resulting crystals are collected by vacuum filtration, washed with cold methanol to produce 5 grams of a product having a melting point of 176-177° C. The recovered solid product is believed to have structures consistent with a mixture of 1-(3,4-dimethoxyphenyl)-2-methoxycarbonyl-4-acetoxynaphthalene and 1-phenyl-2-methoxycarbonyl-4-acetoxy-6,7-dimethoxynaphthalene.

In a fourth step, five (5) grams of the product mixture from preceding Step 3, 5 mL of 12M hydrochloric acid, and 30 mL of methanol are combined in a reaction flask and heated to reflux for 1 hour. The reaction mixture is cooled and the resulting precipitate is collected by vacuum filtration and washed with cold methanol. The product is purified by filtering through a plug of silica gel using a 2:1 mixture of hexane and ethyl acetate as the eluant. Concentration of the filtrate by rotary evaporation yields 3 grams of a beige solid that is believed to have a structure consistent with 1-phenyl-2-methoxycarbonyl-6,7-dimethoxynaphth-4-ol.

In a fifth step, a reaction flask is charged with 2.8 grams of the product of preceding Step 4 under a nitrogen atmosphere. Anhydrous tetrahydrofuran (40 mL) is added to the flask. The reaction mixture is cooled in a dry ice/acetone bath and 41 mL of a methyl magnesium chloride solution (1M in tetrahydrofuran) is added dropwise over 15 minutes. The resulting yellow reaction mixture is stirred at 0° C. for 2 hours and slowly warmed to room temperature. The reaction mixture is poured into 50 mL of an ice/water mixture. Ether (20 mL) is added, and the layers separate. The aqueous layer is extracted with two 20 mL portions of ether, and the organic portions are combined and washed with 30 mL of water. The organic layer is dried over anhydrous magnesium sulfate and concentrated by rotary evaporation. The resulting oil is transferred into a reaction vessel (fitted with a Dean-Stark trap) containing 50 mL of toluene to which two drops of dodecylbenzene sulfonic acid are added. The reaction mixture is heated to reflux for 2 hours and cooled. The toluene is removed via rotary evaporation to yield 2 grams of the desired compound.

In accordance with additional embodiments, the photochromic-dichroic compound can be a photochromic spiropyran or spiro-oxazine that is represented by the following Formula VII:

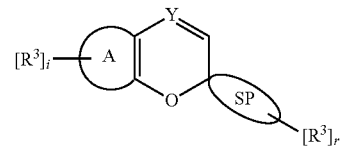

With reference to Formula VII:
(a) A is chosen from naphtho, benzo, phenanthro, fluorantheno, antheno, quinolino, thieno, furo, indolo, indolino, indeno, benzofuro, benzothieno, thiopheno, indeno-fused naphtho, heterocyclic-fused naphtho, and heterocyclic-fused benzo;
(b) Y is C or N;
(c) SP is a spiro-group chosen from indolino and benzindolino; and
(d) i is an integer chosen from 0 to the total number of available positions on A, r is an integer chosen from 0 to the total number available positions on SP, provided that the sum of i+r is at least one and each $R^3$ is independently chosen for each occurrence from,
  (i) a lengthening agent L represented by Formula I above, and
  (ii) a group represented by $R^1$ above.
In addition, there is the proviso that the photochromic-dichroic compound represented by Formula VII includes at least one lengthening agent (L) represented by Formula I above.

As with the photochromic compounds represented by Formula II, the photochromic compounds represented by Formula VII can be extended at any available position by substitution with L or an $R^3$ group substituted with L, and/or in any desired direction by numerous combinations of substitutions of available positions with L or $R^3$ groups substituted with L. For example, the photochromic compounds represented by Formula VII can be extended by substituting the SP group (or Ring-SP) with L or an $R^3$ group substituted with L, and/or by substituting the A group (or Ring-A) with L or an $R^3$ group substituted with L so as to provide a desired average absorption ratio of the photochromic compound.

With some embodiments, the photochromic-dichroic compounds of the photochromic articles of the present invention can be represented by the following Formula VIII:

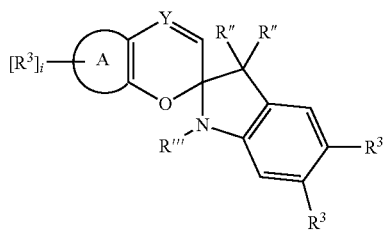

VIII

With reference to Formula VIII, each R" is independently chosen for each occurrence from hydrogen, a substituted or unsubstituted alkyl, cycloalkyl, arylalkyl, or together form cycloalkyl that is substituted or unsubstituted; R'" is chosen from an alkyl, aryl, or arylalkyl group that is unsubstituted or substituted with at least one of: (i) —CH(CN)$_2$ or —CH(COOX$_1$)$_2$; (ii) —CH(X$_2$)(X$_3$); and (iii) —C(O)X$_{24}$ (in which X$_1$, X$_2$, X$_3$, and X$_{24}$ are as set forth above); and (iv) halogen, hydroxy, ester, or amine. At least one of subscript (i) and subscript (r) is at least 1, and at least one $R^3$ includes L. With some further embodiments, at least one $R^3$ is L. As discussed above with respect to Formula VII, Y in Formula VIII can be chosen from C or N. For example, with some embodiments, Y can be C, and the photochromic compound can be a spiro(indolino)pyran. In accordance with further embodiments, Y can be N, and the photochromic compound can be a spiro(indolino)oxazine.

In accordance with further embodiments, the photochromic-dichroic compounds of the photochromic articles of the present invention can be represented by the following Formula IX.

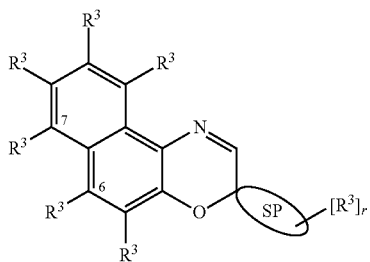

IX

With reference to Formula IX, at least one of, the $R^3$ in the 6-position and/or the $R^3$ in the 7-position includes a lengthening agent L. With some further embodiments, at least one of the $R^3$ group in the 6-position and/or the $R^3$ group 7-position of Formula IX is a lengthening agent L.

In accordance with additional embodiments, the photochromic-dichroic compounds of the photochromic articles of the present invention can be represented by Formula X:

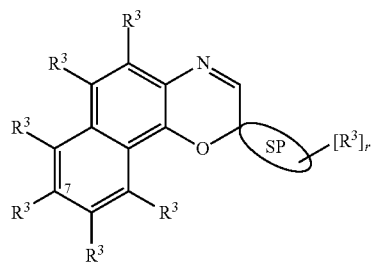

X

With reference to Formula X, at least the $R^3$ in the 7-position includes a lengthening agent L. With some further embodiments, the $R^3$ group in the 7-position is a lengthening agent L.

With additional embodiments, the photochromic-dichroic compounds of the photochromic articles of the present invention can be represented by the following Formula XI.

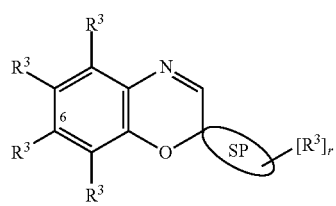

XI

With reference to Formula XI, at least the $R^3$ group in the 6-position includes a lengthening agent L. With some further embodiments, the $R^3$ group in the 6-position is a lengthening agent L.

A general reaction scheme for synthesizing photochromic-dichroic compounds represented by Formula VII is depicted below in Reaction Sequence G.

Reaction Sequence G

Part 1:

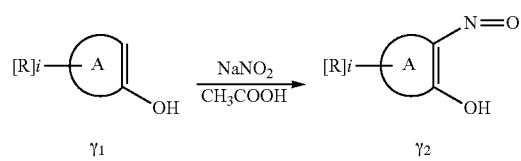

Reaction Sequence G, Part 1 depicts a general nitrosation process in which the hydroxylated A group represented by of Formula $\gamma_1$ is reacted with sodium nitrite in the presence of an acid, such as but not limited to acetic acid, to produce the nitroso-substituted A group represented by Formula $\gamma_2$. Suitable non-limiting examples of A groups include naphtha, benzo, phenanthro, fluorantheno, antheno, quinolino, indeno-fused naphtha, heterocyclic-fused naphtho, and heterocyclic-fused benzo. Optionally, the A group can be substituted with one or more $R^3$ groups, each of which may comprise a lengthening agent L that is the same or different from the remaining Ls.

Part 2:

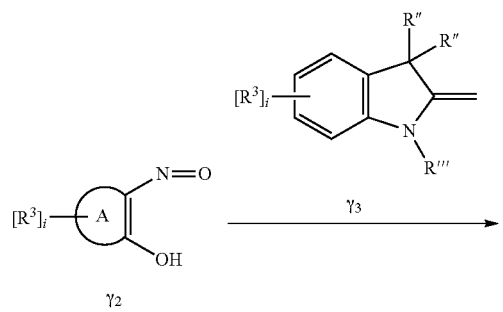

In Part 2 of Reaction Sequence G, the nitroso-substituted A group represented by Formula $\gamma_2$ is coupled with a Fischer's base represented by Formula $\gamma_3$. The coupling is conducted in a solvent, such as but not limited to absolute ethanol, and heated under reflux conditions to produce the photochromic oxazine represented by Formula $\gamma_4$ according to various non-limiting embodiments disclosed herein.

The general nitrosation process shown in Part 1 of Reaction Sequence G is more specifically set forth in the following two sequences (Reaction Sequences H and I), which generally depict two nitroso phenol synthesis processes for producing nitroso-substituted A groups, which can optionally be substituted with at least one $R^3$, that can be used in coupling reactions to produce the oxazine products of the present invention. As illustrated in Path (2) of Sequences H and I, prior to reacting with $NaNO_2$, the intermediate compound can be further reacted with one or more other reactants to form a suitable lengthening agent L on the A group.

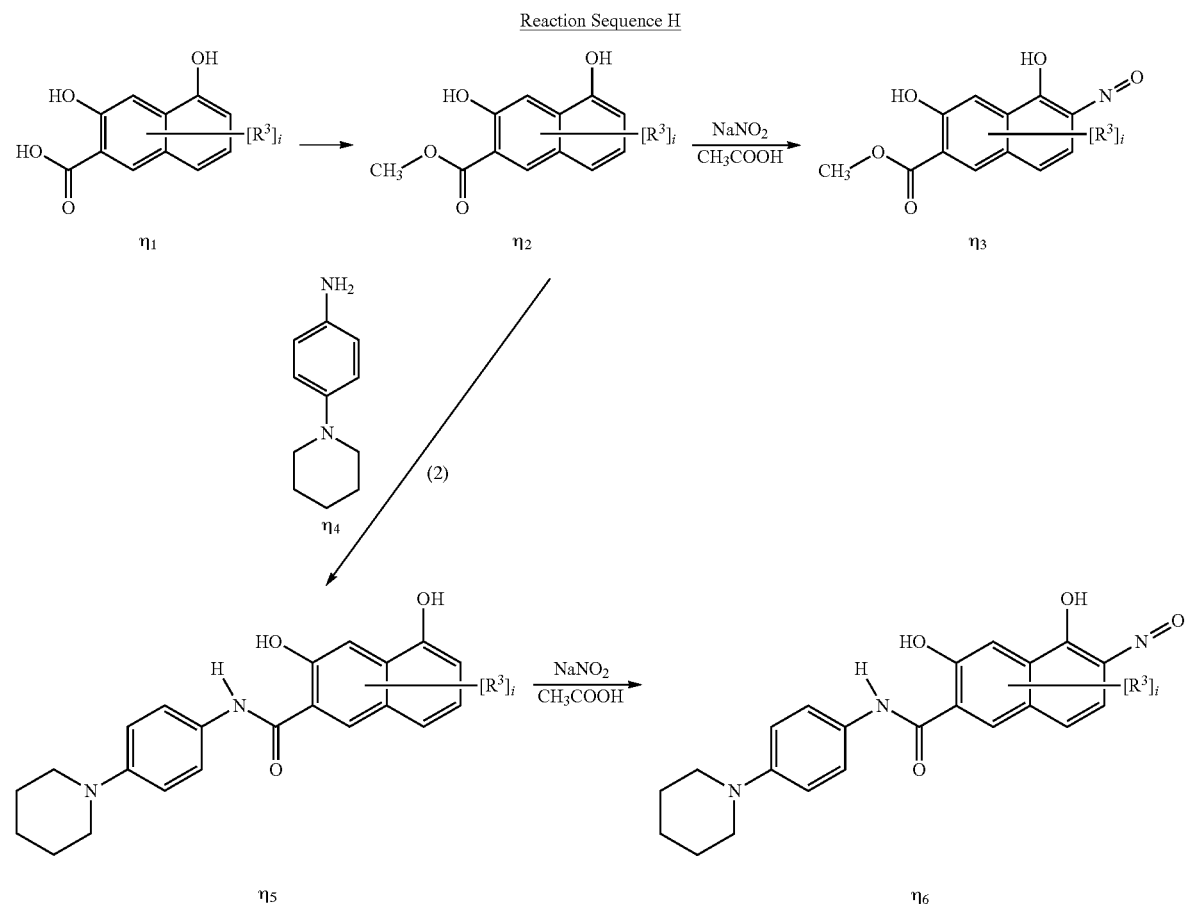

Reaction Sequence H

-continued

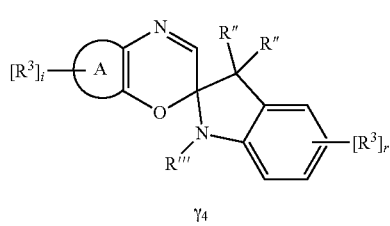

More particularly, in Reaction Sequence H, the carboxylic acid of the hydroxylated A group represented by Formula $\eta_1$ is converted into ester of hydroxylated A group represented by Formula $\eta_2$. Ester of the hydroxylated A group represented by Formula $\eta_2$ can then be reacted with sodium nitrite in the presence of an acid, such as but not limited to acetic acid, to produce the nitroso-substituted A group of Formula $\eta_3$. Alternatively, as shown in Path (2), ester of hydroxylated A group represented by Formula $\eta_2$ can be reacted with 4-piperidinoaniline (represented by Formula $\eta_4$) under basic conditions to produce the L substituted compound represented by Formula $\eta_5$. The L substituted compound represented by Formula $\eta_5$ is then subjected to the nitrosation reaction to produce the L and nitroso substituted A group represented Formula $\eta_6$. Further, the L and nitroso substituted A group optionally can be substituted with one or more $R^3$ groups, each of which can comprise a lengthening agent L which is the same or different from the remaining Ls.

As discussed above with respect to Reaction Sequence H, in Reaction Sequence I (below) the carboxylic acid of the hydroxylated A group represented by Formula $\iota_1$ is converted into the ester of the hydroxylated the A group represented by Formula $\iota_2$. The ester of hydroxylated A group represented by Formula $\iota_2$ can then be reacted with sodium nitrite in the presence of an acid, such as but not limited to acetic acid, to produce the nitroso-substituted A group of Formula $\iota_3$. Alternatively, as shown in Path (2), ester of hydroxylated the A group represented by Formula $\iota_2$ can be reacted with 4-phenyl aniline (represented by Formula $\iota_4$) under basic conditions to produce the L substituted 4-phenyl aniline represented by Formula $\iota_5$. The L substituted 4-phenyl aniline represented by Formula $\iota_5$ is then subjected to the nitrosation reaction to produce the L and nitroso substituted A group represented Formula $\iota_6$. As discussed above, the (L substituted (nitroso substituted A groups)), optionally can be substituted with one or more $R^3$ groups, each of which can comprise a lengthening agent L which is the same or different from the remaining Ls.

More specific and non-limiting reaction sequences for synthesizing the photochromic compounds of the photochromic articles of the present invention are depicted below in Reaction Sequences J and K.

In Reaction Sequence J (below), a nitrosophenol represented by Formula $\phi_1$ is reacted in methanol with a lengthening agent L, which is piperazino phenol (represented by Formula $\phi_2$), to form the L substituted nitrosonaphthol represented by Formula $\phi_3$. As depicted in Reaction Sequence J, the L substituted nitrosonaphthol can be further substituted with one or more R groups, each of which may comprise a lengthening agent L that is the same or different from the remaining L substituents. The L substituted nitrosonaphthol represented by Formula $\phi_3$ is then coupled by heating with the Fischer's base represented by Formula $\phi_4$ to produce the L substituted naphthoxazine represented by Formula $\phi_5$.

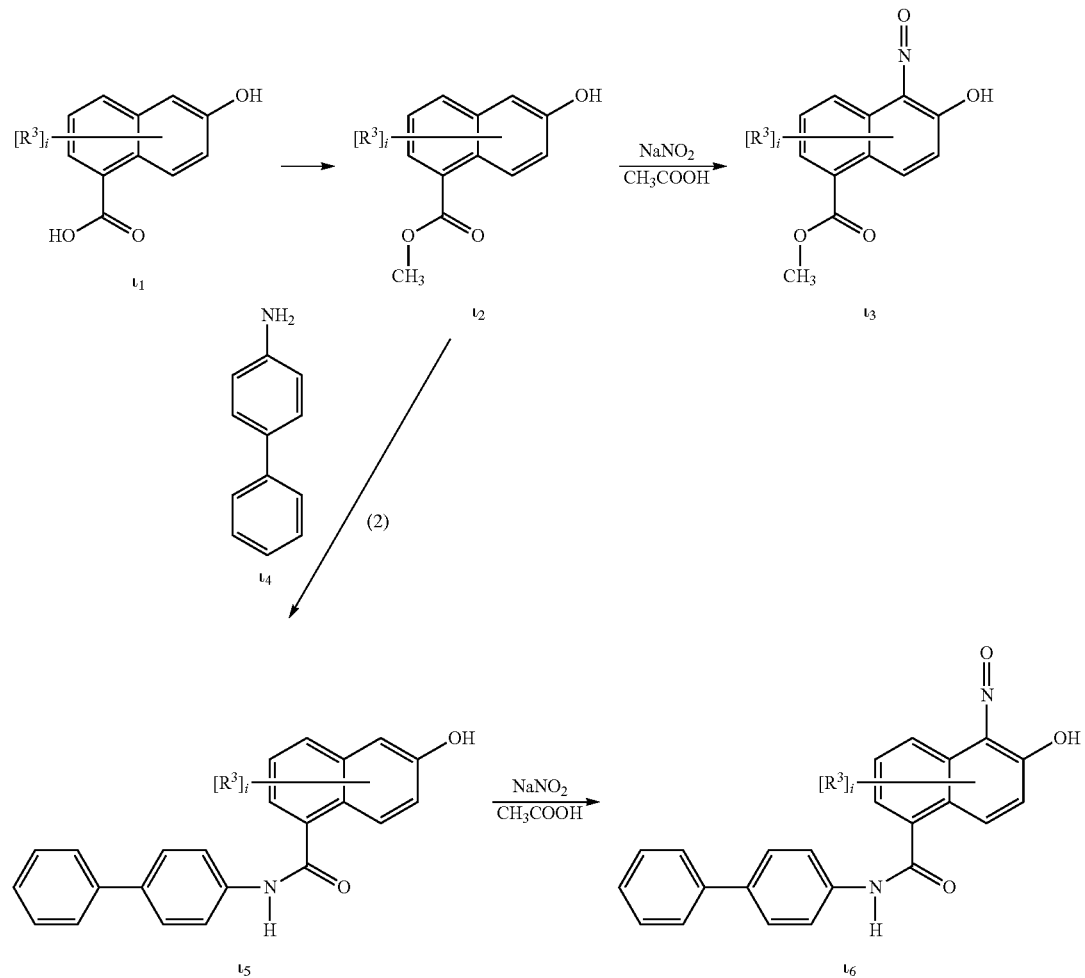

Reaction Sequence I

Reaction Sequence J

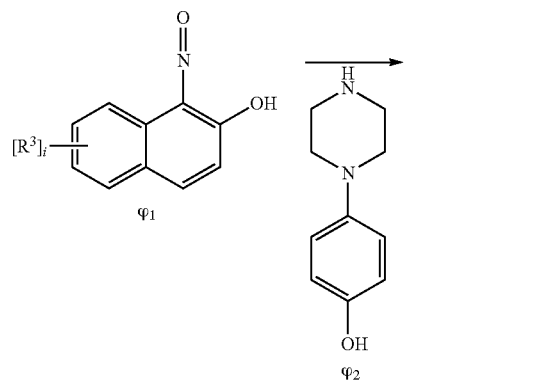

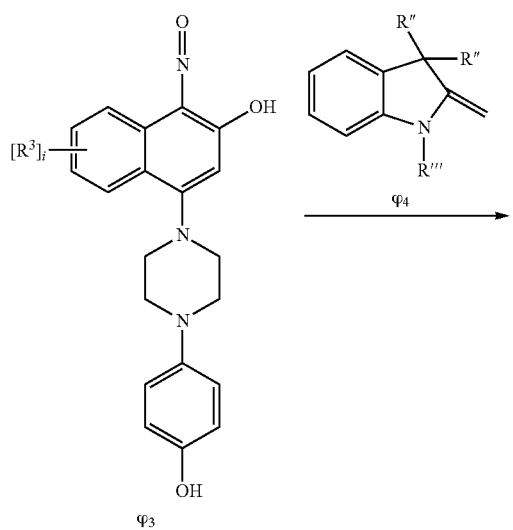

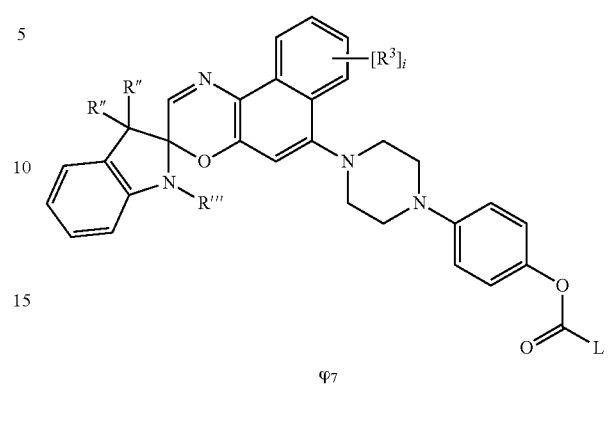

With further reference to Reaction Sequence J, the L substituted naphthoxazine represented by Formula $\phi_5$ can be further extended by reacting the L substituted naphthoxazine with another L substituted compound represented by Formula $\phi_6$ to produce a naphthoxazine represented by Formula $\phi_7$ according to various non-limiting embodiments disclosed herein. Further, as previously discussed and as depicted in Reaction Sequence J, naphthoxazine represented by Formula $\phi_7$ optionally can be substituted with one or more $R^3$ groups, each of which may comprise a lengthening agent L that is the same or different from the remaining Ls.

As illustrated above in Reaction Sequence J, generally after coupling the nitrosophenol with the Fischer's base, the resultant naphthoxazine can be further reacted with one or more other reactants to extend the naphthoxazine with lengthening agent L. However, those skilled in the art will appreciate that, additionally or alternatively, prior to coupling the nitrosophenol with the Fischer's base, the nitrosophenol can be reacted to substitute the nitrosophenol with one or more lengthening agents L (for example as shown above in Reaction Sequences H and I). Further, such L substituted nitrosophenols can be coupled with a Fischer's base to form an L-substituted naphthoxazine as generally depicted in Reaction Sequence K, below.

Reaction Sequence K

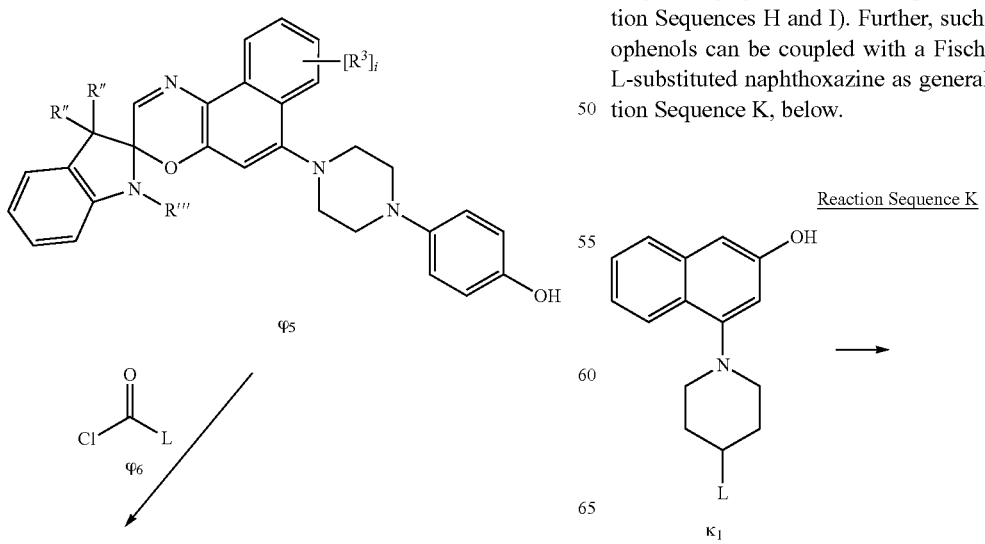

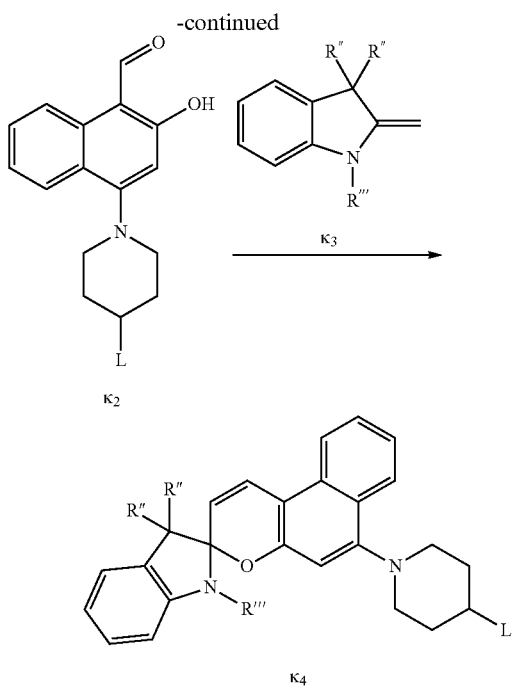

More particularly, in Reaction Sequence K, an L substituted piperidinylnaphthol represented by Formula $\kappa_1$ is reacted with trialkoxymethane and heated to form the L and formyl substituted naphthol represented by Formula $\kappa_2$. The compound represented by Formula $\kappa_2$ is then reacted with the Fischer's base (represented by Formula $\kappa_3$) to produce the L substituted spironaphthopyran represented by Formula $\kappa_4$ according to various non-limiting embodiments disclosed herein.

As previously discussed, generally after coupling the nitrosophenol with the Fischer's base (for example as shown in Reaction Sequence J), the resultant naphthoxazine can be further reacted with one or more other reactants to extend the naphthoxazine with lengthening agent L. Several non-limiting examples of such extension are provided in the generalized Reaction Sequence M below.

More specifically, in Reaction Sequence M (below), three paths for adding a lengthening agent L to a naphthoxazine to produce the photochromic oxazines according to various non-limiting embodiments disclosed herein. In the first path (1), the naphthoxazine represented by Formula $\mu_1$ is reacted with hydroxyphenylpiperazine to produce the material represented by Formula $\mu_2$. The material represented by Formula $\mu_2$ is benzoylated with hexylbenzoylchloride to produce the material represented by Formula $\mu_3$. In the second path (2), the material represented by Formula $\mu_1$ undergoes hydrolysis and is converted into the material of Formula $\mu_4$. In an esterification reaction with a phenol-like material in the presence of dicyclohexylcarbodiimide in methylene chloride the material represented by Formula $\mu_4$ is converted into the material represented by Formula $\mu_5$ having the tetrahydropyran protecting group. The material represented by Formula $\mu_5$ is deprotected by a dilute solution of hydrochloric acid in an alcoholic solvent, such as but not limited to ethanol, to form the material represented by Formula $\mu_6$. The material represented by Formula $\mu_6$ is reacted with a cholesterol chloroformate to form the material represented by Formula $\mu_7$. In the third path (3), the material represented by Formula $\mu_6$ is benzoylated with 4-phenylbenzoylchloride to form the material represented by Formula $\mu_8$.

Reaction Sequence M
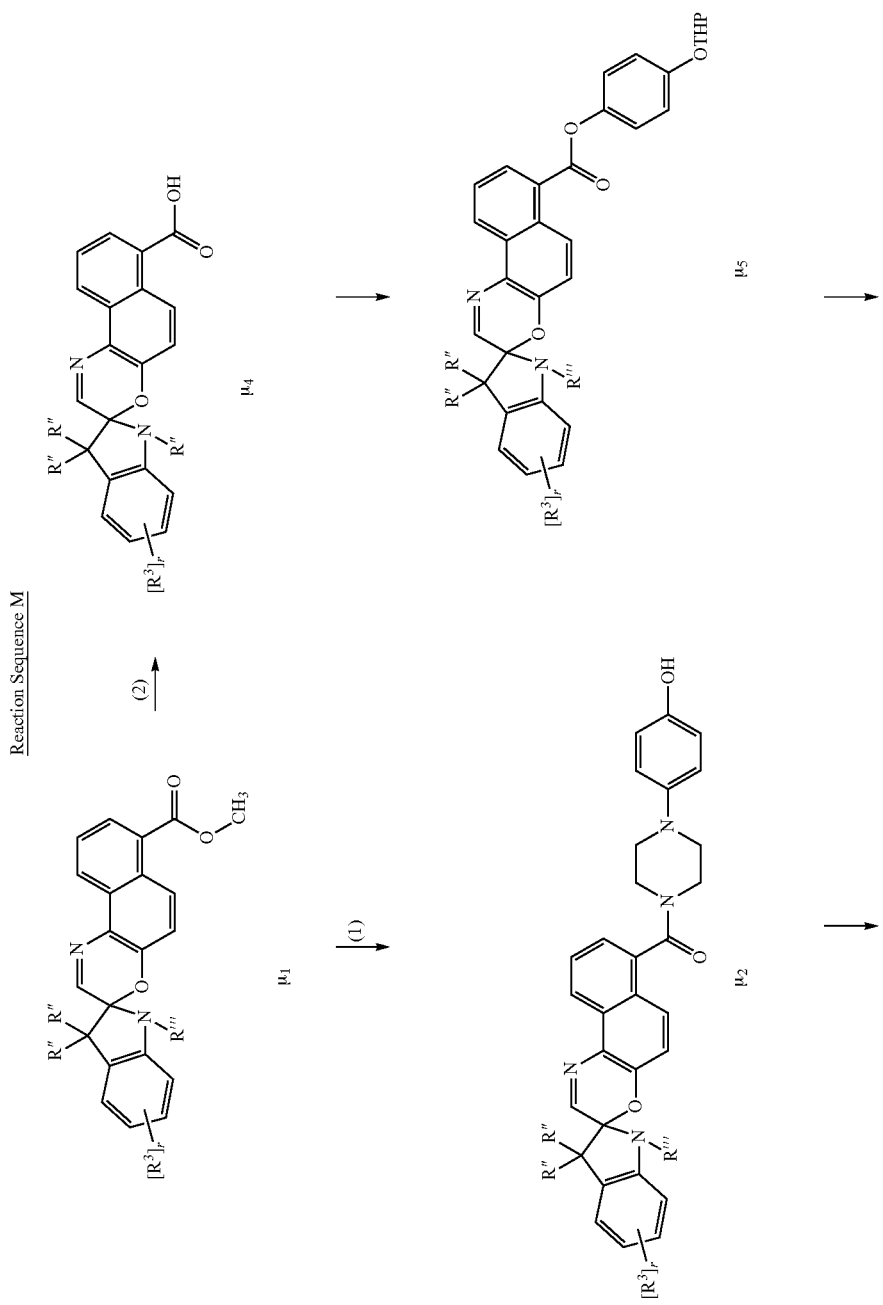

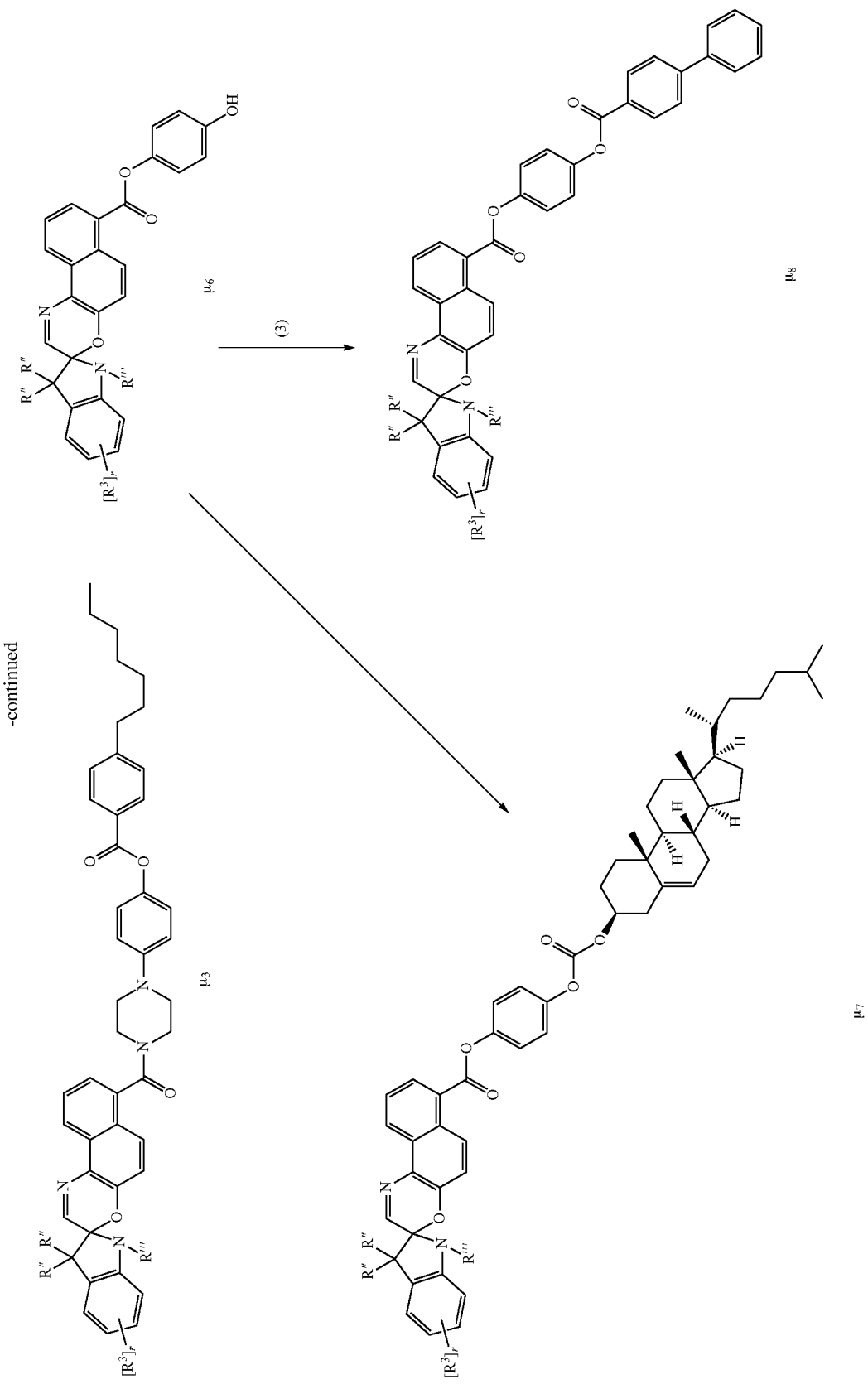

The photochromic-dichroic compounds of the photochromic articles of the present invention can with some embodiments be represented by the following Formula XII:

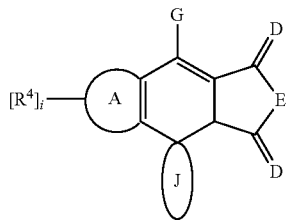

XII

With reference to Formula XII, (a) A (Ring-A) is chosen from naphtho, benzo, phenanthro, fluorantheno, antheno, quinoline, thieno, furo, indolo, indolino, indeno, benzofuro, benzothieno, thiopheno, indeno-fused naphtho, heterocyclic-fused naphtho, and heterocyclic-fused benzo.

With further reference to Formula XII: (b) J is a spiro-alicyclic ring; (c) each D is independently chosen from O, N(Z), C(X$_4$), C(CN)$_2$, in which Z is independently chosen for each occurrence from hydrogen, $C_1$-$C_6$ alkyl, cycloalkyl and aryl; and (d) G is group chosen from alkyl, cycloalkyl, and aryl, which can be unsubstituted or substituted with at least one substituent $R^4$.

With continued reference to Formula XII, (e) E is —O— or is —N($R^5$)—, in which $R^5$ is chosen from: (i) hydrogen, $C_1$-$C_{12}$ alkyl, $C_2$-$C_{12}$ alkene, $C_2$-$C_{12}$ alkyne, vinyl, $C_3$-$C_7$ cycloalkyl, $C_1$-$C_{12}$ haloalkyl, allyl, halogen, and benzyl that is unsubstituted or mono-substituted with at least one of $C_1$-$C_{12}$ alkyl and $C_1$-$C_{12}$ alkoxy; (ii)phenyl that is mono-substituted at the para position with at least one substituent chosen from: $C_1$-$C_7$ alkoxy, linear or branched chain $C_1$-$C_{20}$ alkylene, linear or branched chain $C_1$-$C_4$ polyoxyalkylene, cyclic $C_3$-$C_{20}$ alkylene, phenylene, naphthylene, $C_1$-$C_4$ alkyl substituted phenylene, mono- or poly-urethane($C_1$-$C_{20}$)alkylene, mono- or poly-ester($C_1$-$C_{20}$)alkylene, mono- or poly-carbonate($C_1$-$C_{20}$)alkylene, polysilanylene, polysiloxanylene and mixtures thereof, wherein the at least one substituent is connected to an aryl group of a photochromic material; (iii) —CH(CN)$_2$ and —CH(COOX$_1$)$_2$, in which X$_1$ is as set forth above; (iv) —CH(X$_2$)(X$_3$), wherein X$_2$ and X$_3$ are as set forth above;

With some embodiments, and with further reference to Formula XII, $R^5$ can be chosen from (v) an unsubstituted, mono-, di-, or tri-substituted aryl group, such as phenyl, naphthyl, phenanthryl, or pyrenyl; 9-julolidinyl; or an unsubstituted, mono- or di-substituted heteroaromatic group chosen from pyridyl, furanyl, benzofuran-2-yl, benzofuran-3-yl, thienyl, benzothien-2-yl, benzothien-3-yl, dibenzofuranyl, dibenzothienyl, carbazoyl, benzopyridyl, indolinyl, and fluorenyl. The substituents thereof are independently chosen for each occurrence from: (A) a lengthening agent L represented by Formula I above; (B) —C(O)X$_6$, wherein X$_6$ is as set forth above; (C) aryl, haloaryl, $C_3$-$C_7$ cycloalkylaryl, and an aryl group that is mono- or di-substituted with $C_1$-$C_{12}$ alkyl or $C_1$-$C_{12}$ alkoxy; (D) $C_1$-$C_{12}$ alkyl, $C_3$-$C_7$ cycloalkyl, $C_3$-$C_7$ cycloalkyoxy($C_1$-$C_{12}$)alkyl, aryl($C_1$-$C_{12}$)alkyl, aryloxy($C_1$-$C_{12}$)alkyl, mono- or di-($C_1$-$C_{12}$)alkylaryl($C_1$-$C_{12}$)alkyl, mono- or di-($C_1$-$C_{12}$)alkoxyaryl($C_1$-$C_{12}$)alkyl, haloalkyl, and mono($C_1$-$C_{12}$)alkoxy($C_1$-$C_{12}$)alkyl; (E) $C_1$-$C_{12}$ alkoxy, $C_3$-$C_7$ cycloalkoxy, cycloalkyloxy($C_1$-$C_{12}$)alkoxy, aryl($C_1$-$C_{12}$)alkoxy, aryloxy($C_1$-$C_{12}$)alkoxy, mono- or di-($C_1$-$C_{12}$)alkylaryl($C_1$-$C_{12}$)alkoxy, and mono- or di-($C_1$-$C_{12}$)alkoxyaryl($C_1$-$C_{12}$)alkoxy; (F) amido, amino, mono- or di-alkylamino, diarylamino, piperazino, N—($C_1$-$C_{12}$)alkylpiperazino, N-arylpiperazino, aziridino, indolino, piperidino, morpholino, thiomorpholino, tetrahydroquinolino, tetrahydroisoquinolino, pyrrolidyl, hydroxy, acryloxy, methacryloxy, and halogen; (G) —OX$_7$ and —N(X$_7$)$_2$, wherein X$_7$ is as set forth above; (H) —SX$_{11}$, wherein X$_{11}$ is as set forth above; (I) a nitrogen containing ring represented by Formula i, which is set forth above; and (J) a group represented by one of Formula ii or iii, which are set forth above.

With some embodiments, and with further reference to Formula XII, $R^5$ can be chosen from: (vi) an unsubstituted or mono-substituted group chosen from pyrazolyl, imidazolyl, pyrazolinyl, imidazolinyl, pyrrodlinyl, phenothiazinyl, phenoxazinyl, phenazinyl, or acridinyl, wherein each substituent is independently chosen from a lengthening agent L, $C_1$-$C_{12}$ alkyl, $C_1$-$C_{12}$ alkoxy, phenyl, hydroxy, amino or halogen; (vii) a group represented by one of Formula iv or v, which are set forth above; (viii) a group represented by Formula vi, which is set forth above; and (ix) a lengthening agent L represented by Formula I (above).

With further reference to Formula XII, (f) subscript (i) is an integer chosen from 0 to the total available positions on A (Ring-A), and each $R^4$ is independently chosen for each occurrence from: (i) a lengthening agent L represented by Formula I; and (ii) a group represented by $R^1$.

With continued reference to Formula XII, the photochromic-dichroic compound represented by Formula XII is subject to the proviso that it includes at least one lengthening agent (L) represented by Formula I above.

As discussed with respect to the photochromic-dichroic compounds set forth above, the photochromic-dichroic compounds generally represented by Formula XII can be extended at any available position by substitution with L or an $R^4$ group substituted with L, and/or in any desired direction by numerous combinations of substitutions of available positions with L or $R^4$ groups substituted with L. Thus, for example, although not limiting herein, the fulgides disclosed herein can be extended by selecting at least one of D, G, and at least one $R^4$ to be L or a group substituted with L, so as to enhance the average absorption ratio of the fulgide in at least the activated state. Further, although not limiting herein, as shown and discussed in further detail below, when E is N—$R^5$, $R^5$ can be L or can be a group substituted with L.

In accordance with additional embodiments, the photochromic-dichroic compounds of the photochromic articles of the present invention can be represented by Formula XIII.

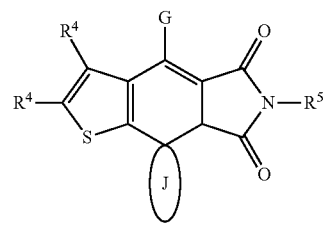

XIII

With reference to Formula XIII, at least one of, $R^5$, G or $R^4$ is a lengthening agent L.

A general reaction sequence for synthesizing the photochromic-dichroic compounds that can be used in various non-limiting embodiments disclosed herein and that are represented by Formula XII above is depicted below in Reaction Sequence N. In Reaction Sequence N (below), an alicyclic ketone represented by Formula v$_1$ is reacted with dimethyl succinate represented by Formula v$_2$ in a Stobbe Condensation to produce the half-ester product represented by Formula v$_3$. The half-ester product represented by Formula v$_3$ is esterified to form the diester product represented by Formula v$_4$. The diester of Formula v$_4$ is reacted with a carbonyl-substituted A group represented by Formula $v_5$ in the Stobbe Condensation to produce the half-ester material represented by Formula $v_6$. As indicated Formula $v_5$, the carbonyl-substituted A group can also be substituted with one or more $R^4$ groups, each of which can comprise a lengthening agent L which is the same or different from the remaining L substituents. The half-ester material represented by Formula $v_7$ is hydrolyzed to produce the diacid material represented by Formula $v_7$, The diacid of Formula $v_7$ is reacted with acetyl chloride in an ether and/or tetrahydrofuran solvent to form the anhydride represented by Formula $v_8$.

As shown in Path (1) of Reaction Sequence N (below), the anhydride of Formula $v_5$ can be reacted with an amino substituted lengthening agent L and subsequently reacted with acetyl chloride under reflux conditions to produce the photochromic fulgimide compound represented by Formula $v_9$ according to one non-limiting embodiment disclosed herein. Alternatively, as shown in Path (2), the anhydride of Formula $v_8$ can be reacted with ammonia followed by acetyl chloride to produce the photochromic fulgide compound according to various non-limiting embodiments disclosed herein and represented by Formula $v_{10}$. Further, the photochromic fulgide compound of Formula $v_{10}$ can be further reacted with an appropriate reactant to form the photochromic fulgide compound of Formula $v_{11}$ according to various non-limiting embodiments disclosed herein, wherein the nitrogen is substituted with an $R^5$ group. Further, according to various non-limiting embodiments, the $R^5$ group can be a lengthening agent L, or can comprise a substituent group that is substituted with a lengthening agent L.

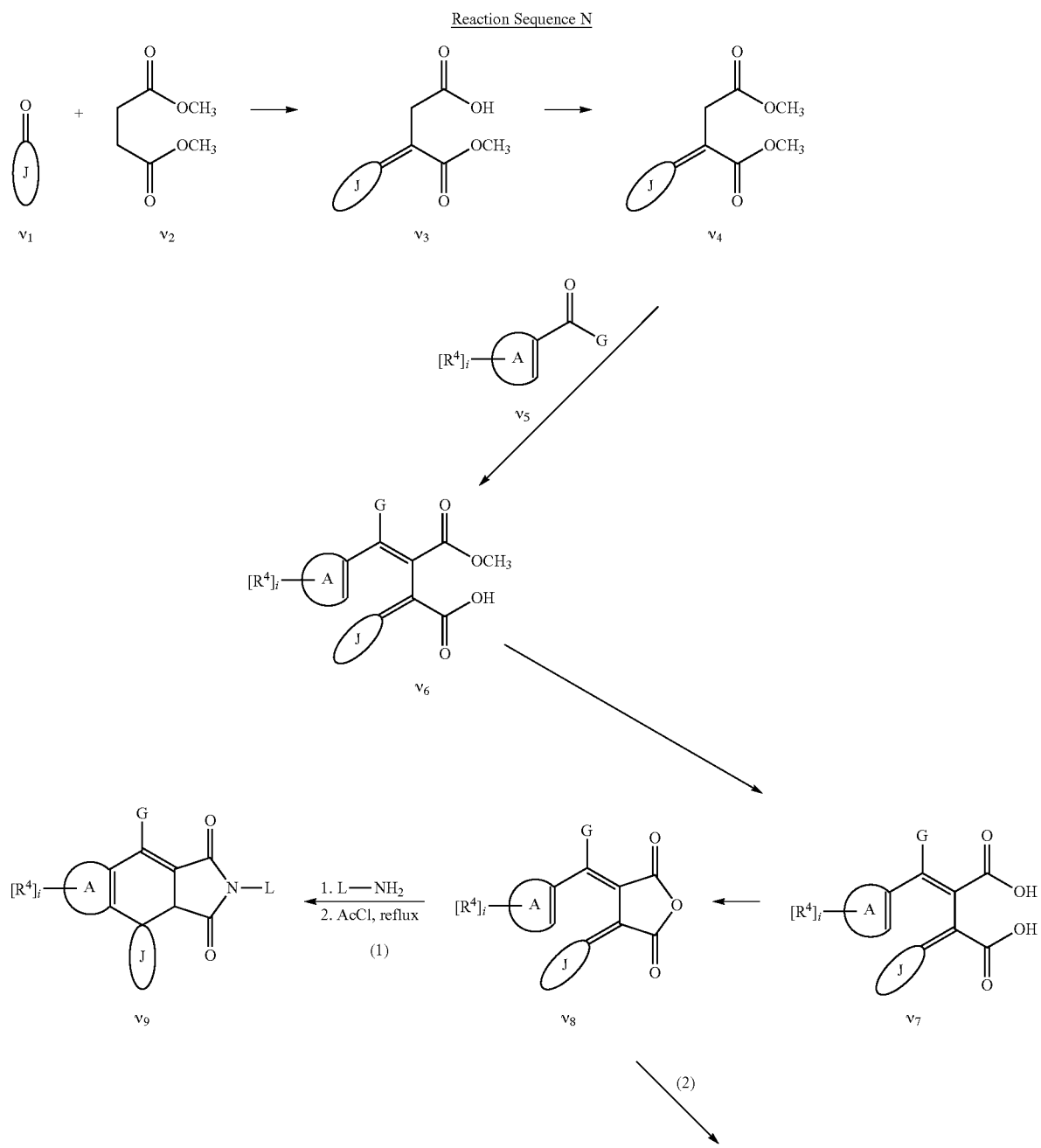

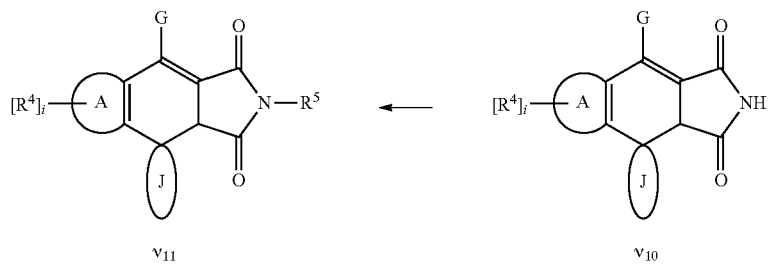

Reaction Sequences P, Q and T illustrate three general reaction schemes for substituting a lengthening agent L at various locations on a fulgide.

Reaction Sequence P

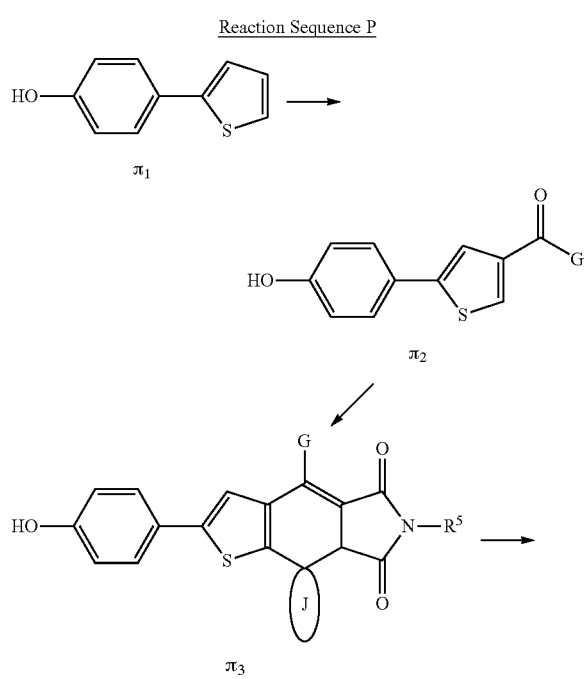

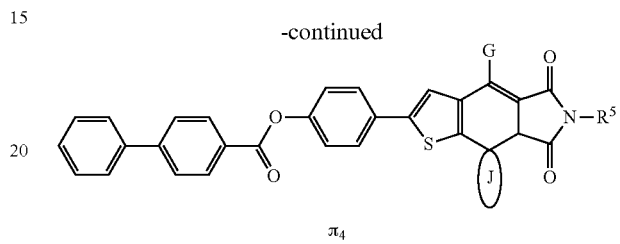

In Reaction Sequence P, the hydroxylated compound represented by Formula $\pi_1$ undergoes the Friedel-Crafts reaction to form the carbonyl-substituted group represented by Formula $\pi_2$. The material represented by Formula $\pi_2$ is reacted as described above for the material represented by Formula $v_s$ in Reaction Sequence N to form the hydroxyphenyl substituted thiophenofused fulgide represented by Formula $\pi_3$ in Reaction Sequence P. The fulgide represented by Formula $\pi_3$ is benzoylated with 4-phenylbenzoyl chloride to form the thermally reversible, photochromic compound according to one non-limiting embodiment disclosed herein and represented by Formula $\pi_4$. With additional reference to Formula XII above, as shown in Formula $\pi_4$, the A group is thiophene that is substituted with a lengthening agent L. As previously discussed, according to various non-limiting embodiments (and as shown below in Reaction Sequence Q), the $R^5$ group in Formula $\pi_4$ can be a lengthening agent L, or can comprise another substituent group that is substituted with a lengthening agent L. Further, group G can also be a lengthening agent L or can be another substituent group that is substituted with a lengthening agent L (for example, as shown below in Reaction Sequence T).

Reaction Sequence Q

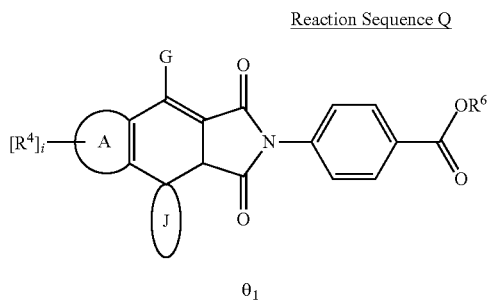

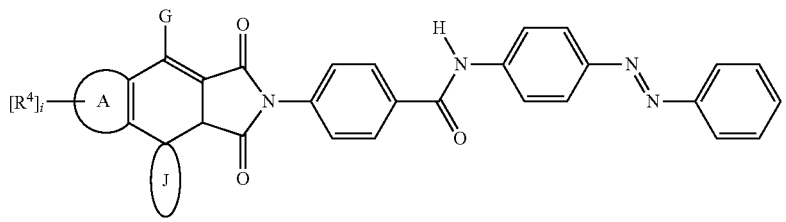

θ₂

In Reaction Sequence Q, the fulgide represented by Formula θ₁ can be made in accordance with Reaction Sequence N, with appropriate modifications that will be recognized by those skilled in the art. In Formula θ₁, the $R^5$ group attached to the nitrogen atom is a methyl ester of para-amino benzoic acid. The methyl ester of para-amino benzoic acid is then reacted with 4-aminodiazobenzene, to form the thermally reversible, photochromic compound represented by Formula θ₂ according to one non-limiting embodiment disclosed herein. As previously discussed, $R^5$ group can be a lengthening agent L or can be another substituent group that is substituted with L. Further, as previously discussed (and as depicted in Reaction Sequence P above) the A group of the thermally reversible, photochromic compound represented by Formula θ₂, optionally can be substituted with one or more $R^4$ groups, each of which may comprise a lengthening agent L that is the same or different from the remaining L substituents. Further, as shown below in Reaction Sequence T (below), the G group in Formula θ₂ can also be a lengthening agent L or can be another substituent group that is substituted with a lengthening agent L.

Reaction Sequence T

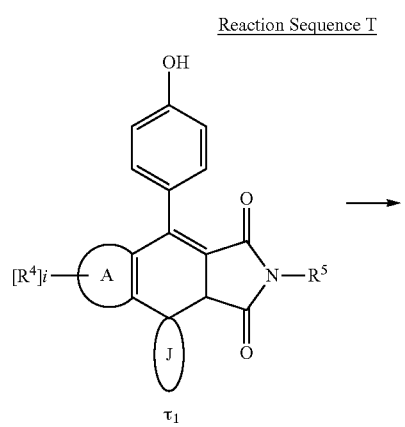

τ₁

→

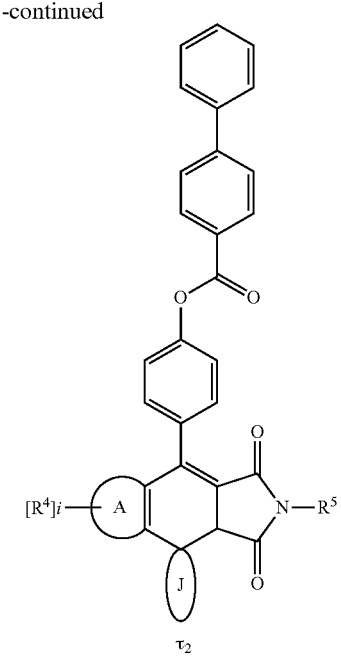

τ₂

In Reaction Sequence T, the fulgide represented by Formula τ₁ can be made in accordance with Reaction Sequence N, with appropriate modifications that will be recognized by those skilled in the art. The fulgide represented by formula τ₁ can then be reacted with para-amino benzoylchloride to form the thermally reversible, photochromic compound according to one non-limiting embodiment disclosed herein and represented by Formula τ₂. As previously discussed (and as depicted in Reaction Sequence Q above), the $R^6$ group of the thermally reversible, photochromic compound represented by Formula τ₂ can be a lengthening agent L or can be another substituent group that is substituted with L. Further, as previously discussed (and as depicted in Reaction Sequence P above) the A group of the thermally reversible, photochromic compound represented by Formula τ₂, optionally can be substituted with one or more $R^4$ groups, each of which may comprise a lengthening agent L that is the same or different from the remaining Ls.

The photochromic-dichroic layer can be include a single layer or multiple layers each including a photochromic-dichroic compound that can be the same or different. The photochromic-dichroic layer can be formed by art-recognized methods including, but not limited to: lamination, such as of one or more plastic sheets or films; in-mold formation, such as in-mold coating; film casting; and coating methods. With some embodiments the photochromic-dichroic layer is formed from a photochromic-dichroic coating composition. The photochromic-dichroic coating composition can be a curable photochromic-dichroic coating composition, that is curable by exposure to, for example: ambient temperatures, such as in the case of two component coating compositions; elevated temperatures (e.g., 150° C. to 190° C. for 5 to 60 minutes), such as in the case of thermally cured coating compositions; or actinic radiation, such as in the case of ultraviolet light curable coating compositions.

The photochromic-dichroic layer typically includes an organic matrix, such as a thermoplastic organic matrix and/or a crosslinked organic matrix. At least a portion of the organic matrix of the photochromic-dichroic layer can in some embodiments include anisotropic materials, such as liquid crystal materials, additives, oligomers, and/or polymers, as will be discussed in further detail herein. Additionally or alternatively to an organic matrix, the photochromic-dichroic layer can include an inorganic matrix, including, for example, silane linkages, siloxane linkages and/or titanate linkages. The organic matrix of the photochromic-dichroic layer can include, for example: acrylate residues (or monomer units) and/or methacrylate residues; vinyl residues; ether linkages; sulfide linkages, including monosulfide linkages and/or polysulfide linkages; carboxylic ester linkages; carbonate linkages (e.g., —O—C(O)—O—) urethane linkages (e.g., —N(H)—C(O)—O—); and/or thiourethane linkages (e.g., —N(H)—C(O)—S—).

The photochromic-dichroic layer can have any suitable thickness. With some embodiments, the photochromic-dichroic layer has a thickness of from 0.5 to 50 microns, such as from 1 to 45 microns, or from 2 to 40 microns, or from 5 to 30 microns, or from 10 to 25 microns.

With some embodiments, the photochromic-dichroic layer, of the photochromic article, further includes a phase-separated polymer that includes: a matrix phase that is at least partially ordered; and a guest phase that is at least partially ordered. The guest phase includes the photochromic-dichroic compound, and the photochromic-dichroic compound is at least partially aligned with at least a portion of the guest phase.

In accordance with further embodiments of the present invention, the photochromic-dichroic layer further includes an interpenetrating polymer network that includes: an anisotropic material that is at least partially ordered, and a polymeric material. The anisotropic material includes the photochromic-dichroic compound, and the photochromic-dichroic compound is at least partially aligned with at least a portion of the anisotropic material.

With some embodiments of the present invention, the photochromic-dichroic layer also includes an anisotropic material. As used herein the term "anisotropic" means having at least one property that differs in value when measured in at least one different direction. Accordingly, "anisotropic materials" are materials that have at least one property that differs in value when measured in at least one different direction. Non-limiting examples of anisotropic materials that can be included in the photochromic-dichroic layer include, but are not limited to, those liquid crystal materials as described further herein with regard to the optional alignment layer of the photochromic articles of the present invention.

With some embodiments, the photochromic-dichroic layer: (i) includes liquid crystal oligomers and/or polymers prepared at least in part from the monomeric mesogenic compounds; and/or (ii) includes the mesogenic compounds, in each case as disclosed in Table 1 of U.S. Pat. No. 7,910,019 B2 at columns 43-90 thereof, which disclosure is incorporated herein by reference.

In accordance with some embodiments of the present invention, the photochromic-dichroic compound, of the photochromic-dichroic layer, can be at least partially aligned by interaction with the anisotropic material, which itself is at least partially ordered. For example, although not limiting herein, at least a portion of the photochromic-dichroic compound can be aligned such that the long-axis of the photochromic-dichroic compound in the dichroic state is essentially parallel to the general direction of the anisotropic material. Further, although not required, the photochromic-dichroic compound can be bound to or reacted with at least a portion of the at least partially ordered anisotropic material.

Methods of ordering, or introducing order into, the anisotropic material of the photochromic-dichroic layer include, but are not limited to, exposing the anisotropic material to at least one of a magnetic field, an electric field, linearly polarized ultraviolet radiation, linearly polarized infrared radiation, linearly polarized visible radiation, and a shear force. Alternatively or additionally, the anisotropic material can be at least partially ordered by aligning at least a portion of the anisotropic material with another material or structure. For example, the anisotropic material can be at least partially ordered by aligning the anisotropic material with an alignment layer (or an orientation facility) such as, but not limited to, those alignment layers as described in further detail herein below.

By ordering at least a portion of the anisotropic material, it is possible to at least partially align at least a portion of the photochromic-dichroic compound that is contained within or otherwise connected to the anisotropic material of the photochromic-dichroic layer. Although not required, the photochromic-dichroic compound can be at least partially aligned while in an activated state. With some embodiments, ordering of the anisotropic material and/or aligning the photochromic-dichroic compound can occur prior to, during, or after application of the photochromic-dichroic layer over the primer layer.

The photochromic-dichroic compound and the anisotropic material can be aligned and ordered during application of the photochromic-dichroic layer over the primer layer. For example, the photochromic-dichroic layer can be applied using a coating technique that introduces a shear force to the anisotropic material during application, such that the anisotropic material becomes at least partially ordered generally parallel to the direction of the applied shear force. For purposes of non-limiting illustration, a solution or mixture (optionally in a solvent or carrier) including the photochromic-dichroic compound and the anisotropic material can be curtain coated over the primer layer, such that shear forces are introduced to the materials being applied due to relative movement of the surface of the substrate with respect to the materials being applied. An example of a coating process that can introduce at least sufficient shear forces is a curtain coating process. The shear forces can cause at least a portion of the anisotropic material to be ordered in a general direction that is substantially parallel to the direction of the movement of the surface. As discussed above, by ordering at least a portion of the anisotropic material in this manner, at least a portion of the photochromic-dichroic compound can be aligned. In addition, and optionally, by exposing at least a portion of the photochromic-dichroic compound to actinic radiation during the curtain coating process, so as to convert the photochromic-dichroic compound to an activated state, at least partial alignment of the photochromic-dichroic compound while in the activated state can also be achieved.

The photochromic-dichroic compound and the anisotropic material can be aligned and ordered after application of the photochromic-dichroic layer over the primer layer. For example, a solution or mixture of the photochromic-dichroic compound and the anisotropic material (optionally in a solvent or carrier) can be spin-coated over at least a portion of the primer layer. Thereafter, at least a portion of the anisotropic material can be ordered, for example, by exposing the anisotropic material to a magnetic field, an electric field, linearly polarized ultraviolet radiation, linearly polarized infrared radiation, linearly polarized visible radiation, and/or a shear force. Alternatively or additionally, the anisotropic material can be at least partially ordered by alignment thereof with another material or structure, such as an alignment layer.

The photochromic-dichroic compound and the anisotropic material can be aligned and ordered prior to application of the photochromic-dichroic layer over the primer layer. For example, a solution or mixture (optionally in a solvent or carrier) of the photochromic-dichroic compound and the anisotropic material can be applied over an ordered polymeric sheet to form a layer thereover. Thereafter, at least a portion of the anisotropic material can be allowed to align with the underlying ordered polymeric sheet. The polymeric sheet can be subsequently applied over the primer layer by, for example, art-recognized laminating or bonding methods. Alternatively, the ordered photochromic-dichroic layer can be transferred from the polymeric sheet to/over the primer layer by art-recognized method, such as hot stamping.

With some embodiments, the photochromic-dichroic layer can include a phase-separated polymer that includes: a matrix phase; and a guest phase distributed in the matrix phase. The matrix phase can include an at least partially ordered liquid crystal polymer. The guest phase can include the at least partially ordered anisotropic material and at least a portion of the photochromic-dichroic compound, which can be at least partially aligned. The at least partially aligned photochromic-dichroic compound can be at least partially aligned by interaction with the at least partially ordered anisotropic material.

With some embodiments, a phase-separating polymer system including, a matrix phase forming material that includes a liquid crystal material, and a guest phase forming material that includes the anisotropic material and the photochromic-dichroic compound, is applied over the primer layer. After applying the phase-separating polymer system, at least portion of the liquid crystal material of the matrix phase and at least a portion of the anisotropic material of the guest phase are at least partially ordered, such that at least a portion of the photochromic-dichroic compound is aligned with at least a portion of the at least partially ordered anisotropic material of the guest phase. Methods of ordering the matrix phase forming material and the guest phase forming material of the phase-separating polymer system include, but are not limited to, exposing the applied layer to at least one of: a magnetic field, an electric field, linearly polarized infrared radiation, linearly polarized ultraviolet radiation, linearly polarized visible radiation, and a shear force. Alternatively or additionally, ordering the matrix phase forming material and the guest phase forming material can include alignment thereof by interaction with an underlying alignment layer, as described in further detail herein.

After ordering the matrix phase forming material and the guest phase forming material, the guest phase forming material can be separated from the matrix phase forming material by polymerization induced phase separation and/or solvent induced phase separation. Although the separation of the matrix and guest phase forming materials is described herein in relation to the guest phase forming material separating from the matrix phase forming material, it should be appreciated that this language is intended to cover any separation between the two phase forming materials. That is, this language is intended to cover separation of the guest phase forming material from the matrix phase forming material and separation of the matrix phase forming material from the guest phase forming material, as well as, simultaneous separation of both phase forming materials and any combination thereof.

According to some embodiments, the matrix phase forming material can include a liquid crystal material chosen form liquid crystal monomers, liquid crystal pre-polymers, and liquid crystal polymers. The guest phase forming material can, with some embodiments, include a liquid crystal material chosen from liquid crystal mesogens, liquid crystal monomers, and liquid crystal polymers and pre-polymers. Examples of such materials include, but are not limited to, those described above, and further herein with regard to the optional alignment layer.

With some embodiments, the phase-separating polymer system can include, a mixture of a matrix phase forming material that includes a liquid crystal monomer, a guest phase forming material that includes liquid crystal mesogens and the photochromic-dichroic compound. With this embodiment, causing the guest phase forming material to separate from the matrix phase forming material can include polymerization induced phase-separation. Typically, the liquid crystal monomer of the matrix phase can be polymerized and thereby separated from at least a portion of the liquid crystal mesogens of the guest phase forming material. Examples of polymerization methods include, but are not limited to, photo-induced polymerization and thermally-induced polymerization.

With some further embodiments, the phase-separating polymer system can include, a mixture of a matrix phase forming material that includes a liquid crystal monomer, a guest phase forming material that includes a low viscosity liquid crystal monomer having a different functionality from the liquid crystal monomer of the matrix phase, and the photochromic-dichroic compound. As used herein, the term "low viscosity liquid crystal monomer," refers to a liquid crystal monomer mixture or solution that is freely flowing at room temperature. Typically, causing the guest phase forming material to separate from the matrix phase forming material includes polymerization induced phase-separation. For example, at least a portion of the liquid crystal monomer of the matrix phase can be polymerized under conditions that do not cause the liquid crystal monomer of the guest phase to polymerize. During polymerization of the matrix phase forming material, the guest phase forming material typically separates from the matrix phase forming material. Thereafter, the liquid crystal monomer of the guest phase forming material can be polymerized in a separate polymerization process.

The phase-separating polymer system can include, with some embodiments, a solution in at least one common solvent of a matrix phase forming material that includes a liquid crystal polymer, a guest phase forming material that includes a liquid crystal polymer that is different from the liquid crystal polymer of the matrix phase forming material, and the photochromic-dichroic compound. Causing the guest phase forming material to separate from the matrix phase forming material typically includes solvent induced phase-separation. Typically, at least a portion of the common solvent is evaporated from the mixture of liquid crystal polymers, thereby causing the two phases to separate from each other.

With further embodiments, the photochromic-dichroic layer can include an interpenetrating polymer network. The at least partially ordered anisotropic material and a polymeric material can form an interpenetrating polymer network, in which at least a portion of the polymeric material interpenetrates with at least a portion of the at least partially ordered anisotropic material. As used herein the term "interpenetrating polymer network" means an entangled combination of polymers, at least one of which is cross-linked, that are not bonded to each other. Thus, as used herein, the term interpenetrating polymer network includes semi-interpenetrating polymer networks. For example, see L. H. Sperling, *Introduction to Physical Polymer Science*, John Wiley & Sons, New York (1986) at page 46. In addition, at least a portion of the at least one at least partially aligned photochromic-dichroic compound can be at least partially aligned with the at least partially ordered anisotropic material. Still further, the polymeric material can be isotropic or anisotropic, provided that, on the whole, the photochromic-dichroic layer is anisotropic. Methods of forming such photochromic-dichroic layers are described in more detail herein below.

According to some embodiments, the anisotropic material can be adapted to allow the photochromic-dichroic compound to switch from a first state to a second state at a desired rate. In general, conventional photochromic compounds can undergo a transformation from one isomeric form to another in response to actinic radiation, with each isomeric form having a characteristic absorption spectrum. The photochromic-dichroic compounds of the photochromic articles of the present invention undergo a similar isomeric transformation. Without intending to be bound by any theory, the rate or speed at which this isomeric transformation (and the reverse transformation) occurs depends, in part, upon the properties of the local environment surrounding the photochromic-dichroic compound (i.e., the "host"). Although not limiting herein, it is believed based on the evidence at hand that the rate of transformation of the photochromic-dichroic compound depends, in part, upon the flexibility of the chain segments of the host, and more particularly on the mobility or viscosity of the chain segments of the host. Correspondingly it is believed, without intending to be bound by any theory, that the rate of transformation of the photochromic-dichroic compound is generally faster in hosts having flexible chain segments than in hosts having stiff or rigid chain segments. As such, and in accordance with some embodiments, when the anisotropic material is a host, the anisotropic material can be adapted to allow the photochromic-dichroic compound to transform between various isomeric states at desired rates. For example, the anisotropic material can be adapted by adjusting the molecular weight and/or the crosslink density of the anisotropic material.

With some embodiments, the photochromic-dichroic layer includes a phase-separated polymer that includes a matrix phase including a liquid crystal polymer, and guest phase distributed within the matrix phase. The guest phase can include the anisotropic material. Typically, a majority of the photochromic-dichroic compound can be contained within the guest phase of the phase-separated polymer. As previously discussed, because the transformation rate of the photochromic-dichroic compound depends, in part, on the host in which it is contained, the rate of transformation of the photochromic-dichroic compound depends, substantially, on the properties of the guest phase.

With some embodiments, and as discussed in further detail herein, the photochromic articles of the present invention can include an alignment layer (also referred to as an alignment or orientation facility) that is interposed between the primer layer and the photochromic-dichroic compound layer. The phase-separated polymer of the photochromic-dichroic layer, can include a matrix phase, at least a portion of which is at least partially aligned with the alignment layer, and a guest phase including an anisotropic material, in which the guest phase is dispersed within the matrix phase. At least a portion of the anisotropic material of the guest phase can be at least partially aligned with at least portion of the alignment layer, and the photochromic-dichroic compound can be at least partially aligned with at least a portion of the anisotropic material. In addition, the matrix phase of the phase-separated polymer can include a liquid crystal polymer, and the anisotropic material of the guest phase can be chosen from liquid crystal polymers and liquid crystal mesogens. Non-limiting examples of such materials are set forth in detail above. When including a phase-separate polymer as described, the photochromic-dichroic layer can be substantially haze-free. Haze is defined as the percentage of transmitted light that deviates from the incident beam by more than 2.5 degrees on average according to ASTM D 1003 Standard Test Method of Haze and Luminous Transmittance of Transparent Plastics. An example of an instrument on which haze measurements according to ASTM D 1003 can be made is Haze-Gard Plus™ made by BYK-Gardener.

In accordance with some embodiments, the photochromic-dichroic compound can be encapsulated or overcoated with an anisotropic material having relatively flexible chain segments, such as a liquid crystal material, and thereafter dispersed or distributed in another material having relatively rigid chain segments. The encapsulating anisotropic material can be at least partially ordered. For example, the encapsulated photochromic-dichroic compound can be dispersed or distributed in a liquid crystal polymer having relatively rigid chain segments and thereafter the mixture can be applied to a substrate to form the photochromic-dichroic layer.

With further embodiments, the photochromic-dichroic layer can be a polymeric sheet that contains a photochromic-dichroic compound. The polymeric sheet can be uniaxially or biaxially stretched. Stretching of the polymeric sheet typically results in alignment and ordering of the photochromic-dichroic material therein. The photochromic-dichroic layer can, with some embodiments, include two or more polymeric sheets each containing a photochromic-dichroic compound, in which each sheet can be stretched in the same direction or in different (e.g., orthogonal) directions.

Examples of polymeric sheets that can be used as or to form the photochromic-dichroic layer include, but are not limited to, stretched (e.g., uniaxially or biaxially stretched) polymer sheets, ordered liquid crystal polymer sheets, and photo-oriented polymer sheets. Examples of polymeric materials, other than liquid crystal materials and photo-orientation materials that can be used in forming polymeric sheets of the photochromic-dichroic layer include, but are not limited to: polyvinyl alcohol, polyvinyl chloride, polyurethane, polyacrylate, and polycaprolactam. Non-limiting examples of methods of at least partially ordering polymeric sheets are described below in more detail.

In accordance with some embodiments, the photochromic-dichroic layer can be formed by applying at least one anisotropic material over the primer layer, imbibing the photochromic-dichroic compound into the previously applied anisotropic material, ordering the anisotropic material, and aligning the photochromic-dichroic compound with at least a portion of the ordered anisotropic material. The anisotropic material can be ordered before, during or after imbibition with the photochromic-dichroic compound. The photochromic-dichroic compound can be aligned while in an activated state, with some embodiments.

Imbibing the photochromic-dichroic compound into the previously applied anisotropic material can involve, with some embodiments, applying a solution or mixture of the photochromic-dichroic compound in a carrier to the previously applied anisotropic material, and allowing the photochromic-dichroic compound to diffuse into the anisotropic material, for example with or without heating. The previously applied anisotropic material can be part of a phase-separated polymer coating, as describe above.

The photochromic articles of the present invention include a primer layer (e.g., primer layer 14 of FIG. 1). The primer layer can include a single layer or multiple layers each including a first photochromic compound that can be the same or different. The primer layer typically includes an organic matrix, such as a thermoplastic organic matrix and/or a crosslinked organic matrix. Additionally or alternatively to an organic matrix, the primer layer can include an inorganic matrix, including, for example, silane linkages, siloxane linkages and/or titanate linkages. The organic matrix can include, for example: acrylate residues (or monomer units) and/or methacrylate residues; vinyl residues; ether linkages; sulfide linkages, including monosulfide linkages and/or polysulfide linkages; carboxylic ester linkages; carbonate linkages (e.g., —O—C(O)—O—) urethane linkages (e.g., —N(H)—C(O)—O—); and/or thiourethane linkages (e.g., —N(H)—C(O)—S—).

The primer layer can be formed by art-recognized methods including, but not limited to: lamination, such as of one or more plastic sheets or films; in-mold formation, such as in-mold coating; film casting; and coating methods. Typically, the primer layer is formed from a primer coating composition. The primer coating composition can be a curable primer coating composition, that is curable by exposure to, for example: ambient temperatures, such as in the case of two component coating compositions; elevated temperatures (e.g., 150° C. to 190° C. for 5 to 60 minutes), such as in the case of thermally cured coating compositions; or actinic radiation, such as in the case of ultraviolet light curable coating compositions.

The primer layer can have any suitable thickness. With some embodiments, the primer has a thickness of from 0.5 microns to 20 microns, such as from 1 to 10 microns, or from 2 to 8 microns, or from 3 to 5 microns, inclusive of the recited values.

With some embodiments, the primer layer includes an organic matrix that includes urethane linkages. In accordance with some embodiments, the primer layer containing urethane linkages is formed from a curable coating composition that includes: a (meth)acrylate copolymer having active hydrogen functionality selected from hydroxyl, thiol, primary amine, secondary amine, and combinations thereof; blocked isocyanate, such as diisocyanate and/or triisocyanate blocked with a suitable blocking or leaving group, such as, 3,5-dimethylpyrazole; and one or more additives, including, but not limited to, adhesion promoters, coupling agents, ultraviolet light absorbers, thermal stabilizers, catalysts, free radical scavengers, plasticizers, flow additives, and/or static tints or static dyes (i.e., tints or dyes that are not photochromic).

Examples of (meth)acrylate monomers from which the active hydrogen functional (meth)acrylate copolymer can be prepared include, but are not limited to, $C_1$-$C_{20}$ (meth)acrylates, $C_1$-$C_{20}$ (meth)acrylates having at least one active hydrogen group selected from hydroxyl, thiol, primary amine, and secondary amine. The $C_1$-$C_{20}$ groups of the (meth)acrylates can be selected from, for example, $C_1$-$C_{20}$ linear alkyl, $C_3$-$C_{20}$ branched alkyl, $C_3$-$C_{20}$ cycloalkyl, $C_3$-$C_{20}$ fused ring polycycloalkyl, $C_5$-$C_{20}$ aryl, and $C_{10}$-$C_{20}$ fused ring aryl.

Additional polyols that can be used in the primer coating compositions from which the primer layer is prepared include, but are not limited to, art-recognized materials, such as described in U.S. Pat. No. 7,465,414 at column 15, line 22 through column 16, line 62, which disclosure is incorporated herein by reference. Isocyanates that can be used in the primer coating compositions from which the primer layer is prepared include, but are not limited to, art-recognized materials, such as described in U.S. Pat. No. 7,465,414 at column 16, line 63 through column 17, line 38, which disclosure is incorporated herein by reference. Catalysts that can be used in the primer coating compositions from which the primer layer is prepared include, but are not limited to, art-recognized materials, such as described in U.S. Pat. No. 7,465,414 at column 17, lines 39-62, which disclosure is incorporated herein by reference.

The primer layer can include further additives that enhance the performance of the first photochromic compound. Such further additives can include, but are not limited to, ultraviolet light absorbers, stabilizers, such as hindered amine light stabilizers (HALS), antioxidants, e.g., polyphenolic antioxidants, asymmetric diaryloxalamide (oxanilide) compounds, singlet oxygen quenchers, e.g., a nickel ion complex with an organic ligand, and mixtures and/or combinations of such photochromic performance enhancing additive materials.

The primer layer can be applied over the substrate by art-recognized methods including, but not limited to, spray application, spin coating, doctor (or draw-down) blade application, and curtain application.

The primer layer can include at least partial hydrolysates of coupling agents, and mixtures thereof. As used herein "coupling agent" means a material having at least one group capable of reacting, binding and/or associating with a group on at least one surface. With some embodiments, a coupling agent can serve as a molecular bridge at the interface of at least two surfaces that can be similar or dissimilar surfaces. Coupling agents, with further embodiments, can be monomers, oligomers, pre-polymers and/or polymers. Such materials include, but are not limited to, organo-metallics such as silanes, titanates, zirconates, aluminates, zirconium aluminates, hydrolysates thereof and mixtures thereof. As used herein the phrase "at least partial hydrolysates of coupling agents" means that at least some to all of the hydrolyzable groups on the coupling agent are hydrolyzed.

In addition or alternatively to coupling agents and/or hydrolysates of coupling agents, the primer layer can include other adhesion enhancing ingredients. For example, although not limiting herein, the primer layer can further include an adhesion-enhancing amount of an epoxy-containing material. Adhesion-enhancing amounts of an epoxy-containing materials when included in the primer layer, can improve the adhesion of a subsequently applied coating or layer. A class of an epoxy (or oxirane) functional adhesion promoters that can be included in compositions from which the primer layer is formed include, but are not limited to, oxirane-functional-alkyl-trialkoxysilanes, such as gamma-glycidoxypropyltrimethoxysilane, and beta-(3,4-epoxycyclohexyl)ethyltrimethoxysilane.

The first photochromic compound of the primer layer can be selected from art-recognized photochromic compounds. With some embodiments, the first photochromic compound is selected from indeno-fused naphthopyrans, naphtho[1,2-b]pyrans, naphtho[2,1-b]pyrans, spirofluoroeno[1,2-b]pyrans, phenanthropyrans, quinolinopyrans, fluoroanthenopyrans, spiropyrans, benzoxazines, naphthoxazines, spiro(indoline)

naphthoxazines, spiro(indoline)pyridobenzoxazines, spiro(indoline)fluoranthenoxazines, spiro(indoline)quinoxazines, fulgides, fulgimides, diarylethenes, diarylalkylethenes, diarylalkenylethenes, thermally reversible photochromic compounds, and non-thermally reversible photochromic compounds, and mixtures thereof.

The first photochromic compound of the primer layer can, with some embodiments, be selected from certain indeno-fused napthopyran compounds, such as described in U.S. Pat. No. 6,296,785, at column 3, lines 66 through column 10, line 51, which disclosure is incorporated herein by reference.

More particular examples of indeno-fused naphthopyran compounds from which the first photochromic compound can be selected include, but are not limited to:

(P-a) 3,3-di(4-methoxyphenyl)-6,7,10,11-tetramethoxy-13,13-dimethyl-3H,13H-inden o[2,1-f]naphtho[1,2-b]pyran;

(P-b) 3-phenyl-3-(4-morpholinophenyl)-6,7,10,11-tetramethoxy-13,13-dimethyl-3H,13H-indeno[2,1-f]naphtho[1,2-b]pyran;

(P-c) 3,3-di(4-methoxyphenyl)-6,7,10,11-tetramethoxy-13-hydroxy-13-ethyl-3H,13H-indeno[2,1-f]naphtho[1,2-b]pyran;

(P-d) 3,3-di(4-methoxyphenyl)-6,7-dimethoxy-13,13-dimethyl-3H,13H-indeno[2,1-f]naphtho[1,2-b]pyran;

(P-e) 3,3-di(4-methoxphenyl)-6,7-dimethoxy-13-hydroxy-13-ethyl-3H,13H-indeno[2,1-f]naphtho[1,2-b]pyran;

(P-f) 3,3-di(4-methoxyphenyl)-6,7,10,11-tetramethoxy-13,13-diethyl-3H,13H-indeno[2,1-f]naphtho[1,2-b]pyran;

(P-g) 3,3-di(4-methoxyphenyl)-6,7-dimethoxy-13-phenyl-3H,13H-indeno[2,1-f]naphtho[1,2-b]pyran;

(P-h) 3-(4-methoxyphenyl)-3-(4-morpholinophenyl)-6,7-dimethoxy-13-phenyl-3H,13H-indeno[2,14]naphtho[1,2-b]pyran;

(P-i) 3-(4-methoxyphenyl)-3-(4-morpholinophenyl)-6,7-dimethoxy-13,13-dimethyl-3H,13H-indeno[2,1-f]naphtho[1,2-b]pyran;

(P-j) 3-(4-methoxyphenyl)-3-(4-dimethylaminophenyl)-6,7-dimethoxy-13,13-dimethyl-3H,13H-indeno[2,1-f]naphtho[1,2-b]pyran;

(P-k) 3,3-di(4-methoxyphenyl)-6,7,8-trimethoxy-13-phenyl-3H,13H-indeno[2,1-f]naphtho[1,2-b]pyran;

(P-l) 3-(4-methoxyphenyl)-3-(4-morpholinophenyl)-6,7,10,11-tetramethoxy-13-hydroxy-13-ethyl-3H,13H-indeno[2,1-f]naphtho[1,2-b]pyran;

(P-m) 3-(4-methoxyphenyl)-3-(4-morpholinophenyl)-6,7,10,11-tetramethoxy-13-hydroxy-13-butyl-3H,13H-indeno[2,1-f]naphtho[1,2-b]pyran;

(P-n) 3-(4-morpholinophenyl)-3-phenyl-6,7-dimethoxy-13-hydroxy-13-ethyl-3H,13H-indeno[2,1,-f]naphtho[1,2-b]pyran;

(P-o) 3,3-di(4-methoxyphenyl)-6,7-dimethoxy-13-hydroxy-13-butyl-3H,13H-indeno[2,1,-f]naphtho[1,2-b]pyran;

(P-p) 3-(4-morpholinophenyl)-3-phenyl-6,7-dimethoxy-13-hydroxy-13-butyl-3H,13H-indeno[2,1,-f]naphtho[1,2-b]pyran;

(P-q) 3-(4-methoxyphenyl)-3-(4-morpholinophenyl)-6,7-dimethoxy-13-hydroxy-13-ethyl-3H,13H-indeno[2,1-f]naphtho[1,2-b]pyran;

(P-r) 3-(4-methoxyphenyl)-3-(4-morpholinophenyl)-6,7-dimethoxy-13-ethyl-13-methoxy-3H,13H-indeno[2,1-f]naphtho[1,2-b]pyran;

(P-s) 3-(4-methoxyphenyl)-3-(4-morpholinophenyl)-6,7-dimethoxy-13-hydroxy-13-methyl-3H,13H-indeno[2,1-f]naphtho[1,2-b]pyran;

(P-t) 3-(4-methoxyphenyl)-3-(4-morpholinophenyl)-6,7-dimethoxy-13-methoxy-13-methyl-3H,13H-indeno[2,1-f]naphtho[1,2-b]pyran; and combinations of two or more thereof.

The first photochromic compound of the primer layer can with some further embodiments be selected from one or more indeno-fused naphthopyran compounds having a pi-conjugation extending group, such as a halogen or halogen substituted group, bonded to the 11-position of the indeno-fused naphthopyran. Examples of indeno-fused naphthopyran compounds having a pi-conjugation extending bonded to the 11-position thereof include, but are not limited to, those disclosed in United States Patent Application Publication No. US 2011/0049445 A1 at paragraphs [0030] through [0080].

More particular examples of indeno-fused naphthopyran compounds having a pi-conjugation extending bonded to the 11-position thereof, from which the first photochromic compound of the primer layer can be selected include, but are not limited to:

(P-i) 3,3-di(4-methoxyphenyl)-6,7-dimethoxy-11-(4-trifluoromethyl)phenyl-13-,13-dimethyl-3H,13H-indeno[2',':3,4]naphtho[1,2-b]pyran;

(P-ii) 3,3-di(4-methoxyphenyl)-6,7-dimethoxy-11-(3,5-bis(trifluoromethyl)phenyl-13,13-dimethyl-3H,13H-indeno[2',':3,4]naphtho[1,2-b]pyran;

(P-iii) 3,3-di(4-methoxyphenyl)-6,7-dimethoxy-11-(2-trifluoromethyl)phenyl-13,13-diethyl-3H,13H-indeno[2',':3,4]naphtho[1,2-b]pyran;

(P-iv) 3,3-di-(4-methoxyphenyl)-6-methoxy-7-piperidino-1'-(4-trifluoromethyl)phe-nyl-13,13-dimethyl-3H,13H-indeno[2',':3,4]naphtho[1,2-b]pyran;

(P-v) 3-(4-methoxyphenyl)-3-(4-morpholinophenyl)-6,7-dimethoxy-11-(4-trifluorom-ethyl)phenyl-13,13-dimethyl-3H,13H-indeno[2',':3,4]naphtho[1,2-b]pyran;

(P-vi) 3-(4-methoxyphenyl)-3-(4-morpholinophenyl)-6-methoxy-7-piperidino-11-(4-t-rifluoromethyl)phenyl-13,13-dimethyl-3H,13H-indeno[2',':3,4]naphtho[1,2-b]pyran;

(P-vii) 3-(4-methoxyphenyl)-3-(4-morpholinophenyl)-6-methoxy-7-morpholino-1'-(4-t-rifluoromethyl)phenyl-13,13-dimethyl-3H,13H-indeno[2',':3,4naphtho[1,2-b]pyran;

(P-viii) 3,3-di(4-hydroxyphenyl)-6,7-dimethoxy-1'-(3,5-bis(trifluoromethyl)phenyl)-13,13-dimethyl-3H,13H-indeno[2',':3,4]-naphtho[1,2-b]pyran;

(P-ix) 3,3-di-(4-methoxyphenyl-6-methoxy-7-morpholino-1-(4-trifluoromethyl)phen-yl-13,13-dimethyl-3H,13H-indeno[2',':3,4]naphtho[1,2-b]pyran;

(P-x) 3,3-bis(4-methoxyphenyl)-6,7-dimethoxy-11-(2-trifluoromethyl)phenyl-13,13-dimethyl-3H,13H-indeno[2',':3,4]naphtho[1,2-b]pyran;

(P-xi) 3,3-bis(4-methoxyphenyl)-6-methoxy-7-piperidino-11-(2-trifluoromethyl)phe-nyl-13,13-dimethyl-3H,13H-indeno[2',':3,4]naphtho[1,2-b]pyran;

(P-xii) 3-phenyl-3'-(4-morpholinophenyl)-1'-(4-trifluoromethyl)phenyl-13,13-dimethyl-3H,13H-indeno[2',':3,4]naphtho[1,2-b]pyran;

(P-xiii) 3-(4-morpholinophenyl)-3-phenyl-1'-(2-trifluoromethyl)-phenyl-13,13-dimet-hyl-3H,13H-indeno[2',':3,4]naphtho[1,2-b]pyran;

(P-xiv) 3-(4-butoxyphenyl)-3-(4-methoxyphenyl)-6,7-dimethoxy-11-(3-(trifluorometh-yl)pyridin-2-yl)-13,13-dimethyl-3H,13H-indeno[2',':3,4]naphtho[1,2-b]pyran; and combinations of two or more thereof.

The first photochromic compound of the primer layer, with some embodiments, can be covalently bonded to the matrix, such as the organic matrix, of the primer layer. With some embodiments, the first photochromic compound can include one or more reactive groups, such as one or more polymerizable groups. With some embodiments, the first photochromic compound can be selected from 2H-naphtho[1,2-b]pyrans, 3H-naphtho[2,1-b]pyrans and/or indeno[2,1-f]naphtho[1,2-b]pyrans each having at least one functional group that is capable of forming a covalent bond with another functional group, such as at least one polymerizable group, such as at least one polyalkoxylated substituent of from 1 to 50 alkoxy units per substituent which is end-capped (or terminated) with a polymerizable group. Examples of such photochromic compounds from which the first photochromic compound can be selected include, but are not limited to, those disclosed in U.S. Pat. No. 6,113,814, at column 2, line 52 through column 8, line 40, which disclosure is incorporated herein by reference.

More particular examples of photochromic compounds having reactive functionality from which the first photochromic compound of the primer layer can be selected include, but are not limited to:

(P-a') 2,2-bis(4-methoxyphenyl)-5-(2-hydroxyethoxycarbonyl)-6-phenyl-[2H]-naphtho[1,2-b]pyran;
(P-b') 2,2-bis(4-methoxyphenyl)-5-(2-(2-hydroxyethoxy)ethoxycarbonyl)-6-phenyl-[2H]-naphtho[1,2-b]pyran;
(P-c') 2,2-bis(4-methoxyphenyl)-5-(2-(2-(2-hydroxyethoxy)ethoxy)ethoxycarbonyl)-6-phenyl-[2H]naphtho[1,2-b]pyran;
(P-d') 2,2-bis(4-methoxyphenyl)-5-(2-(2-(2-(2-hydroxyethoxy)ethoxy)ethoxy)ethoxycarbonyl)-6-phenyl-[2H]-naphtho[1,2-b]pyran;
(P-e') 2,2-bis(4-methoxyphenyl)-5-methoxycarbonyl-6-(2-hydroxyethoxy)ethoxy-[2H]-naphtho[1,2-b]pyran;
(P-f') 2-(4-(2-(2-hydroxyethoxy)ethoxy)ethoxyphenyl)-2-phenyl-5-methoxycarbonyl-6-methyl-9-methoxy-[2H]-naphtho[1,2-b]pyran;
(P-g') 2,2-bis(4-methoxyphenyl)-5-methoxycarbonyl-6-phenyl-9-(2-hydroxyethoxy)-[2H]-naphtho[1,2-b]pyran;
(P-h') 2,2-bis(4-methoxyphenyl)-5-methoxycarbonyl-6-(4-(2-hydroxyethoxy)phenyl)-[2H]-naphtho[1,2-b]pyran;
(P-i') 2-phenyl-2-(4-(2-(2-methylprop-2-enoyloxy)ethoxy)phenyl)-5-(methoxycarbonyl)-6-(2-(2-methylprop-2-enoyloxy)ethoxy)-[2H]-naphtho[1,2-b]pyran;
(P-j') 2,2,6-triphenyl-5-(2-(2-(2-(2-methylprop-2-enoyloxy)ethoxy)ethoxy)ethoxycarbonyl)-[2H]-naphtho[1,2-b]pyran;
(P-k') 2,2,6-triphenyl-5-(2-(2-(2-(oxiran-2-ylmethoxy)ethoxy)ethoxy)ethoxycarbonyl)-[2H]-naphtho[1,2-b]pyran;
(P-l') 3,3-di(4-methoxyphenyl)-6,11,13-trimethyl-13-(2-(2-hydroxyethoxy)ethoxy)-indeno[2,1-f]naphtho[1,2-b]pyran;
(P-m') 3,3-di(4-methoxyphenyl)-6,11,13-trimethyl-13-(2-(2-(2-hydroxyethoxy)ethoxy)ethoxy)ethoxy)-indeno[2,1-f]naphtho[1,2-b]pyran;
(P-n') 3,3-bis(4-methoxyphenyl)-9-methoxycarbonyl-8-(2-hydroxyethoxy)ethoxy-[3H]-naphtho[2,1-b]pyran;
(P-o') 3-(4-(2-(2-hydroxyethyl)ethoxy)ethoxyphenyl)-3-phenyl-9-methoxycarbonyl-8-methoxy-[3H]-naphtho[2,1-b]pyran; and combinations of two or more thereof.

The photochromic articles of the present invention include a topcoat layer (e.g., topcoat layer 20 of FIG. 1). The topcoat layer can include a single layer or multiple layers each including a second photochromic compound that can be the same or different. The topcoat layer typically includes an organic matrix, such as a thermoplastic organic matrix and/or a crosslinked organic matrix. Additionally or alternatively to an organic matrix, the topcoat layer can include an inorganic matrix, including, for example, silane linkages, siloxane linkages and/or titanate linkages. The organic matrix can include, for example: acrylate residues (or monomer units) and/or methacrylate residues; vinyl residues; ether linkages; sulfide linkages, including monosulfide linkages and/or polysulfide linkages; carboxylic ester linkages; carbonate linkages (e.g., —O—C(O)—O—) urethane linkages (e.g., —N(H)—C(O)—O—); and/or thiourethane linkages (e.g., —N(H)—C(O)—S—).

The topcoat layer can be formed by art-recognized methods including, but not limited to: lamination, such as of one or more plastic sheets or films; in-mold formation, such as in-mold coating; film casting; and coating methods. Typically, the topcoat layer is formed from a topcoat coating composition. The topcoat coating composition can be a curable topcoat coating composition, that is curable by exposure to, for example: ambient temperatures, such as in the case of two component coating compositions; elevated temperatures (e.g., 150° C. to 190° C. for 5 to 60 minutes), such as in the case of thermally cured coating compositions; or actinic radiation, such as in the case of ultraviolet light curable coating compositions.

The topcoat layer can have any suitable thickness. With some embodiments, the topcoat has a thickness of from 0.5 microns to 10 microns, such as from 1 to 8 microns, or from 2 to 5 microns, inclusive of the recited values.

With some embodiments, the topcoat layer includes an organic matrix formed from a radiation-cured acrylate-based composition, and correspondingly, the topcoat layer can be described as an acrylate-based topcoat layer.

The acrylate-based topcoat layer can be prepared using (meth)acrylate monomers and/or (meth)acrylic acid monomers. The (meth)acrylate monomers can include one, two, three, four, or five (meth)acrylate groups. Additional co-polymerizable monomers, such as epoxy monomers, e.g., monomers containing a epoxy (or oxirane) functionality, monomers containing both (meth)acrylate and epoxy functionalities, etc., can also be present in the formulation used to prepare the (meth)acrylate-based topcoat layer. The monomers used to prepare the (meth)acrylate-based topcoat layer include a plurality, e.g., a major amount, i.e., more than 50 weight percent, of (meth)acrylate monomers; hence the designation "(meth)acrylate-based topcoat layer." The formulations used to prepare the (meth)acrylate-based topcoat layer can also contain components having at least one isocyanate (—NCO) group, e.g., organic monoisocyanates, organic diisocyanates, and organic triisocyanates, whereby urethane linkages can be incorporated into the topcoat layer.

The (meth)acrylate-based topcoat layer typically possesses physical properties including, for example, transparency, adherence to the underlying photochromic-dichroic layer, resistance to removal by aqueous alkali metal hydroxide, compatibility with an optional abrasion-resistant coating, such as a hardcoat, applied to its surface, and scratch resistance. With some embodiments, the (meth)acrylate-based topcoat layer has a hardness that is greater than that of the photochromic-dichroic layer.

Radiation curing of (meth)acrylate-based polymeric systems can be achieved with, for example, electron beam curing (EB) and/or ultraviolet light (UV) radiation. Ultraviolet curing typically requires the presence of at least one photoinitiator, whereas curing by EB techniques does not require a photoinitiator. With the exception of the presence or absence of the photoinitiator, the (meth)acrylate-based formulations, which are cured by either UV or EB radiation technology, can otherwise be identical.

Radiation-curable (meth)acrylate-based polymeric systems are well known in the polymeric art, and any such system may be used to produce the (meth)acrylate-based topcoat layer of the photochromic article of the present invention. In accordance with some embodiments, the (meth)acrylate-based topcoat layer is formed from a composition that includes a combination or miscible blend of one or more free-radical initiated (meth)acrylate monomers and/or (meth)acrylate oligomers, and one or more cationic initiated epoxy monomers. When this blend of monomers is cured, a (meth)acrylate-based topcoat layer, in the form of a polymerizate, is formed and includes an interpenetrating network of polymer components.

Examples of (meth)acrylate monomers that can be included in compositions from which the (meth)acrylate-based topcoat layer can be formed, include, but are not limited to, polyfunctional (meth)acrylates having, for example, 1, 2, 3, 4, or 5 (meth)acrylate groups, and monofunctional (meth)acrylates, e.g., a monomer containing a single (meth)acrylate group, hydroxy-substituted (meth)acrylates and alkoxysilyl alkylacrylates, such as trialkoxysilylpropylmethacrylate. Other reactive monomers/diluents, such as monomers containing an ethylenic functional group (other than the (meth)acrylate monomers) can also be present.

Compositions from which the (meth)acrylate-based topcoat layer can be formed, and methods of applying and curing such compositions, are disclosed at column 16, line 14 through column 25, line 3 of U.S. Pat. No. 7,452,611 B2, which disclosure is incorporated herein by reference.

Compositions from which the topcoat layer is formed can include one or more additives, including, but not limited to, adhesion promoters, coupling agents, ultraviolet light absorbers, thermal stabilizers, catalysts, free radical scavengers, plasticizers, flow additives, and/or static tints or static dyes (i.e., tints or dyes that are not photochromic).

With some embodiments, the compositions from which the (meth)acrylate-based topcoat layer can be formed, can further include an adhesion promoter. The adhesion promoter can be selected from, for example, organo-silanes, such as aminoorganosilanes, organic titanate coupling agents, organic zirconate coupling agents, and combinations thereof. Examples of adhesion promoters, which can be included in the compositions from which the acrylate-based topcoat layer can be formed, include, but are not limited to, those disclosed at column 5, line 52 through column 8, line 19 of U.S. Pat. No. 7,410,691 B2, which disclosure is incorporated herein by reference.

The topcoat layer, with some embodiments, includes an ultraviolet light absorber and/or a second photochromic compound. With some embodiments, the topcoat layer includes an ultraviolet light absorber, and is free of the second photochromic compound. With some further embodiments, the topcoat layer includes both an ultraviolet light absorber and the second photochromic compound. With some additional embodiments, the topcoat layer includes the second photochromic compound, and is free of an ultraviolet light absorber. The ultraviolet light absorber can be selected from one or more art-recognized classes of ultraviolet light absorbers, including, but not limited to: hindered amines, which can include, for example, one or more 2,2,6,6-tetramethyl N-substituted piperidine groups; benzophenones; and/or benzotriazoles. The ultraviolet light absorber is typically present in at least an effective amount, such as from 0.1 to 10 percent by weight, or 0.2 to 5 percent by weight, or from 0.3 to 3 percent by weight, based on the total solids weight of the coating composition from which the topcoat layer is prepared.

The second photochromic compound can in some embodiments be selected from indeno-fused naphthopyrans, naphtho[1,2-b]pyrans, naphtho[2,1-b]pyrans, spirofluoroeno[1,2-b]pyrans, phenanthropyrans, quinolinopyrans, fluoroanthenopyrans, spiropyrans, benzoxazines, naphthoxazines, spiro(indoline)naphthoxazines, spiro(indoline)pyridobenzoxazines, spiro(indoline)fluoranthenoxazines, spiro(indoline)quinoxazines, fulgides, fulgimides, diarylethenes, diarylalkylethenes, diarylalkenylethenes, thermally reversible photochromic compounds, and non-thermally reversible photochromic compounds, and mixtures thereof.

The second photochromic compound of the topcoat layer, with some embodiments, can be covalently bonded to the matrix, such as the organic matrix, of the topcoat layer. With some embodiments, the second photochromic compound can include one or more reactive groups, such as one or more polymerizable groups. With some embodiments, the second photochromic compound can include at least one functional group that is capable of forming a covalent bond with another functional group, such as at least one polymerizable group, such as at least one polyalkoxylated substituent of from 1 to 50 alkoxy units per substituent which is end-capped (or terminated) with a polymerizable group.

The second photochromic compound, in accordance with some additional embodiments, includes at least one ring-opened cyclic monomer. Examples of ring-opening cyclic monomers include, but are not limited to, cyclic esters, cyclic carbonates, cyclic ethers, and cyclic siloxanes. More particular examples of ring-opening cyclic monomers include, but are not limited to, e-caprolactone and 6-valerolactone.

Photochromic compounds that include at least one ring-opened cyclic monomer, from which the second photochromic compound can be selected, include, but are not limited to, those disclosed at column 2, line 32 through column 6, line 60 of U.S. Pat. No. 7,465,415 B2, which disclosure is incorporated herein by reference. More particular examples of photochromic compounds having at least one ring-opened monomer covalently bonded thereto, from which the second photochromic compound can be selected, include, but are not limited to, those disclosed at columns 86 through 103, and represented by Formulas 17 through 28 of U.S. Pat. No. 7,465,415 B2, which disclosure is incorporated herein by reference.

Examples of ring-opening cyclic monomers that can be used to form photochromic compounds having at least one ring-opened monomer covalently bonded thereto, from which the second photochromic compound can be selected, include, but are not limited to, those disclosed at column 10, line 43 through column 12, lines 26 of U.S. Pat. No. 7,465,415 B2, which disclosure is incorporated herein by reference. Examples of photochromic initiators that can be reacted with ring-opening cyclic monomers so as to form photochromic compounds having at least one ring-opened monomer covalently bonded thereto, from which the second photochromic compound can be selected, include, but are not limited to, those disclosed in Table 1 at columns 14 through 59 of U.S. Pat. No. 7,465,415 B2, which disclosure is incorporated herein by reference.

More particular examples of photochromic initiators that can be reacted with ring-opening cyclic monomers (including, but not limited to, cyclic esters, cyclic carbonates, cyclic ethers, and/or cyclic siloxanes as discussed above) so as to form photochromic compounds having at least one ring-opened monomer covalently bonded thereto, from which the second photochromic compound of the topcoat layer can be selected, include, but are not limited to, the following:

(TC-1) 3,3-di(4-methoxyphenyl)-6,7-dimethoxy-13-methyl-13-(2-(2-hydroxyethoxy)ethoxy)-3H,13H-indeno[2,1-f]naphtho[1,2-b]pyran:

(TC-2) 3,3-d (4-methoxyphenyl)-6-methoxy-7-((3-hydroxymethyl)piperidinyl)-13-ethyl-13-(2-(2-hydroxyethoxy)ethoxy)-3H,13H-indeno[2,1-f]naphtho[1,2-b]pyran;

(TC-3) 3-(4-(2-hydroxyethoxy)phenyl)-3-(4-fluorophenyl)-6,7-dimethoxy-13-ethyl-1-3-(2-(2-hydroxyethoxy)ethoxy)-3H,13H-indeno[2,1-f]naphtho[1,2-b]pyran;

(TC-4) 3-phenyl-3-(4-(2-hydroxyethoxy)phenyl)-6-methoxy-7-(3-methylpiperidin-yl)-13,13-dimethyl-3H,13H-indeno[2,1-f]naphtho[1,2-b]pyran:

(TC-5) 3-(4-methoxyphenyl)-3-(4-fluorophenyl)-6-methoxy-7-(piperidino)-13-butyl-13-(2-(2-hydroxyethoxy)ethoxy)-3H,13H-indeno[2,1-f]naphtho[1,2-b]pyran;

(TC-6) 3-phenyl-3-(4-(2-hydroxyethoxy)phenyl)-6-methoxy-7-piperidino-13,13-d-imethyl-3H,13H-indeno[2,1-f]naphtho[1,2-b]pyran;

(TC-7) 3-phenyl-3-(4-methoxyphenyl)-6,11-dimethoxy-13-(2-hydroxyethyl)-3H,13H-indeno[2,1-f]naphtho[1,2-b]pyran;

(TC-8) 3-phenyl-3-(4-morpholinophenyl)-6,7-dimethoxy-13-hydroxymethyl-13-(2-hydroxyethyl)-3H,13H-indeno[2,1-f]naphtho[1,2-b]pyran;

(TC-9) 3-(4-methoxyphenyl)-3-(4-morpholinophenyl)-6-methoxy-7-pyrrolidino-13-ethyl-13-(2-(2-hydroxyethoxy)ethoxy)-3H,13H-indeno[2,1-f]naphtho[1,2-b]pyran;

(TC-10) 3-(4-methoxyphenyl)-3-(4-fluorophenyl)-6-methoxy-7-morpholino-13-ethyl-13-(2-(2-hydroxyethoxy)ethoxy)-3H,13H-indeno[2,1-f]naphtho[1,2-b]pyran;

(TC-11) 3,3-di-(4-methoxyphenyl)-13-propyl-13-hydroxymethyl-3H,13H-indeno[2,1-f]naphtho[1,2-b]pyran;

(TC-12) 3,3-di(4-methoxyphenyl)-6,7-dimethoxy-11-fluoro-13-butyl-13-(2-(2-hydroxyethoxy)ethoxy)-3H,13H-indeno[2,1-f]naphtho[1,2-b]pyran;

(TC-13) 3-phenyl-3-(4-(2-hydroxyethoxy)phenyl)-6,11-dimethoxy-3H,13H-indeno[2,1-f]naphtho[1,2-b]pyran;

(14) 3,3-di(4-methoxyphenyl)-6,7-dimethoxy-13-hydroxymethyl-13-(2-hydroxyethyl-)-3H,13H-indeno[2,1-f]naphtho[1,2-b]pyran;

(TC-15) 3-phenyl-3-(4-(2-hydroxyethoxy)phenyl)-6,11-dimethyl-3H,13H-indeno[2,1-t]naphtho[1,2-b]pyran;

(TC-16) 3-phenyl-3-(4-methoxyphenyl)-6,11-dimethoxy-13-ethyl-13-(2-(2-hydroxyethoxy)ethoxy)-3H,13H-indeno[2,1-f]naphtho[1,2-b]pyran;

(TC-17) 3,3-di-(4-methoxyphenyl)-6,11,13-trimethyl-13-(2,2-di(hydroxymethyl)butoxy-3H,13H-indeno[2,1-f]naphtho[1,2-b]pyran;

(TC-18) 2,2-di(4-methoxyphenyl)-5-methoxycarbonyl-6-(2-hydroxyethoxy)-[2H]-naphtho[1,2-b]pyran;

(TC-19) 3-phenyl-3-(4-(2-hydroxyethoxy)phenyl)-6,11-dimethoxy-13,13-dimethyl-3H,13H-indeno[2,1-f]naphtho[1,2-b]pyran;

(TC-20) 3-phenyl-3-(4-methoxyphenyl)-6-methoxy-7-((3-hydroxymethyl)piperidno)-13,-13-dimethyl-3H,13H-indeno[2,1-f]naphtho[1,2-b]pyran;

(TC-21) 3-(4-methoxyphenyl)-3(4-morpholin-1-yl-phenyl)-6,11-dimethyl-13-butyl-13-(2-(2-(2-hydroxyethoxy)ethoxy)ethoxy)-3H,13H-indeno[2,1-t]naphtho[1,2-b]pyran;

(TC-22) 3-phenyl-3-(4-(2-hydroxyethoxy)phenyl)-6-methoxy-7-(morpholino)-13,13-dimethyl-3H,13H-indeno[2,1-f]naphtho[1,2-b]pyran;

(TC-23) 3-phenyl-3-(4-(2-hydroxyethoxy)phenyl)-6,7-dimethoxy-13,13-dimethyl-3H,13-H-indeno[2,1]naphtho[1,2-b]pyran;

(2 TC-4) 3-(4-methoxyphenyl)-3-(4-fluorophenyl)-6-methoxy-7-((4-hydroxymethyl)piperidino)-13,13-dimethyl-3H,13H-indeno[2,1-f]naphtho[1,2-b]pyran;

(TC-25) 3,3-di(4-methoxyphenyl)-6-methoxy-7-(piperidin-1-yl)-13-butyl-13-(2-(2-hydroxyethoxy)ethoxy)-3H,13H-indeno[2,1-f]naphtho[1,2-b]pyran;

(TC-26) 3,3-di(4-methoxyphenyl)-6,11-dimethyl-13-hydroxymethyl-13-(2-hydroxypropy-I)-3H,13H-indeno[2,1-f]naphtho[1,2-b]pyran;

(TC-27) 3-phenyl-3-(4-morpholinophenyl)-6-methoxy-7-((3-hydroxymethyl)piperidino)-13,13-dimethyl-3H,13H-indeno[2,1-f]naphtho[1,2-b]pyran;

(TC-28) 3-(4-methoxyphenyl)-3-(4-fluorophenyl)-6-methoxy-7-(morpholin-1-yl)-13-bu-tyl-13-(2-(2-hydroxyethoxy)ethoxy)-3H,13H-indeno[2,1-f]naphtho[1,2-b]pyran;

(TC-29) 3-(4-fluorophenyl)-3-(4-(2-hydroxyethoxy)phenyl)-13,13-dimethyl-3H,13H-indeno[2,1-f]naphtho[1,2-b]pyran;

(TC-30) 2,2-di(4-methoxyphenyl)-5-(2-(2-hydroxyethoxy)ethoxycarbonyl)-6-phenyl-[2-H]-naphtho[1,2-b]pyran;

(TC-31) 3-(4-fluorophenyl)-3-(4-methoxyphenyl)-6,7-dimethoxy-13-ethyl-13-(2-(2-hydroxyethoxy)ethoxy)-3H,13H-indeno[2,1-f]naphtho[1,2-b]pyran;

(TC-32) 3,3-di(4-methoxyphenyl)-6-methoxy-7-morpholino-13-ethyl-13-(2-(2-hydroxyethoxy)ethoxy)-3H,13H-indeno[2,1-f]naphtho[1,2-b]pyran;

(TC-33) 3-(4-morpholinophenyl)-3-phenyl-6,7-dimethoxy-13-butyl-13-(2-(2-(2-hydroxy-yethoxy)ethoxy)ethoxy)-31-1,13H-indeno[2,1-f]naphtho[1,2-b]pyran;

(TC-34) 3-(4-fluorophenyl)-3-(4-(3-hydroxymethyl)piperidinophenyl)-6-methoxy-7-hy-droxy-13,13-dimethyl-3H,13H-indeno[2,1-f]naphtho[1,2-b]pyran:

(TC-35) 3-(4-morpholinophenyl)-3-phenyl-6,7-dimethoxy-13-ethyl-13-(2-(2-hydroxyethoxy)ethoxy)-3H,13H-indeno[2,1-f]naphtho[1,2-b]pyran;

(TC-36) 2,2-diphenyl-5-hydroxymethyl-8-methyl-2H-naphtho[1,2-b]pyran;

(TC-37) 3-(4-(2-hydroxyethoxy)phenyl)-3-(4-morpholinophenyl)-13,13-dimethyl-3H,13H-indeno[2,1-f]naphtho[1,2-b]pyran;

(TC-38) 3-(4-(2-hydroxyethoxy)phenyl)-3-phenyl-13,13-dimethyl-3H,13H-indeno[2,1-f]naphtho[1,2-b]pyran;

(TC-39) 2,2-diphenyl-5-(2-(2-hydroxyethoxy)ethoxycarbonyl)-8,9-dimethoxy-2H-naphtho[1,2-b]pyran;

(TC-40) 3,3-di(4-fluorophenyl)-6,7-dimethoxy-13-butyl-13-(2-(2-(2-hydroxyethoxy)ethoxy)ethoxy)-3H,13H-indeno[2,1-f]naphtho[2-b]pyran;

(TC-TC-41) 3-(4-fluorophenyl)-3-(4-methoxyphenyl)-6,7-dimethoxy-13-ethyl-13-(2-(2hydroxyethoxy)ethoxy)ethoxy)-3H,13H-indeno[2,1-f]naphtho[1,2-b]pyran;

(TC-42) 2,2-diphenyl-5-methoxycarbonyl-6-phenyl-9-(2-hydroxyethoxy)-2H-naphtho[1,2-b]pyran;

(TC-43) 3,3-di(4-methoxyphenyl)-6,7-dimethoxy-13-ethyl-13-(2-(2-(2-hydroxyethoxy)ethoxy)ethoxy)-3H,13H-indeno[2,1-f]naphtho[1,2-b]pyran;

(TC-44) 3-(4-methoxyphenyl)-3-phenyl-6,11-dimethoxy-13-(2-(2-hydroxyethoxy)ethoxy-)-3H,13H-indeno[2,1-f]naphtho[1,2-b]pyran;

(TC-45) 3-(4-(2-hydroxyethyl)piperazinophenyl)-3-phenyl-13,13-dimethyl-3H,13H-indeno[2,1-f]naphtho[1,2-b]pyran;

(TC-46) 2,2-di(4-methoxyphenyl)-5-(2-hydroxyethoxy)carbonyl-6-phenyl-2H-naphtho[1-,2-b]pyran;

(TC-47) 3-(4-morpholinophenyl)-3-phenyl-13-ethyl-13-(2-(2-(2-hydroxyethoxy)ethoxy)ethoxy)-3H,13H-indeno[2,1-f]naphtho[1,2-b]pyran;

(TC-48) 3,3-di(4-methoxyphenyl)-6-methoxy-7-(3-hydroxymethyl)piperidinophenyl)-13,13-dimethyl-3H,13H-indeno[2,1-f]naphtho[1,2-b]pyran;

(TC-49) 3,3-di(4-methoxyphenyl)-6,11,13-trimethyl-13-(2-(2-(2-hydroxyethoxy)ethoxy)ethoxy)-3H,13H-indeno[2,1-f]naphtho[1,2-b]pyran;

(TC-50) 2,2-diphenyl-5-(2-(2-hydroxyethoxy)ethoxycarbonyl)-6-(4-methoxy)phenyl-9-methoxy-2H-naphtho[1,2-b]pyran;

(TC-51) 2,2-diphenyl-5-hydroxymethyl-7,8-dimethoxy-2H-naphtho[1,2-b]pyran;

(TC-52) 3,3-di(4-methoxyphenyl)-6,11,13-trimethyl-13-(10-hydroxydecoxy)-3H,13H-indeno[2,1-f]naphtho[1,2-b]pyran;

(TC-53) 2,2di(4-methoxyphenyl)-5-methoxycarbonyl-6-(4-(2-hydroxyethoxy)phenyl-2H-naphtho[1,2-b]pyran;

(TC-54) 3,3-di(4-methoxyphenyl)-6,11-dimethoxy-13-(2-hydroxyethoxy)-3H,13H-indeno[2,1-f]naphtho[1,2-b]pyran;

(TC-55) 3-phenyl-3-(4-morpholinophenyl)-6,11-dimethoxy-13-(2-hydroxyethoxy)-3H,13H-indeno[2,1-f]naphtho[2-b]pyran;

(TC-56) 2,2-di(4-methoxyphenyl)-5-methoxycarbonyl-6-phenyl-9-(2-hydroxyethoxy)-2H-naphtho[1,2-b]pyran;

(TC-57) 3,3-di(4-methoxyphenyl)-6,11-dimethyl-13-hydroxy-13-(2-hydroxyethyl)-3H,13H-indeno[2,1-f]naphtho[1,2-b]pyran;

(TC-58) 3,3-di(4-methoxyphenyl)-6,11,13-trimethyl-13-(5-hydroxypentoxy)-3H,13H-indeno[2,1-f]naphtho[1,2-b]pyran;

(TC-59) 3,3-di(4-methoxyphenyl)-11-(2-hydroxyethoxy)-13,13-dimethyl-3H,13H-indeno[2,1-f]naphtho[1,2-b]pyran;

(TC-60) 3,3-di(4-methoxyphenyl)-6,11-dimethyl-13-hydroxy-13-(3-hydroxypropyl)-3H,13H-indeno[2,1-f]naphtho[1,2-b]pyran;

(TC-61) 3,3-di(4-methoxyphenyl)-6,11-dimethyl-13-(2-hydroxyethoxy)-3H,13H-indeno[2,1-f]naphtho[1,2-b]pyran;

(TC-62) 3-phenyl-3-(4-methoxyphenyl)-6,11-dimethoxy-13-methyl-13-(2-(2-hydroxyeth-oxy)ethoxy)-3H,13H-indeno[2,1-f]naphtho[1,2-b]pyran;

(TC-63) 3,3-di(4-methoxyphenyl)-6,11-dimethyl-13-hydroxy-13-hydroxymethyl)-3H,13H-indeno[2,1-f]naphtho[1,2-b]pyran;

(TC-64) 3,3-di(4-methoxyphenyl)-6,11-dimethoxy-13-(2-(2-hydroxyethoxy)ethoxy)-3H,13H-indeno[2,1-f]naphtho[1,2-b]pyran;

(TC-65) 3,3-di(4-methoxyphenyl)-6,11-dimethoxy-13-methyl-13-(2-(2-hydroxyethoxy)ethoxy)-3H,13H-indeno[2,1-f]naphtho[2-b]pyran;

(TC-66) 2,2-diphenyl-5-(2,3-dihydroxy)propoxycarbonyl-8-methyl-2H-naphtho[1,2-b]pyran;

(TC-67) 3,3-di(4-methoxyphenyl)-6,11-dimethoxy-13-hydyoxy-13-(4-hydroxybutyl)-3H,13H-indeno[2,1-f]naphtho[1,2-b]pyran;

(TC-68) 5,5-di(4-(2-(2-hydroxyethoxy)ethoxy)ethoxy)phenyl)-8-(3-chloropropoxy)carbonyl-5H-fluorantheno[3,2-b]pyran;

(TC-69) 3,3-di(4-methoxyphenyl)-6,11-dimethoxy-13-butyl-13-(2-(2-hydroxyethoxy)ethoxy)-3H,13H-indeno[2,1-f]naphtho[1,2-b]pyran;

(TC-70) 3,3-di(4-methoxyphenyl)-6,11-dimethoxy-13-hydroxy-13-(3-hydroxypropyl)-3H,13H-indeno[2,1-f]naphtho[1,2-b]pyran;

(TC-71) 3-phenyl-3-(4-morpholinophenyl)-13-methyl-13-(2,3-dihydroxypropoxy)-3H,13H-indeno[2,1-f]naphtho[1,2-b]pyran;

(TC-72) 3,3-di(4-methoxyphenyl)-6,11,13-trimethyl-13-(2,3-dihydroxypropoxy)-3H,13H-indeno[2,1-f]naphtho[1,2-b]pyran;

(TC-73) 3,3-di(4-methoxyphenyl)-6,11-dimethoxy-13-methyl-13-(2,3-dihydroxypropoxy)-3H,13H-indeno[2,1-f]naphtho[2-b]pyran;

(TC-74) 3,3-di(4-methoxyphenyl)-6,11,13-trimethyl-13-(2-hydroxyethoxy)-3H,13H-indeno[2,1-f]naphtho[1,2-b]pyran;

(TC-75) 2-(4-(2-(2-hydroxyethoxy)ethoxy)ethoxy)phenyl-2-phenyl-5-methoxycarbonyl-6-methyl-9-methoxy-2H-naphtho[1,2-b]pyran;

(TC-76) 3,3-di(4-methoxyphenyl)-6,11,13-trimethyl-13-(2-(2,2-bis[2-hydroxyethoxy)-methyl]-3-hydroxypropyloxy)ethoxy)-3H 13H-indeno[2,1-f]naphtho[2-b]pyran;

(TC-77) 3,3-di(4-methoxyphenyl)-6,11,13-trimethyl-13-(2-(2-(2-(2-(2-hydroxyethoxy)ethoxy)ethoxy)ethoxy)ethoxy)ethoxy)-3H,13H-indeno[2,1-f]naphtho[1,2-b]pyran;

(TC-78) 2,2-diphenyl-5-(2-(2-hydroxyethoxy)ethoxyoarbonyl)-8-methyl-2H-naphtho[1,-2-b]pyran;

(TC-79) 3,3-di(4-methoxyphenyl)-6,11,13-trimethyl-13-(2-(2-(2-(2hydroxyethoxy)ethoxy)ethoxy)-3H,13H-indeno[2,1-f]naphtho[1,2-b]pyran;

(TC-80) 3,3-di(4-methoxyphenyl)-6,11,13-trimethyl-13-(2-(2-hydroxyethoxy)ethoxy)-3H,13H-indeno[2,1-f]naphtho[1,2-b]pyran;

(TC-81) 2,2-di(4-methoxyphenyl)-5-(2-(2-(2-hydroxyethoxy)ethoxy)ethoxycarbonyl)-6-phenyl-2H-naphtho[1,2-b]pyran;

(TC-82) 2,2-di(4-methoxyphenyl)-5-methoxycarbonyl-6-(2-hydroxyethoxy)ethoxy-2H-naphtho[1,2-b]pyran;

(TC-83) 2,2di(4-methoxyphenyl)-5-(2-(2-(2-(2-hydroxyethoxy)ethoxy)ethoxy)ethoxyca-rbonyl)-6-phenyl-2H-naphtho[2-b]pyran;

(TC-84) 2,2-di(4-methoxyphenyl)-5-hydroxy-6-(2-hydroxyphenyl)-2H-naphtho[2-b]pyran; and combinations of two or more thereof.

The photochromic articles of the present invention can include, with some embodiments, an alignment layer that is interposed between the primer layer and the photochromic-dichroic layer. With reference to FIG. 1 photochromic article 2 includes an alignment layer 50 that is interposed between primer layer 14 and photochromic-dichroic layer 17. The alignment layer can also be referred to herein as an orientation facility. The photochromic-dichroic compound of the photochromic-dichroic layer can be at least partially aligned by interaction with the underlying alignment layer.

As used herein the term "alignment layer" means a layer that can facilitate the positioning of one or more other structures that are exposed, directly and/or indirectly, to at least a portion thereof. As used herein the term "order" means bring into a suitable arrangement or position, such as aligning with another structure or material, or by some other force or effect. Thus, as used herein the term "order" encompasses both contact methods of ordering a material, such as by aligning with another structure or material, and non-contact methods of ordering a material, such as by exposure to an external force or effect. The term order also encompasses combinations of contact and non-contact methods.

For example, the photochromic-dichroic compound that is at least partially aligned by interaction with the alignment layer can be at least partially aligned such that the long-axis of the photochromic-dichroic compound in the activated state is essentially parallel to at least the first general direction of the alignment layer. With some embodiments, the photochromic-dichroic compound that is at least partially aligned by interaction with the alignment layer is bound to or reacted with the alignment layer. As used herein with reference to order or alignment of a material or structure, the term "general direction" refers to the predominant arrangement or orientation of the material, compound or structure. Further, it will be appreciated by those skilled in the art that a material, compound or structure can have a general direction even though there is some variation within the arrangement of the material, compound or structure, provided that the material, compound or structure has at least one predominate arrangement.

The alignment layer can, with some embodiments, have at least a first general direction. For example, the alignment layer can include a first ordered region having a first general direction and at least one second ordered region adjacent the first ordered region having a second general direction that is different from the first general direction. Further, the alignment layer can have a plurality of regions, each of which has a general direction that is the same or different from the remaining regions so as to form a desired pattern or design. The alignment layer can include, for example, a coating including an at least partially ordered alignment medium, an at least partially ordered polymer sheet, an at least partially treated surface, Langmuir-Blodgett films, and combinations thereof.

The alignment layer can include, with some embodiments, a coating that includes an at least partially ordered alignment medium. Examples of suitable alignment media that can be used in conjunction with the alignment layer include, but are not limited to, photo-orientation materials, rubbed-orientation materials, and liquid crystal materials. Methods of ordering at least a portion of the alignment medium are described herein below in further detail.

The alignment medium of the alignment layer can be a liquid crystal material, and the alignment layer can be referred to as a liquid crystal alignment layer. Liquid crystal materials, because of their structure, are generally capable of being ordered or aligned so as to take on a general direction. More specifically, because liquid crystal molecules have rod- or disc-like structures, a rigid long axis, and strong dipoles, liquid crystal molecules can be ordered or aligned by interaction with an external force or another structure such that the long axis of the molecules takes on an orientation that is generally parallel to a common axis. For example, it is possible to align the molecules of a liquid crystal material with a magnetic field, an electric field, linearly polarized infrared radiation, linearly polarized ultraviolet radiation, linearly polarized visible radiation, or shear forces. It is also possible to align liquid crystal molecules with an oriented surface. For example, liquid crystal molecules can be applied to a surface that has been oriented, for example by rubbing, grooving, or photo-alignment methods, and subsequently aligned such that the long axis of each of the liquid crystal molecules takes on an orientation that is generally parallel to the general direction of orientation of the surface. Examples of liquid crystal materials suitable for use as alignment media include, but are not limited to, liquid crystal polymers, liquid crystal pre-polymers, liquid crystal monomers, and liquid crystal mesogens. As used herein the term "pre-polymer" means partially polymerized materials.

Classes of liquid crystal monomers that are suitable for use in conjunction with the alignment layer include, but are not limited to, mono- as well as multi-functional liquid crystal monomers. The liquid crystal monomers can, with some embodiments, be selected from cross-linkable liquid crystal monomers, such as photocross-linkable liquid crystal monomers. As used herein the term "photocross-linkable" means a material, such as a monomer, a pre-polymer or a polymer, that can be cross-linked on exposure to actinic radiation. For example, photocross-linkable liquid crystal monomers include, but are not limited to, those liquid crystal monomers that are cross-linkable on exposure to ultraviolet radiation and/or visible radiation, either with or without the use of polymerization initiators.

Examples of cross-linkable liquid crystal monomers, that can be included in the alignment layer, include, but are not limited to, liquid crystal monomers having functional groups chosen from acrylates, methacrylates, allyl, allyl ethers, alkynes, amino, anhydrides, epoxides, hydroxides, isocyanates, blocked isocyanates, siloxanes, thiocyanates, thiols, urea, vinyl, vinyl ethers and blends thereof. Examples of photocross-linkable liquid crystal monomers, that can be included in the alignment layer, include, but are not limited to, liquid crystal monomers having functional groups chosen from acrylates, methacrylates, alkynes, epoxides, thiols, and blends thereof.

Liquid crystal polymers and pre-polymers, that can be included in the alignment layer, include, but are not limited to, main-chain liquid crystal polymers and pre-polymers and side-chain liquid crystal polymers and pre-polymers. With main-chain liquid crystal polymers and pre-polymers, rod- or disc-like liquid crystal mesogens are primarily located within the polymer backbone. With side-chain liquid crystal polymers and pre-polymers, the rod- or disc-like liquid crystal mesogens primarily are located within the side chains of the polymer. Additionally, the liquid crystal polymer or pre-polymer can be cross-linkable, and further can be photocross-linkable.

Examples of liquid crystal polymers and pre-polymers, that can be included in the alignment layer, include, but are not limited to, main-chain and side-chain polymers and pre-polymers having functional groups chosen from acrylates, methacrylates, allyl, allyl ethers, alkynes, amino, anhydrides, epoxides, hydroxides, isocyanates, blocked isocyanates, siloxanes, thiocyanates, thiols, urea, vinyl, vinyl ethers, and blends thereof. Examples of photocross-linkable liquid crystal polymers and pre-polymers, that can be included in the alignment layer, include, but are not limited to, those polymers and pre-polymers having functional groups chosen from acrylates, methacrylates, alkynes, epoxides, thiols, and blends thereof.

Liquid crystal mesogens, that can be included in the alignment layer, include, but are not limited to, thermotropic liquid crystal mesogens and lyotropic liquid crystal mesogens. Additional classes of liquid crystal mesogens, that can be included in the alignment layer, include, but are not limited to, columatic (or rod-like) liquid crystal mesogens and discotic (or disc-like) liquid crystal mesogens.

Examples of photo-orientation materials, that can be included in the alignment layer, include, but are not limited to, photo-orientable polymer networks. More specific examples of photo-orientable polymer networks include, but are not limited to, azobenzene derivatives, cinnamic acid derivatives, coumarine derivatives, ferulic acid derivatives, and polyimides. With some embodiments, the alignment layer can include an at least partially ordered photo-orientable polymer network chosen from azobenzene derivatives, cinnamic acid derivatives, coumarine derivatives, ferulic acid derivatives, and/or polyimides. Examples of cinnamic acid derivatives, that can be included in the alignment layer, include, but are not limited to, polyvinyl cinnamate and polyvinyl esters of paramethoxycinnamic acid.

As used herein the term "rubbed-orientation material" means a material that can be at least partially ordered by rubbing at least a portion of a surface of the material with another suitably textured material. For example, the rubbed-orientation material can be rubbed with a suitably textured cloth or a velvet brush. Examples of rubbed-orientation materials, that can be included in the alignment layer, include, but are not limited to, (poly)imides, (poly)siloxanes, (poly)acrylates, and (poly)coumarines. With some embodiments, the alignment layer can include a polyimide, and the alignment layer can be rubbed with a velvet or a cotton cloth so as to at least partially order at least a portion of the surface of the alignment layer.

With some embodiments, the alignment layer can include an at least partially ordered polymer sheet. For example, a sheet of polyvinyl alcohol can be at least partially ordered by stretching (e.g., uniaxially stretching) the sheet, and thereafter the stretched sheet can be bonded to the at least a portion a surface of the optical substrate to form the orientation facility. Alternatively, the ordered polymer sheet can be made by a method that at least partially orders the polymer chains during fabrication, for example, by extrusion. Further, the at least partially ordered polymer sheet can be formed by casting or otherwise forming a sheet of a liquid crystal material and thereafter at least partially ordering the sheet for example, but exposing the sheet to a magnetic field, an electric field, and/or a shear force. Still further, the at least partially ordered polymer sheet can be made using photo-orientation methods. For example, a sheet of a photo-orientation material can be formed, for example by casting, and thereafter at least partially ordered by exposure to linearly polarized ultraviolet radiation.

The alignment layer of the photochromic articles of the present invention can include an at least partially treated surface. As used herein, the term "treated surface" refers to at least a portion of a surface that has been physically altered to create at least one ordered region on least a portion of the surface. Examples of treated surfaces include, but are not limited to, rubbed surfaces, etched surfaces, and embossed surfaces. Further, the treated surfaces can be patterned, for example using a photolithographic or an interferographic process. With some embodiments, the surface of the alignment layer can be a treated surface selected from, for example, chemically etched surfaces, plasma etched surfaces, nanoetched surfaces (such as surfaces etched using a scanning tunneling microscope or an atomic force microscope), laser etched surfaces, and/or electron-beam etched surfaces.

In accordance with some embodiments, when the alignment layer includes a treated surface, the treated surface can be formed by depositing a metal salt (such as a metal oxide or metal fluoride) onto at least a portion of a surface (e.g., a surface of the alignment layer itself, or a surface of the primer layer), and thereafter etching the deposit to form the treated surface. Art-recognized methods of depositing a metal salt include, but are not limited to, plasma vapor deposition, chemical vapor deposition, and sputtering. Etching can be undertaken in accordance with art-recognized methods, such as those described previously herein.

As used herein the term "Langmuir-Blodgett films" means one or more at least partially ordered molecular films on a surface. Langmuir-Blodgett films can be formed, for example, by dipping a substrate into a liquid one or more times so that it is at least partially covered by a molecular film and then removing the substrate from the liquid such that, due to the relative surface tensions of the liquid and the substrate, the molecules of the molecular film are at least partially ordered in substantially one (or a single) general direction. As used herein, the term molecular film refers to monomolecular films (i.e., monolayers) as well as films comprising more than one monolayer.

The photochromic articles of the present invention can, with some embodiments, further include an alignment transfer material interposed between the alignment layer and the photochromic-dichroic layer. The alignment transfer material can be aligned by interaction with the alignment layer, and correspondingly the photochromic-dichroic compound can be aligned by interaction with the alignment transfer material. The alignment transfer material can, with some embodiments, facilitate the propagation or transfer of a suitable arrangement or position from the alignment layer to the photochromic-dichroic compound of the photochromic-dichroic layer.

Examples of alignment transfer materials include, but are not limited to, those liquid crystal materials described above in connection with the alignment media disclosed herein. It is possible to align the molecules of a liquid crystal material with an oriented surface. For example, a liquid crystal material can be applied to a surface that has been oriented and subsequently aligned such that the long axis of the liquid crystal molecules adopts an orientation that is generally parallel to the same general direction of orientation of the surface. The liquid crystal material of the alignment transfer material can be at least partially ordered by alignment with the alignment layer, such that the long axis of the molecules of the liquid crystal material are generally parallel to, for example, a first general direction of the orientation facility. In this manner, the general direction of the alignment layer can be transferred to the liquid crystal material, which in turn can transfer the general direction to another structure or material. Further, if the alignment layer includes a plurality of regions having general directions that together form a design or pattern, that design or pattern can be transferred to the liquid crystal material by aligning the liquid crystal material with the various regions of the alignment layer. Additionally, although not required, according to various non-limiting embodiments disclosed herein, at least a portion of the liquid crystal material of the alignment transfer material can be exposed to at least one of, a magnetic field, an electric field, linearly polarized infrared radiation, linearly polarized ultraviolet radiation, and linearly polarized visible radiation while being at least partially aligned with at least a portion of the alignment layer.

The photochromic articles of the present invention can, with some embodiments, include a hard coat layer that resides over the topcoat layer. With reference to FIG. 1, photochromic article 2 includes a hard coat layer 53 that resides over topcoat layer 20. The hard coat layer can include a single layer or multiple layers.

The hard coat layer can be selected from abrasion-resistant coatings including organo silanes, abrasion-resistant coatings including radiation-cured acrylate-based thin films, abrasion-resistant coatings based on inorganic materials such as silica, titania and/or zirconia, organic abrasion-resistant coatings of the type that are ultraviolet light curable, oxygen barrier-coatings, UV-shielding coatings, and combinations thereof. With some embodiments, the hard coat layer can include a first coating of a radiation-cured acrylate-based thin film and a second coating including an organo-silane. Non-limiting examples of commercial hard coating products include SIL-VUE® 124 and HI-GARD® coatings, available from SDC Coatings, Inc. and PPG Industries, Inc., respectively.

The hard coat layer can be selected from art-recognized hard coat materials, such as organo-silane abrasion-resistant coatings. Organo-silane abrasion-resistant coatings, often referred to as hard coats or silicone-based hard coatings, are well known in the art, and are commercially available from various manufacturers, such as SDC Coatings, Inc. and PPG Industries, Inc. Reference is made to U.S. Pat. No. 4,756,973 at column 5, lines 1-45; and to U.S. Pat. No. 5,462,806 at column 1, lines 58 through column 2, line 8, and column 3, line 52 through column 5, line 50, which disclosures describe organo-silane hard coatings and which disclosures are incorporated herein by reference. Reference is also made to U.S. Pat. Nos. 4,731,264, 5,134,191, 5,231,156 and International Patent Publication WO 94/20581 for disclosures of organo-silane hard coatings, which disclosures are also incorporated herein by reference. The hard coat layer can be applied by those coating methods as described previously herein with regard to the primer layer, such as spin coating.

Other coatings that can be used to form the hard coat layer, include, but are not limited to, polyfunctional acrylic hard coatings, melamine-based hard coatings, urethane-based hard coatings, alkyd-based coatings, silica sol-based hard coatings or other organic or inorganic/organic hybrid hard coatings.

The hard coat layer, with some embodiments, is selected from organo-silane type hard coatings. Organo-silane type hard coatings from which the hard coat layer of the photochromic articles of the present invention can be selected include, but are not limited to, those disclosed at column 24, line 46 through column 28, line 11 of U.S. Pat. No. 7,465,414 B2, which disclosure is incorporated herein by reference.

The photochromic articles of the present invention can include additional coatings, such as antireflective coatings. With some embodiments, an antireflective coating can be applied over the hard coat layer. Examples of antireflective coatings are described in U.S. Pat. No. 6,175,450 and International Patent Publication WO 00/33111, the disclosures of which are incorporated herein by reference.

In accordance with further embodiments of the present invention, the photochromic articles of the present invention can be selected from ophthalmic articles or elements, display articles or elements, windows, mirrors, packaging material such as shrinkwrap, and active and passive liquid crystal cell articles or elements.

Examples of ophthalmic articles or elements include, but are not limited to, corrective and non-corrective lenses, including single vision or multi-vision lenses, which can be either segmented or non-segmented multi-vision lenses (such as, but not limited to, bifocal lenses, trifocal lenses and progressive lenses), as well as other elements used to correct, protect, or enhance (cosmetically or otherwise) vision, including without limitation, contact lenses, intra-ocular lenses, magnifying lenses, and protective lenses or visors.

Examples of display articles, elements and devices include, but are not limited to, screens, monitors, and security elements, including without limitation, security marks and authentication marks.

Examples of windows include, but are not limited to, automotive and aircraft transparencies, filters, shutters, and optical switches.

With some embodiments, the photochromic article can be a security element. Examples of security elements include, but are not limited to, security marks and authentication marks that are connected to at least a portion of a substrate, such as: access cards and passes, e.g., tickets, badges, identification or membership cards, debit cards, etc.; negotiable instruments and non-negotiable instruments e.g., drafts, checks, bonds, notes, certificates of deposit, stock certificates, etc.; government documents, e.g., currency, licenses, identification cards, benefit cards, visas, passports, official certificates, deeds etc.; consumer goods, e.g., software, compact discs ("CDs"), digital-video discs ("DVDs"), appliances, consumer electronics, sporting goods, cars, etc.; credit cards; and merchandise tags, labels and packaging.

With further embodiments, the security element can be connected to at least a portion of a substrate chosen from a transparent substrate and a reflective substrate. Alternatively, according to further embodiments in which a reflective substrate is required, if the substrate is not reflective or sufficiently reflective for the intended application, a reflective material can be first applied to at least a portion of the substrate before the security mark is applied thereto. For example, a reflective aluminum coating can be applied to the at least a portion of the substrate prior to forming the security element thereon. Additionally or alternatively, the security element can be connected to at least a portion of a substrate chosen from untinted substrates, tinted substrates, photochromic substrates, tinted-photochromic substrates, linearly polarizing, circularly polarizing substrates, and elliptically polarizing substrates.

Furthermore, security elements according to the aforementioned embodiments can further include one or more other coatings or films or sheets to form a multi-layer reflective security element with viewing angle dependent characteristics, such as described in U.S. Pat. No. 6,641,874.

The present invention is more particularly described in the following examples, which are intended to be illustrative only, since numerous modifications and variations therein will be apparent to those skilled in the art. Unless otherwise specified, all parts and all percentages are by weight.

EXAMPLES

Part 1 describes the preparation of the primer layer formulation (PLF). Part 2 describes the preparation of the liquid crystal alignment formulation (LCAF). Part 3 describes the preparation of the coating layer formulation (CLF). Part 4 describes the preparation of the topcoat layer formulation (TLF). Part 5 describes the preparation of the hard coat formulation (HCF). Part 6 describes the procedures used for preparing the substrate and stack of coatings listed in Table 1. Part 7 describes the photochromic performance tests including the absorption ratio and optical response measurements reported in Table 1 for Comparative Examples (CE) 1 to 6 and Examples 1 to 4.

Part 1—Preparation of the PLF

Into a suitable container equipped with a magnetic stir-bar the following materials were added in the amounts indicated:
Polyacrylate polyol (14.69 g) (Composition D of Example 1 in U.S. Pat. No. 6,187,444, which polyol disclosure is incorporated herein by reference, except that in Charge 2, the styrene was replaced with methyl methacrylate and 0.5% by weight, based on the total monomer weight, of triphenyl phosphite was added);
Polyalkylenecarbonate diol (36.70 g) POLYMEG® 1000 from Great Lakes Chemical Corp;
DESMODUR® PL 340 (48.23 g) from Bayer Material Science;
TRIXENE® BI 7960 (34.39 g) from Baxenden;
Polyether modified polydimethylsiloxane (0.08 g) BYK®-333 from BYK-Chemie, USA;
Urethane catalyst (1.00 g) KKAT® 348 from King Industries;
Gamma-Glycidoxypropyltrimethoxysilane (3.96 g) A-187 from Momentive Performance Materials;
Light stabilizer (8.07 g) TINUVIN® 928 from Ciba Specialty Chemicals;

AROMATIC 100 (36.00 g) a mixture of high temperature boiling solvents available from Texaco; and 1-Methyl-2-pyrrolidinone (61.88 g) from Sigma-Aldrich).

The mixture was stirred at room temperature for 2 hrs to yield a solution having about 46.82 weight % final solids based on the total weight of the solution. To this solution was added with mixing the following photochromic compounds in the amounts indicated:

Photochromic Compound-1 (PC-1) (0.09 g) reported to be 7,7-diphenyl-2-pentyl-4-oxo-4H-7H-[1,3]dioxino[5',4':3,4] naphtho[1,2-b]pyran and prepared according to the procedure of Example 5 of U.S. Pat. No. 6,022,497, which disclosure is incorporated herein by reference.

PC-2 (2.10 g) reported to be 3,3-di(4-methoxyphenyl)-11-morpholino-13,13-dimethyl-3H,13H-indeno[2',3':3,4]naphtho-[1,2-b]pyran and prepared according to the procedure of Example 1 of U.S. Pat. No. 7,262,295 B2, which disclosure is incorporated herein by reference.

PC-3 (0.81 g) reported to be 7-(4-methoxyphenyl)-7-(2-fluoro-4-morpholinopphenyl)-2-pentyl-4-oxo-4H-7H-[1,3] dioxino[5',4':3,4]naphtho[1,2-b]pyran prepared according to the procedure of Example 5 of U.S. Pat. No. 6,022,497, except that 1-(4-methoxyphenyl)-1-(2-fluoro-4-morpholinophenyl)-2-propyn-1-ol was used in place of 1,1-diphenyl-2-propyn-1-ol.

Primer without photochromic compounds was also prepared for use in Comparative Examples 4 and 5.

Part 2—Preparation of LCAF

Staralign 2200CP10 purchased from Ventico was diluted to 2% solution with cyclopentanone solvent.

Part 3—Preparation of the CLF

The liquid crystal monomers (LCM) materials in the CLF were prepared as follows:

LCM-1 is 1-(6-(6-(6-(6-(6-(6-(6-(6-(6-(8-(4-(4-(4-(8-acryloyloxyhexylloxy)benzoyloxy)phenyloxycarbonyl)phenoxy)octyloxy)-6-oxohexyloxy)-6-oxohexyloxy)-6-oxohexyloxy)-6-oxohexyloxy)-6-oxohexyloxy)-6-oxohexyloxy)-6-oxohexyloxy)-6-oxohexan-1-ol which was prepared according to the procedures described in Example 17 of U.S. Pat. No. 7,910,019, which liquid crystal monomer disclosure is incorporated herein by reference.

LCM-2 is commercially available RM257 reported to be 4-(3-acryloyloxypropyloxy)-benzoic acid 2-methyl-1,4-phenylene ester, available from EMD Chemicals, Inc., having the molecular formula of $C_{33}H_{32}O_{10}$.

LCM-3 1-(6-(4-(4-(trans-4-pentylcyclohexyl)phenoxycarbonyl)phenoxy)hexyloxy)-2-methylprop-2-en-1-one prepared according to the procedure of Example 1 in U.S. Pat. No. 7,910,019, except that n=0, which disclosure is incorporated herein by reference.

LCM-4 is 1-(6-(6-(6-(6-(6-(6-(6-(8-(4-(4-(4-hexyloxybenzoyloxy)phenoxycarbonyl)-phenoxy)octyloxy)-6-oxohexyloxy)-6-oxohexyloxy)-6-oxohexyloxy)-6-oxohexyloxy)-6-oxohexyloxy)-6-oxohexyloxy)-6-oxohexyloxy)-2-methylprop-2-en-1-one prepared according to the procedures of U.S. Pat. No. 7,910,019, which disclosure is incorporated herein by reference.

CLF was prepared as follows:

To a suitable flask containing a mixture of anisole (3.99 g) and BYK®-322 additive 0.004 g, reported to be an aralkyl modified poly-methyl-alkyl-siloxane available from BYK Chemie, USA), was added LCM-1 (1.08 g), LCM-2 (2.4 g), LCM-3 (1.08 g), LCM-4 (1.44 g), 4-methoxyphenol (0,006 g), and IRGACURE® 819 (0.09 g, a photoinitiator available from Ciba-Geigy Corporation). The resulting mixture containing 60 weight percent monomer solids, based on the total weight of the mixture, was stirred for 2 hours at 80° C. and cooled to about 26° C. and the following photochromic compounds were added. PC-4 was added at a level of 4.8 weight percent based on monomer solids and is reported to be 3-Phenyl-3-(4-methoxyphenyl)-10-[4-(4-(4-(trans-4-pentylcyclohexyl)phenyl)benzamido)phenyl]-6-trifluoromethyl-13,13-dimethyl-3,13-dihydro-indeno[2',3':3,4]naphtho[1,2-b] pyran prepared according to the procedure of Example 19 of U.S. patent application Ser. No. 12/928,687 filed on Dec. 16, 2010, which disclosure is incorporated herein by reference; and PC-5 (7-2384) was added at a level of 7.2 weight percent based on monomer solids and is reported to be 3,3-bis(4-methoxyphenyl)-13-methoxy-13-ethyl-7-[2-methyl-4-(4-(trans-4-pentylcyclohexyl)-phenyl)benzamido)phenyl]-6-methoxy-13,13-dihydro-indeno[2',3':3,4]naphtho[1,2-b] pyran prepared according to the procedures of U.S. patent application Ser. No. 12/928,681 filed on Dec. 16, 2010, which disclosure is incorporated herein by reference.

Part 4: Preparation of the TLF

The TLF was prepared as follows:

In a 50 mL amber glass bottle equipped with a magnetic stir-bar following materials were added:

Hydroxy methacrylate (1.242 g) from Sigma-Aldrich;
Neopentyl glycol diacrylate (13.7175 g) SR247 from Sartomer;
Trimethylolpropane trimethacrylate (2.5825 g) SR350 from Sartomer;
DESMODU® PL 340 (5.02 g) from Bayer Material Science;
IRGACURE®-819 (0.0628 g) from Ciba Speciality Chemicals;
DAROCUR® TPO (0.0628 g; from Ciba Speciality Chemicals,
Polybutyl acrylate (0.125 g),
3-Aminopropylpropyltrimethoxysilane (1.4570 g) A-1100 from Momentive Performance Materials; and
200 proof absolute anhydrous Ethanol (1.4570 g) from Pharmaco-Aaper.

The mixture was stirred at room temperature for 2 hrs. To the TLF used for Example 4, a ultraviolet light absorber (UVA) was added at a level of 1 weight percent, based on the total solution weight. The UVA was TINUVIN® 384 of the hydroxyphenylbenzotriazole class from Ciba Specialty Chemicals.

Part 5: Preparation of the HCF

The HCF was prepared as follows: Charge 1 was added to a clean dry beaker and placed in an ice bath at 5 C with stirring. Charge 2 was added and an exotherm raised the temperature of the reaction mixture to 50 C. The temperature of the resulting reaction mixture was cooled to 20-25 C and Charge 3 was added with stirring. Charge 4 was added to adjust the pH from about 3 to about 5.5. Charge 5 was added and the solution was mixed for half an hour. The resulting solution was filtered through a nominal 0.45 micron capsule filter and stored at 4° C. until use.

| Charge 1 | |
|---|---|
| glycidoxypropyltrimethoxysilane | 32.4 grams |
| methyltrimethoxysilane | 345.5 grams |
| Charge 2 | |
| Solution of deionized water (DI) with nitric acid (nitric acid 1 g/7000 g) | 292 grams |
| Charge 3 | |
| DOWANOL ® PM solvent | 228 grams |

-continued

| Charge 4 | |
|---|---|
| TMAOH (25% tetramethylamonium hydroxide in methanol) | 0.45 grams |
| Charge 5 | |
| BYK ®-306 surfactant | 2.0 grams |

Part 6—Procedures Used for Preparing the Substrate and Coating Stacks Reported in Table 1
Substrate Preparation Square substrates measuring 5.08 cm by 5.08 cm by 0.318 cm (2 inches (in.) by 2 in. by 0.125 in.) prepared from CR-39® monomer were obtained from Homalite, Inc. Each substrate was cleaned by wiping with a tissue soaked with acetone and dried with a stream of air and corona treated by passing on a conveyor belt in Tantec EST Systems Serial No. 020270 Power Generator HV 2000 series corona treatment equipment with a high voltage transformer. The substrates were exposed to corona generated by 53.99 KV, 500 Watts while traveling on a conveyor at a belt speed 3 ft/min.
Coating Procedure for the Primer Layer The PLF was applied to the test substrates by spin-coating on a portion of the surface of the test substrate by dispensing approximately 1.5 mL of the solution and spinning the substrates at 500 revolutions per minute (rpm) for 3 seconds, followed by 1,500 rpm for 7 seconds, followed by 2,500 rpm for 4 seconds. A spin processor from Laurell Technologies Corp. (WS-400B-6NPP/LITE) was used for spin coating. Afterwards, the coated substrates were placed in an oven maintained at 125° C. for 60 minutes. The coated substrates were cooled to about 26° C. The substrate was corona treated by passing on a conveyor belt in Tantec EST Systems Serial No. 020270 Power Generator HV 2000 series corona treatment equipment with a high voltage transformer. The dried primer layers were exposed to corona generated by 53.00 KV, 500 Watts while traveling on a conveyor at a belt speed 3 ft/min.
Coating Procedure for the Liquid Crystal Alignment Layer The LCAF was applied to the test substrates by spin-coating on a portion of the surface of the test substrate by dispensing approximately 1.0 mL of the solution and spinning the substrates at 800 revolutions per minute (rpm) for 3 seconds, followed by 1,000 rpm for 7 seconds, followed by 2,500 rpm for 4 seconds. A spin processor from Laurell Technologies Corp. (WS-400B-6NPP/LITE) was used for spin coating. Afterwards, the coated substrates were placed in an oven maintained at 120° C. for 30 minutes. The coated substrates were cooled to about 26° C.

The dried photoalignment layer on each of the substrates was at least partially ordered by exposure to linearly polarized ultraviolet radiation. The light source was oriented such that the radiation was linearly polarized in a plane perpendicular to the surface of the substrate. The amount of ultraviolet radiation that each photoalignment layer was exposed to was measured using a UV Power Puck™ High energy radiometer from EIT Inc (Serial No, 2066) and was as follows: UVA 0.018 W/cm2 and 5.361 J/cm2; UVB 0 W/cm2 and 0 J/cm2; UVC 0 W/cm2 and 0 J/cm2; and UVV 0.005 W/cm2 and 1.541 J/cm2. After ordering at least a portion of the photoorientable polymer network, the substrates were cooled to about 26° C. and kept covered.
Coating Procedure for the Coating Layer The CLF was spin coated at a rate of 400 revolutions per minute (rpm) for 6 seconds, followed by 800 rpm for 6 seconds onto the at least partially ordered photoalignment materials on the test substrates. Each coated substrate was placed in an oven at 60° C. for 30 minutes. Afterwards they were cured under two ultraviolet lamps in the UV Curing Oven Machine designed and built by Belcan Engineering in nitrogen atmosphere while running on a conveyor belt at 2 ft/min speed at peak intensity of 0.388 Watts/cm2 of UVA and 0.165 Watts/cm2 of UVV and UV dosage of 7.386 Joules/cm2 of UVA and 3.337 Joules/cm2 of UVV. If the coated substrate was going to receive a topcoat layer the cured layer was exposed to corona generated by 53.00 KV, 500 Watts while traveling on a conveyor at a belt speed 3 ft/min. If the coated substrate was not going to receive a topcoat layer, the post curing was completed at 105° C. for 3 hours.
Coating Procedure for the Topcoat Layer The TLF was spin coated at a rate of 1,400 revolutions per minute (rpm) for 7 seconds onto the cured CLF coated substrates. Afterwards the substrates were cured under two ultraviolet lamps in the UV Curing Oven Machine designed and built by Belcan Engineering in nitrogen atmosphere while running on a conveyor belt at 6 ft/min speed at peak intensity of 1.887 Watts/cm2 of UVA and 0.694 Watts/cm2 of UVV and UV dosage of 4.699 Joules/cm2 of UVA and 1.787 Joules/cm2 of UVV. If the coated substrate was going to receive a hard coat layer, the cured layer was exposed to corona generated by 53.00 KV, 500 Watts while traveling on a conveyor at a belt speed 3 ft/min. If the coated substrate was not going to receive a hard coat layer, the post curing was completed at 105° C. for 3 hours.
Coating Procedure for the Hard Coat The HCF was spin coated at a rate of 2,000 revolutions per minute (rpm) for 10 seconds onto the cured topcoat layer coated substrates, Post curing of the coated substrates was completed at 105° C. for 3 hours.
Part 7—Photochromic Performance Tests Including Absorption Ratio and Optical Response Measurements Absorption ratios (AR) for each of the substrates having a coating containing photochromic dichroic dyes (PCDD) were determined as follows. A Cary 6000i UV-Visible spectrophotometer was equipped with a self-centering sample holder mounted on a rotation stage (Model M-060-PD from Polytech, PI) and the appropriate software. A polarizer analyzer (Moxtek PROFLUX® polarizer) was placed in the sample beam before the sample. The instrument was set with the following parameters: Scan speed=600 nm/min; Data interval=1.0 nm; Integration time=100 ms; Absorbance range=0-6.5; Y mode=absorbance; X-mode=nanometers; and the scanning range was 380 to 800 nm. Options were set for 3.5 SBW (slit band width), and double for beam mode. Baseline options were set for Zero/baseline correction. Also, 1.1 and 1.5 (~2.6 together) Screen Neutral Density filters were in the reference path for all scans. The coated substrate samples were tested in air, at room temperature (22.7° C.±2.4° C.) maintained by the lab air conditioning system.

Orientation of the sample polarizer to be parallel and perpendicular to the analyzer polarizer was accomplished in the following manner. The Cary 6000i was set to 443 nm for samples containing DD-2 and 675 nm for samples containing DD-1, and the absorbance was monitored as the sample was rotated in small increments (0.1 to 5 degrees, e.g., 5, 1, 0.5 and 0.1 degrees). The rotation of the sample was continued until the absorbance was maximized. This position was defined as the perpendicular or 90 degree position. The parallel position was obtained by rotating the stage 90 degrees clock-wise or counter-clockwise. Alignment of the samples was achieved to ±0.1°.

The absorption spectra were collected at both 90 and 0 degrees for each sample. Data analysis was handled with the Igor Pro software available from WaveMetrics. The spectra were loaded into Igor Pro and the absorbances were used to calculate the absorption ratios at 443 nm and 675 nm. The calculated absorption ratios are listed in Table 7.

Prior to response testing on an optical bench, the substrates were conditioned by exposing them to 365 nm ultraviolet light for 10 minutes at a distance of about 14 cm from the source in order to pre-activate the photochromic molecules. The UVA irradiance at the sample was measured with a Licor Model Li-1800 spectroradiometer and found to be 22.2 Watts per square meter. The samples were then placed under a halogen lamp (500 W, 120 V) for about 10 minutes at a distance of about 36 cm from the lamp in order to bleach, or inactivate, the photochromic compound in the samples. The illuminance at the sample was measured with the Licor spectroradiometer and found to be 21.9 Klux. The samples were then kept in a dark environment for at least 1 hour prior to testing in order to cool and continue to fade back to a ground state.

An optical bench was used to measure the optical properties of the coated substrates and derive the absorption ratio and photochromic properties. Each test sample was placed on the optical bench with an activating light source (a Newport/Oriel Model 66485 300-Watt Xenon arc lamp fitted with a UNIBLITZ® VS-25 high-speed computer controlled shutter that momentarily closed during data collection so that stray light would not interfere with the data collection process, a SCHOTT® 3 mm KG-1 band-pass filter, which removed short wavelength radiation, neutral density filter(s) for intensity attenuation and a condensing lens for beam collimation) positioned at a 30° to 35° angle of incidence to the surface of the test sample. The arc lamp was equipped with a light intensity controller (Newport/Oriel model 68950).

A broadband light source for monitoring response measurements was positioned in a perpendicular manner to a surface of the test sample. Increased signal of shorter visible wavelengths was obtained by collecting and combining separately filtered light from a 100-Watt tungsten halogen lamp (controlled by a LAMBDA® UP60-14 constant voltage powder supply) with a split-end, bifurcated fiber optical cable. Light from one side of the tungsten halogen lamp was filtered with a SCHOTT® KG1 filter to absorb heat and a HOYA® B-440 filter to allow passage of the shorter wavelengths. The other side of the light was either filtered with a SCHOTT® KG1 filter or unfiltered. The light was collected by focusing light from each side of the lamp onto a separate end of the split-end, bifurcated fiber optic cable, and subsequently combined into one light source emerging from the single end of the cable. A 4" light pipe was attached to the single end of the cable to insure proper mixing. The broad band light source was fitted with a UNIBLITZ® VS-25 high-speed computer controlled shutter that momentarily opened during data collection.

Polarization of the light source was achieved by passing the light from the single end of the cable through a Moxtek, PROFLUX® Polarizer held in a computer driven, motorized rotation stage (Model M-061-PD from Polytech, PI). The monitoring beam was set so that the one polarization plane (0°) was perpendicular to the plane of the optical bench table and the second polarization plane (90°) was parallel to the plane of the optical bench table. The samples were run in air, at 23° C.±0.1° C. maintained by a temperature controlled air cell.

To align each sample, a second polarizer was added to the optical path. The second polarizer was set to 90° of the first polarizer. The sample was placed in an air cell in a self-centering holder mounted on a rotation stage (Model No M-061. PD from Polytech, PI). A laser beam (Coherent-ULN 635 diode laser) was directed through the crossed polarizers and sample. The sample was rotated (in 3° steps as course moves and in 0.1° steps as fine moves) to find the minimum transmission. At this point the sample was aligned either parallel or perpendicular to the Moxtek polarizer and the second polarizer as well as the diode laser beam was removed from the optical path. The sample was aligned ±0.2° prior to any activation.

To conduct the measurements, each test sample was exposed to 6.7 W/m² of UVA from the activating light source for 10 to 20 minutes to activate the photochromic compound. An International Light Research Radiometer (Model IL-1700) with a detector system (Model SED033 detector, B Filter, and diffuser) was used to verify exposure at the beginning of each day. Light from the monitoring source that was polarized to the 0° polarization plane was then passed through the coated sample and focused into a 1" integrating sphere, which was connected to an OCEAN OPTICS® S2000 spectrophotometer using a single function fiber optic cable. The spectral information, after passing through the sample, was collected using OCEAN OPTICS® OOIBase32 and OOIColor software, and PPG propriety software. While the photochromic material was activated, the position of the polarizing sheet was rotated back and forth to polarize the light from the monitoring light source to the 90° polarization plane and back. Data was collected for approximately 600 to 1200 seconds at 5-second intervals during activation. For each test, rotation of the polarizers was adjusted to collect data in the following sequence of polarization planes: 0°, 90°, 90°, 0°, etc.

Absorption spectra were obtained and analyzed for each test sample using the Igor Pro software (available from WaveMetrics). The change in the absorbance in each polarization direction for each test sample was calculated by subtracting out the 0 time (i.e., unactivated) absorption measurement for the samples at each wavelength tested. Average absorbance values were obtained in the region of the activation profile where the photochromic response of the photochromic compound was saturated or nearly saturated (i.e., the regions where the measured absorbance did not increase or did not increase significantly over time) for each sample by averaging absorbance at each time interval in this region. The average absorbance values in a predetermined range of wavelengths corresponding $\lambda_{max-vis}$+/−5 nm were extracted for the 0° and 90° polarizations, and the absorption ratio for each wavelength in this range was calculated by dividing the larger average absorbance by the small average absorbance. For each wavelength extracted, 5 to 100 data points were averaged. The average absorption ratio for the photochromic compound was then calculated by averaging these individual absorption ratios.

Change in optical density (ΔOD) from the bleached state to the darkened state was determined by establishing the initial transmittance, opening the shutter from the xenon lamp to provide ultraviolet radiation to change the test lens from the bleached state to an activated (i.e., darkened) state. Data was collected at selected intervals of time, measuring the transmittance in the activated state, and calculating the change in optical density according to the formula: ΔOD=log(% Tb % Ta), where % Tb is the percent transmittance in the bleached state, % Ta is the percent transmittance in the activated state and the logarithm is to the base 10. Measurements were made at the photopic (Phot) wavelength as well as at wavelengths that were an average of 440 nm and 570 nm and are reported in Table 1.

The fade half life (T1/2) is the time interval in seconds for the ΔOD of the activated form of the photochromic compounds in the test samples to reach one half the ΔOD measured after fifteen minutes, or after saturation or near-saturation was achieved, at room temperature after removal of the source of activating light, e.g., by closing the shutter.

The results for Examples 1-4 and CE 1-6 are listed in Table 1. For each wavelength, the ΔOD of Examples 1-4 is greater than that for CE 1-6.

TABLE 1

Photochromic Performance and Absorption Ratios for the Coating Stacks of Examples 1-4 and Comparative Examples 1-6

| Sample Identification | Primer Layer | Liquid Crystal Layer + PC | Alignment Layer | Coating Layer | Topcoat Layer | Topcoat Layer + UVA | Hard Coat | Phot | ΔOD 440 nm (avg) | 570 nm (avg) | T½ (sec) | AR |
|---|---|---|---|---|---|---|---|---|---|---|---|---|
| CE-1 | | | X | X | | | | 0.62 | 0.62 | 0.73 | 157 | 4.21 |
| CE-2 | | | X | X | X | | | 0.63 | 0.63 | 0.74 | 164 | 3.93 |
| CE-3 | | | X | X | X | | X | 0.63 | 0.63 | 0.76 | 151 | 3.68 |
| CE-4 | X | | X | X | | | | 0.63 | 0.63 | 0.74 | 159 | 4.18 |
| CE-5 | X | | X | X | X | | | 0.63 | 0.63 | 0.75 | 168 | 3.85 |
| CE-6 | | X | X | | | | | 0.27 | 0.27 | 0.32 | 156 | — |
| EXAMPLE 1 | | X | X | X | | | | 0.67 | 0.66 | 0.79 | 159 | 3.82 |
| EXAMPLE 2 | | X | X | X | X | | X | 0.70 | 0.69 | 0.84 | 167 | 3.51 |
| EXAMPLE 3 | | X | X | X | X | | | 0.70 | 0.70 | 0.83 | 167 | 3.55 |
| EXAMPLE 4 | | X | X | X | | X | | 0.65 | 0.65 | 0.78 | 172 | 3.30 |

The present invention has been described with reference to specific details of particular embodiments thereof. It is not intended that such details be regarded as limitations upon the scope of the invention except insofar as and to the extent that they are included in the accompanying claims.

What is claimed is:

1. A photochromic article comprising:
   a substrate;
   a primer layer comprising a first photochromic compound having a first peak absorbance wavelength and a first terminal minimum absorbance wavelength, said first terminal minimum absorbance wavelength being at higher wavelength than said first peak absorbance wavelength, and said primer layer being positioned over said substrate; and
   a photochromic-dichroic layer comprising a photochromic-dichroic compound having a second peak absorbance wavelength and a second terminal minimum absorbance wavelength, said second terminal minimum absorbance wavelength being at higher wavelength than said second peak absorbance wavelength, and said photochromic-dichroic layer being positioned over said primer layer,
   wherein said second peak absorbance wavelength is less than said first peak absorbance wavelength, and said second terminal minimum absorbance wavelength is less than said first terminal minimum absorbance wavelength, and
   further wherein said photochromic-dichroic compound has an absorbance of less than or equal to 0.1 at said first peak absorbance wavelength.

2. The photochromic article of claim 1, wherein said second terminal minimum absorbance wavelength is less than or equal to a first overlap wavelength value calculated from the following equation, (said first peak absorbance wavelength)×1.05.

3. The photochromic article of claim 1, wherein said second terminal minimum absorbance wavelength is less than or equal to a first overlap wavelength value calculated from the following equation, (said first peak absorbance wavelength)×1.025.

4. The photochromic article of claim 1, wherein said second terminal minimum absorbance wavelength is less than or equal to said first peak absorbance wavelength.

5. The photochromic article of claim 1, wherein said first peak absorbance wavelength, said first terminal minimum peak absorbance wavelength, said second peak absorbance wavelength, and said second terminal minimum wavelength are each independently selected from 300 nm to 780 nm.

6. The photochromic article of claim 5, wherein said first peak absorbance wavelength, said first terminal minimum peak absorbance wavelength, said second peak absorbance wavelength, and said second terminal minimum wavelength are each independently selected from 300 nm to 500 nm.

7. The photochromic article of claim 6, wherein said first peak absorbance wavelength is selected from 400 nm to 420 nm, said second peak absorbance wavelength is selected from 350 nm to 370 nm, and said second terminal minimum absorbance wavelength is less than or equal to a first overlap wavelength value calculated from the following equation, (said first peak absorbance wavelength)×1.05.

8. The photochromic article of claim 1, wherein said primer layer further comprises an organic matrix comprising polyurethane linkages.

9. The photochromic article of claim 1, wherein said photochromic-dichroic layer further comprises an anisotropic material.

10. The photochromic article of claim 9, wherein said anisotropic material comprises a liquid crystal material.

11. The photochromic article of claim 1, wherein said photochromic-dichroic compound is at least partially aligned.

12. The photochromic article of claim 1, wherein said photochromic-dichroic layer further comprises a phase-separated polymer comprising,
   a matrix phase that is at least partially ordered, and
   a guest phase that is at least partially ordered,
   wherein said guest phase comprises said photochromic-dichroic compound, and said photochromic-dichroic compound is at least partially aligned with at least a portion of said guest phase.

13. The photochromic article of claim 1, wherein said photochromic-dichroic layer further comprises an interpenetrating polymer network comprising,
   an anisotropic material that is at least partially ordered, and
   a polymeric material,
wherein said anisotropic material comprises said photochromic-dichroic compound, and said photochromic-dichroic compound is at least partially aligned with at least a portion of said anisotropic material.

14. The photochromic article of claim 1, wherein said photochromic-dichroic layer further comprises at least one additive selected from dyes, alignment promoters, kinetic enhancing additives, photoinitiators, thermal initiators, polymerization inhibitors, solvents, light stabilizers, heat stabilizers, mold release agents, rheology control agents, leveling agents, free radical scavengers, and adhesion promoters.

15. The photochromic article of claim 1, wherein said photochromic-dichroic layer further comprises at least one dichroic material chosen from azomethines, indigoids, thioindigoids, merocyanines, indans, quinophthalonic dyes, perylenes, phthaloperines, triphenodioxazines, indoloquinoxalines, imidazo-triazines, tetrazines, azo and (poly)azo dyes, benzoquinones, naphthoquinones, anthroquinone and (poly)anthroquinones, anthropyrimidinones, iodine and iodates.

16. The photochromic article of claim 1, wherein said first photochromic compound and said photochromic-dichroic compound are each independently selected from indeno-fused naphthopyrans, naphtho[1,2-b]pyrans, naphtho[2,1-b]pyrans, spirofluoroeno[1,2-b]pyrans, phenanthropyrans, quinolinopyrans, fluoroanthenopyrans, spiropyrans, benzoxazines, naphthoxazines, spiro(indoline)naphthoxazines, spiro(indoline)pyridobenzoxazines, spiro(indoline)fluoranthenoxazines, spiro(indoline)quinoxazines, fulgides, fulgimides, diarylethenes, diarylalkylethenes, diarylalkenylethenes, thermally reversible photochromic compounds, and non-thermally reversible photochromic compounds, and mixtures thereof.

17. The photochromic article of claim 1 further comprising an alignment layer interposed between said primer layer and said photochromic-dichroic layer, and said photochromic-dichroic compound is at least partially aligned.

18. The photochromic article of claim 1 further comprising a topcoat layer comprising an ultraviolet light absorber, wherein said topcoat layer resides over said photochromic-dichroic layer.

19. The photochromic article of claim 18 further comprising a hard coat layer, wherein said hard coat layer resides over said topcoat layer.

20. The photochromic article of claim 1, wherein said photochromic article is selected from ophthalmic articles, display articles, windows, mirrors, and active liquid crystal cell articles, and passive liquid crystal cell articles.

21. The photochromic article of claim 20, wherein photochromic article is selected from corrective lenses, non-corrective lenses, contact lenses, intra-ocular lenses, magnifying lenses, protective lenses, and visors.

22. The photochromic article of claim 20, wherein the display article is selected from screens, monitors, and security elements.

23. The photochromic article of claim 1, wherein the substrate is selected from untinted substrates, tinted substrates, photochromic substrates, tinted-photochromic substrates, and linearly polarizing substrates.

24. A photochromic article comprising:
a substrate;
a primer layer comprising a first photochromic compound having a first peak absorbance wavelength and a first terminal minimum absorbance wavelength, said first terminal minimum absorbance wavelength being at higher wavelength than said first peak absorbance wavelength, and said primer layer being positioned over said substrate;
a photochromic-dichroic layer comprising a photochromic-dichroic compound having a second peak absorbance wavelength and a second terminal minimum absorbance wavelength, said second terminal minimum absorbance wavelength being at higher wavelength than said second peak absorbance wavelength, and said photochromic-dichroic layer being positioned over said primer layer; and
a topcoat layer comprising a second photochromic compound having a third peak absorbance wavelength and a third terminal minimum absorbance wavelength, said third terminal minimum absorbance wavelength being at higher wavelength than said third peak absorbance wavelength, and said topcoat layer being positioned over said photochromic-dichroic layer,
wherein said second peak absorbance wavelength is less than said first peak absorbance wavelength, said second terminal minimum absorbance wavelength is less than said first terminal minimum absorbance wavelength, said third peak absorbance wavelength is less than said second peak absorbance wavelength, and said third terminal minimum absorbance wavelength is less than said second terminal minimum absorbance wavelength,
further wherein said photochromic-dichroic compound has an absorbance of less than or equal to 0.1 at said first peak absorbance wavelength, and
said second photochromic compound has an absorbance of less than or equal to 0.1 at said second peak absorbance wavelength.

25. The photochromic article of claim 24, wherein said second terminal minimum absorbance wavelength is less than or equal to a first overlap wavelength value calculated from the following equation, (said first peak absorbance wavelength)×1.05 and said third terminal minimum absorbance wavelength is less than or equal to a second overlap wavelength value calculated from the following equation, (said second peak absorbance wavelength)×1.05.

26. The photochromic article of claim 24, wherein said second terminal minimum absorbance wavelength is less than or equal to a first overlap wavelength value calculated from the following equation, (said first peak absorbance wavelength)×1.025 and said third terminal minimum absorbance wavelength is less than or equal to a second overlap wavelength value calculated from the following equation, (said second peak absorbance wavelength)×1.025.

27. The photochromic article of claim 24, wherein said second terminal minimum absorbance wavelength is less than or equal to said first peak absorbance wavelength, and said third terminal minimum absorbance wavelength is less than or equal to said second peak absorbance wavelength.

28. The photochromic article of claim 24, wherein said first peak absorbance wavelength, said first terminal minimum peak absorbance wavelength, said second peak absorbance wavelength, said second terminal minimum wavelength, said third peak absorbance wavelength, and said third terminal minimum wavelength are each independently selected from 300 nm to 780 nm.

29. The photochromic article of claim 28, wherein said first peak absorbance wavelength, said first terminal minimum peak absorbance wavelength, said second peak absorbance wavelength, said second terminal minimum wavelength, said third peak absorbance wavelength, and said third terminal minimum wavelength are each independently selected from 300 nm to 500 nm.

30. The photochromic article of claim 29, wherein,
said first peak absorbance wavelength is selected from 400 nm to 420 nm,
said second peak absorbance wavelength is selected from 350 nm to 370 nm, and
said third peak absorbance wavelength is selected from 310 nm to 330 nm, and
further wherein, said second terminal minimum absorbance wavelength is less than or equal to a first overlap wavelength value calculated from the following equation, (said first peak absorbance wavelength)×1.05, and said third terminal minimum absorbance wavelength is less than or equal to a second overlap wavelength value calculated from the following equation, (said second peak absorbance wavelength)×1.05.

31. The photochromic article of claim 24, wherein said first photochromic compound, said photochromic-dichroic compound, and said second photochromic compound are each independently selected from indeno-fused naphthopyrans, naphtho[1,2-b]pyrans, naphtho[2,1-b]pyrans, spirofluoroeno[1,2-b]pyrans, phenanthropyrans, quinolinopyrans, fluoroanthenopyrans, spiropyrans, benzoxazines, naphthoxazines, spiro(indoline)naphthoxazines, spiro(indoline)pyridobenzoxazines, spiro(indoline)fluoranthenoxazines, spiro(indoline)quinoxazines, fulgides, fulgimides, diarylethenes, diarylalkylethenes, diarylalkenylethenes, thermally reversible photochromic compounds, and non-thermally reversible photochromic compounds, and mixtures thereof.

32. The photochromic article of claim 24, wherein said topcoat layer further comprises an ultraviolet light absorber.

* * * * *